United States Patent
Anderson et al.

(10) Patent No.: US 9,247,563 B2
(45) Date of Patent: Jan. 26, 2016

(54) METHOD IMPLEMENTED IN A USER EQUIPMENT

(71) Applicant: Research In Motion Limited, Waterloo (CA)

(72) Inventors: Nicholas William Anderson, Bristol (GB); Robert Mark Harrison, Grapevine, TX (US); Robert Novak, Stittsville (CA); Eswar Vutukuri, Havant (GB)

(73) Assignee: BlackBerry Limited, Waterloo, Ontario (CA)

( * ) Notice: Subject to any disclaimer, the term of this patent is extended or adjusted under 35 U.S.C. 154(b) by 46 days.

(21) Appl. No.: 13/720,224

(22) Filed: Dec. 19, 2012

(65) Prior Publication Data

US 2013/0163537 A1    Jun. 27, 2013

Related U.S. Application Data

(60) Provisional application No. 61/579,935, filed on Dec. 23, 2011.

(51) Int. Cl.
| | |
|---|---|
| *H04W 4/00* | (2009.01) |
| *H04W 72/12* | (2009.01) |
| *H04W 72/02* | (2009.01) |
| *H04W 72/04* | (2009.01) |

(52) U.S. Cl.
CPC .......... *H04W 72/1284* (2013.01); *H04W 72/02* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 8,156,407 B2 | 4/2012 | Franovici | |
| 8,379,581 B2 | 2/2013 | Imamura | |
| 8,498,259 B2 | 7/2013 | Suzuki et al. | |
| 8,521,889 B2 | 8/2013 | Anschutz et al. | |
| 8,711,879 B2 | 4/2014 | Kato et al. | |
| 2003/0027522 A1 | 2/2003 | Valdivia et al. | |
| 2004/0252698 A1 | 12/2004 | Anschutz et al. | |
| 2008/0123520 A1* | 5/2008 | Ji et al. ......................... | 370/216 |

(Continued)

FOREIGN PATENT DOCUMENTS

| | | |
|---|---|---|
| KR | 10-2009-0128529 | 12/2009 |
| KR | 10-2010-0017152 | 2/2010 |

(Continued)

OTHER PUBLICATIONS

3GPP TS 25.212 Version 9.4.0 Release 9 (Jan. 2011).

(Continued)

*Primary Examiner* — Otis L Thompson, Jr.
(74) *Attorney, Agent, or Firm* — Fish & Richardson P.C.

(57) ABSTRACT

In some implementations, a method implemented in a user equipment UE for single carrier frequency division multiple access SC-FDMA within a wireless system includes receiving an assignment of a plurality of uplink scheduling request resources and comprising a plurality of SC-FDMA subcarriers of the wireless system. One of the plurality of uplink scheduling request resources is selected for transmission of scheduling requests. It is determined that a change in uplink scheduling request resource should be made. Upon determining that a change in scheduling request resource should be made, another of the assigned uplink scheduling request resources is selected for transmission of scheduling requests.

35 Claims, 23 Drawing Sheets

(56) References Cited

U.S. PATENT DOCUMENTS

| | | | |
|---|---|---|---|
| 2008/0144547 A1* | 6/2008 | Kwon et al. | 370/310 |
| 2008/0165733 A1 | 7/2008 | Xiao et al. | |
| 2008/0181173 A1 | 7/2008 | Wei et al. | |
| 2009/0052384 A1* | 2/2009 | Zisimopoulous et al. | 370/329 |
| 2009/0073922 A1* | 3/2009 | Malladi et al. | 370/328 |
| 2009/0185528 A1* | 7/2009 | Sambhwani et al. | 370/329 |
| 2009/0207794 A1* | 8/2009 | Meylan | 370/329 |
| 2009/0316666 A1 | 12/2009 | Yamada et al. | |
| 2010/0046460 A1 | 2/2010 | Kwak et al. | |
| 2010/0054161 A1* | 3/2010 | Montojo et al. | 370/280 |
| 2010/0128675 A1 | 5/2010 | Kishiyama et al. | |
| 2010/0136992 A1 | 6/2010 | Harada et al. | |
| 2010/0215004 A1* | 8/2010 | Yoo | 370/329 |
| 2010/0238882 A1 | 9/2010 | Zhang et al. | |
| 2010/0273468 A1* | 10/2010 | Bienas et al. | 455/418 |
| 2010/0284362 A1 | 11/2010 | Tajima et al. | |
| 2010/0322165 A1 | 12/2010 | Yoo | |
| 2011/0009141 A1* | 1/2011 | Harada et al. | 455/509 |
| 2011/0051642 A1* | 3/2011 | Krishnaswamy | 370/311 |
| 2011/0080880 A1* | 4/2011 | Yin et al. | 370/329 |
| 2011/0194639 A1 | 8/2011 | Nakao et al. | |
| 2011/0243066 A1* | 10/2011 | Nayeb Nazar et al. | 370/328 |
| 2011/0261858 A1 | 10/2011 | Baldemair et al. | |
| 2011/0274040 A1 | 11/2011 | Pani et al. | |
| 2011/0299513 A1 | 12/2011 | Suzuki et al. | |
| 2011/0305210 A1 | 12/2011 | Wu | |
| 2012/0108255 A1 | 5/2012 | Jo et al. | |
| 2012/0134305 A1 | 5/2012 | Damnjanovic et al. | |
| 2012/0140716 A1 | 6/2012 | Baldemair et al. | |
| 2012/0151501 A1 | 6/2012 | Manmohan | |
| 2012/0155412 A1* | 6/2012 | Kawamura et al. | 370/329 |
| 2012/0178467 A1 | 7/2012 | Fuji et al. | |
| 2012/0207109 A1* | 8/2012 | Pajukoski et al. | 370/329 |
| 2012/0213187 A1* | 8/2012 | Yang et al. | 370/329 |
| 2012/0307772 A1* | 12/2012 | Kwon et al. | 370/329 |
| 2012/0307773 A1* | 12/2012 | Tiirola et al. | 370/329 |
| 2013/0003678 A1* | 1/2013 | Quan et al. | 370/329 |
| 2013/0022012 A1 | 1/2013 | Lee et al. | |
| 2013/0070689 A1* | 3/2013 | Liu et al. | 370/329 |
| 2013/0083713 A1 | 4/2013 | Johansson et al. | |
| 2013/0084869 A1 | 4/2013 | Johansson et al. | |
| 2013/0163532 A1* | 6/2013 | Anderson | H04W 72/04 370/329 |
| 2013/0242883 A1 | 9/2013 | Kalyanasundaram et al. | |
| 2013/0242973 A1 | 9/2013 | Bertrand et al. | |
| 2013/0288608 A1* | 10/2013 | Fwu | H04W 76/023 455/63.1 |
| 2013/0329678 A1 | 12/2013 | Pan et al. | |
| 2014/0016610 A1 | 1/2014 | Susitaival et al. | |
| 2014/0059233 A1 | 2/2014 | Anschutz et al. | |

FOREIGN PATENT DOCUMENTS

| | | |
|---|---|---|
| WO | 2011/082110 | 7/2011 |
| WO | 2011/126351 | 10/2011 |

OTHER PUBLICATIONS

3GPP TS 36.201 Version 10.0.0 Release 10 (Jan. 2011).
International Search Report and Written Opinion of the International Searching Authority issued in international application No. PCT/US2012/070812 on Feb. 26, 2013; 11 pages.
International Search Report and Written Opinion of the International Searching Authority issued in International Application No. PCT/US2012/070808 on Mar. 8, 2013; 10 pages.
Office Action issued in U.S. Appl. No. 13/719,608 on Jul. 8, 2014.
Office Action issued in U.S. Appl. No. 13/720,067 on Jun. 5, 2014.
International Preliminary Report on Patentability issued in International Application No. PCT/US2012/070812 on Jun. 24, 2014.
International Preliminary Report on Patentability issued in International Application No. PCT/US2012/070808 on Jun. 24, 2014.
Office Action issued in U.S. Appl. No. 13/719,667 on Oct. 1, 2014.
Notice of Allowance issued in U.S. Appl. No. 13/720,067 on Sep. 17, 2014.
Office Action issued in U.S. Appl. No. 13/719,543 on Jul. 15, 2014.
Extended European Search Report in European Application No. 12859181.5, dated May 27, 2015, 6 pages.
Motorola; "Performance of Scheduling Request Using Contention Free Channel"; 3GPP TSG RAN1#49-bis (R1-072668); Orlando, Florida; Jun. 235-29, 2007; 4 pages.
Texas Instruments; "Preamble-Based Scheduling Request: Comparison with Other Solutions"; 3GPP TSG RAN WG1 #48 (R1-070718); St. Louis, Missouri; Feb. 12-16, 2007; 8 pages.
Ericsson; "Scheduling Request in E-UTRAN"; 3GPP TSG-RAN WG2 #47bis (R1-070471); Sorrento, Italy; Jan. 15-19, 2007; 11 pages.
Extended European Search Report issued in European Application No. 12859457.9 on May 4, 2015; 8 pages.

* cited by examiner

METHOD IMPLEMENTED IN A USER EQUIPMENT

CLAIM OF PRIORITY

This application claims priority under 35 USC §119(e) to U.S. Patent Application Ser. No. 61/579,935, filed on Dec. 23, 2011, the entire contents of which are hereby incorporated by reference.

FIELD OF THE INVENTION

This invention relates to a method of sending and receiving scheduling requests within wireless communication systems.

BACKGROUND TO THE INVENTION

One of the challenges of wireless communications is that there is a finite amount of bandwidth available over the air, but an ever increasing population of mobile devices trying to access it. Through scheduling requests, devices are able to share radio resources and, when they require access to these resources, can be granted access to use them. Many wireless communication systems implement some form of scheduling requests, however it is emerging that these current solutions are unable to cope with the changing behaviour and requirements of modern mobile devices.

Long Term Evolution (LTE), a standard for high-speed wireless communication, comprises an Evolved UMTS Terrestrial Radio Access Network (E-UTRAN) coupled to an Evolved Packet Core (EPC) Network. In FIG. 1 the E-UTRAN 103 comprises one node type eNB 102 whilst the EPC 104 comprises 3 node types. Whilst the term eNB is used to denote the access node used for the Uu interface (interface that links the UE to the E-UTRAN), there are a variety of access nodes capable of operating on the Uu interface, such as relays, home eNode Bs, etc. Therefore, for the purposes of describing the embodiments herein, the term eNB may be used to refer to either the eNB, or to other access nodes performing equivalent or similar operations on the Uu interface. The Serving Gateway (SGW) 105 routes user-plane data within the core network, the Mobility Management Endpoint (MME) 106 handles mobility and connection control between the UE and the core network, and the Packet Gateway (PGW) 107 ingress/egress node routes data between the core network and external networks. FIG. 1 also shows the network interfaces between nodes The LTE system has 3 main uplink physical channel types: Physical Random Access Channel (PRACH), Physical Uplink Control Channel (PUCCH) and Physical Uplink Shared Channel (PUSCH), The Physical Random Access Channel (PRACH) is a contention-based channel where transmissions from multiple users need only be very loosely synchronised (time of arrival differences may be of the order of 0.1 s or more). Devices using PRACH normally communicate on an ad-hoc basis.

PUCCH and PUSCH orthogonal resources, on the other hand, require tighter synchronicity of devices (time of arrival difference of order of 5 μs or less within the cyclic prefix duration of a Single Carrier Frequency Division Multiple Access 'SC-FDMA' symbol) and therefore allow for multiple devices to use shared resources within the uplink system bandwidth.

SC-FDMA

SC-FDMA is the modulation scheme used in the uplink of LTE. The scheme has some similarities to Orthogonal Frequency Division Multiple Access (OFDMA) but also some key differences. In both OFDMA and SC-FDMA, the physical resource is sub-divided into a time-frequency grid of Resource Elements (REs), each RE consisting of one unit of frequency (one sub-carrier) and one unit of time (an OFDMA or SC-FDMA symbol duration). The OFDMA or SC-FDMA symbols are both pre-pended with a cyclic prefix (CP) (an end portion of the symbol is copied and inserted at the start of the transmitted symbol).

In both SC-FDMA and OFDMA, information bits to be transmitted may undergo steps of encoding (to form encoded bits) and the encoded bits are usually then mapped to data modulation symbols (for example, using QPSK, 16-QAM or 64-QAM modulation schemes). A key difference between OFDMA and SC-FDMA concerns how these data modulation symbols are mapped onto the time-frequency resources.

In the case of OFDMA, there is usually a one-to-one mapping of data modulation symbols onto sub-carriers. That is, N modulation symbols to be transmitted within one OFDMA symbol duration are each mapped to a corresponding one of a set of N sub-carriers.

Conversely, in the case of SC-FDMA, there is usually a one-to-many mapping of data modulation symbols to sub-carriers. That is, one data modulation symbol is mapped via a spreading operation to a set of (usually complex) numerical values, and each of these numerical values is then used to modulate a particular one of the N sub-carriers. Furthermore, other data modulation symbols may be mapped via a similar (and usually co-ordinated) spreading operation to the same set of (usually consecutive) N sub-carriers.

The spreading operations are usually co-ordinated in order to ensure that the multiple data modulation symbols remain orthogonal to one another. Therefore, the data modulation symbols may be transmitted from multiple devices and received with simple linear operations with low inter-device interference. This behaviour can increase spectral efficiency by allowing multiple devices with small amounts of information to transmit to share a set of subcarriers.

When multiple modulation symbols in one device are spread over the same set of subcarriers, each modulation symbol creates an additional set of N numerical values, and these are linearly combined (across the combinations from each of the contributing modulation symbols) to form the eventual numerical values that are used to modulate each sub-carrier. This linear combination of spread symbols can be viewed as a transform operation. The transform operation is usually designed to ensure that the resultant transmitted signal has a lower Peak-to-Average Power Ratio (PAPR) than its OFDMA counterpart. The transform operation may comprise a Discrete Fourier Transform (DFT) as is often used in the case of uplink transmissions for LTE, but other transforms are also possible that preserve a low PAPR of the transmitted signal. Similarly, when only one modulation symbol (e.g. either a data modulation symbol or a reference symbol) is transmitted over a set of sub-carriers, the spreading sequence is also designed to minimize its PAPR. In this case, spreading sequences with constant (or near constant) amplitude and zero (or low) autocorrelation ("CAZAC") properties are often used such as when constructing uplink reference signals or uplink physical control channel transmissions in LTE.

Thus, a data modulation symbol is transmitted over a set of N sub-carriers for SC-FDMA, whereas one data modulation symbol is transmitted over one sub-carrier in the case of OFDMA.

PUCCH and PUSCH

FIG. 2 shows an example structure of a sub-frame 210 spanning 1 ms in the time dimension and an uplink system bandwidth in the frequency dimension. The sub-frame comprises two slots of duration 0.5 ms each. The sub-frame 210 can be pictured as a collection of discrete blocks 220, each comprising 12 sub-carriers of 15 kHz each in the frequency domain and a single SC-FDMA symbol 260 in time. In this example, each resource block 250 (of PUSCH or PUCCH resource) comprises 12×14 resource elements (RE) within a sub-frame, where a RE is one sub-carrier unit of frequency and one SC-FDMA symbol 260 of time resource. The number of SC-FDMA symbols 260 per sub-frame may vary depending upon system configuration, thereby also affecting the number of REs per sub-frame. The system configuration may be a function of a cyclic prefix (CP) duration of the SC-FDMA symbols. The PUSCH resource 240 is located in the central frequency region with the PUCCH control regions 230 at the edges above and below. Within a resource block 250, certain SC-FDMA symbols may be used for reference signal (RS) purposes. Reference signals are signals known to the receiver and which may be used for estimation of the radio channel in order to improve demodulation and detection performance. In the example of FIG. 2, the $4^{th}$ SC-FDMA symbol of each slot is used for PUSCH RS. The symbol locations of RS for the PUCCH region may vary as a function of a PUCCH signal format. For example, for a PUCCH format 1 signal, the RS may be located on the $3^{rd}$, $4^{th}$ and $5^{th}$ SC-FDMA symbols of each slot, whereas for a PUCCH format 2 or PUCCH format 3 signal, the RS may be located on the $2^{nd}$ and $6^{th}$ SC-FDMA symbols of each slot.

Synchronised mobile devices know the time and frequency locations of these resources, hence the PUSCH resources 240 can be dynamically shared under the control of a scheduler (allocated using uplink grants within Downlink Control Information (DCI) messages sent on the Physical Downlink Control Channel (PDCCH). Generally it is within this PUSCH 240 resource that uplink user data is transmitted in the sub-frame 210.

The PUSCH 240 is the only physical channel to which the UL shared (transport) Channel (UL-SCH) may be mapped. Therefore when a user has data to transmit and uses the transport channel UL-SCH, it must first gain access to the PUSCH 240 and to do so must inform the scheduler at the base station (eNB) 102 of this need.

A PUSCH transmission may carry an Uplink Shared Channel (UL-SCH) transport block which may include user plane data, control information (like MAC headers) and RRC signalling. FIG. 3 shows the construction of an UL-SCH MAC transport block 300, made up of a MAC header portion 310 and a MAC Payload portion 320 which itself may comprise MAC control elements 330, MAC service data units (SDUs) 340 and MAC padding bits 350

The shared PUSCH resource 240 is available (under control by the scheduler) for all commonly connected devices to use for the transmission of data. The UEs may indicate to the eNB their need to access the shared PUSCH resource 240 by one of several methods, including i) executing a random access procedure on a Physical Random Access Channel (PRACH), ii) transmitting a Buffer Status Report (BSR) on a PUSCH resource previously allocated via dynamic scheduling to the UE, or transmitting a Dedicated Scheduling Request (DSR) on a PUCCH resource 230. The eNB may use such indications when determining its allocation of the PUSCH resources 240.

The PUCCH resource 230 is semi-statically configured for reporting channel quality or channel status indicators (like CQI/PMI/RI), and for dedicated scheduling requests (DSR) to aid the eNB in its allocation of PUSCH resources 240. Portions of the PUCCH resource 230 are dynamically allocated for reporting ACK/NACK information. To achieve the dynamic allocation of PUCCH for ACK/NACK, the PUCCH resource used for a particular ACK/NACK transmission may be associated with the location of a corresponding DCI message on PDCCH.

The current LTE system is designed around the premise that connected mode is used only for UEs 101 with recent data activity. Therefore, a common assumption is that on entering RRC connected mode, a user will be semi-statically assigned (usually for the duration of the connected mode stay) dedicated SR resources on PUCCH for the purposes of informing the eNB 102 of the UEs 101 need to transmit data on PUSCH, subsequent to a new arrival of data and having previously had an empty transmission buffer.

Therefore, in the current "dedicated SR" approach for connected mode users, each user is assigned its own reserved time/frequency/code resource on uplink, on which the UE 101 may send a signal to indicate its need to access the PUSCH.

PUCCH Format 1

The signal commonly takes the form of PUCCH format 1, illustrated in FIG. 4, which is formed using a combination of frequency domain spreading 410 and time domain spreading 420 of a single-valued modulation symbol d(0) (d(0) is set to the value "1"). The single-valued modulation symbol d(0) is spread in both the time and frequency domains such that it occupies all of the REs within the sub-frame and resource block on those SC-FDMA symbols that are not used for RS 430.

The presence of PUCCH format 1 on the UEs dedicated PUCCH resource is sufficient to indicate to the eNB that a UE needs to access PUSCH. The absence of PUCCH format 1 is interpreted by the eNB as "no current need to access PUSCH". Thus, PUCCH format 1 uses "on/off keying" to convey its information. Reference symbols 430 are inserted in the 3rd, 4th and 5th symbol locations of each slot (for a system employing normal cyclic prefix length).

There are also two additional variants of PUCCH format 1 that are defined within the standard, known as PUCCH format 1a and PUCCH format 1b. These have the same signal construction to that of PUCCH format 1 described above but allow for BPSK and QPSK modulation (respectively) of the symbol d(0). In this way, PUCCH format 1a may carry 1 bit of information (BPSK) and PUCCH format 1b may carry 2 bits of information (QPSK). These variants of PUCCH format 1 are used for transmission of Hybrid Automatic Repeat Request (HARQ) feedback, also known as ACK/NACK information.

PUCCH Formats 2 and 3

There are other PUCCH formats in the existing LTE specification, not used for DSR. PUCCH format 2 is used to carry Channel Quality Indicators (CQI), Precoding Matrix Indicators (PMI) and Rank Indicators (RI) for channel feedback purposes. PUCCH format 3 is also available for providing HARQ feedback (ACK/NACK) for PDSCH transmissions. Both of these formats can carry more data than PUCCH format 1.

DSR resources for different UEs may be multiplexed within the PUCCH resource in the time, frequency or code domains. Time multiplexing is achieved by assigning a sub-frame periodicity to each UE and assigning different sub-frame offsets to those UEs such that DSR transmissions occur at mutually exclusive times. Frequency multiplexing is achieved by assigning different resource blocks to different UEs such that DSR transmissions occur in mutually exclusive frequency regions. Code multiplexing is achieved by assigning different time and/or frequency-domain spreading sequences to different UEs such that DSR transmissions occur on different code resources which are separable by the eNB receiver. Combinations of time multiplexing, frequency multiplexing and code multiplexing may be used. A problem with the DSR scheme in PUCCH format 1 is that it does not scale well as the connected-mode user population is increased. As the connected mode population size increases, either the amount of total system UL resources that are needed (to reserve mutually exclusive PUCCH resources for each of the UEs) becomes excessive, or if the total DSR resources are constrained, the SR latency performance is then degraded (i.e. SR opportunities in time for a given UE necessarily become scarce due to the need to resort to large-scale time multiplexing of the users dedicated SR resources (e.g. a user's dedicated SR opportunity may arise only once every 40 or 80 ms or so).

The approach of relying on time-domain multiplexing to support a large connected mode population causes a problem in that access latency is then increased, since there is a high probability that the UE cannot send the SR immediately following the arrival of new data in the buffer. It is clear therefore that with the dedicated SR approach, a trade-off always exists between the amount of resources consumed or reserved, and the access latency. An example of this type of problem is shown in FIG. 5, where in this case, an SR opportunity 510 occurs only every 40 ms for a particular UE. If data arrives for UL transmission in-between the opportunities, the UEs need for UL transmission resources (on PUSCH) cannot be communicated to the eNB until the next opportunity—a time period of up to 40 ms.

Furthermore, when attempting to achieve low latency access, (requiring frequent DSR opportunities), the utilisation of those resources (i.e. occasions when a Scheduling Request (SR) is actually sent) reduces for a given offered SR load. For many common traffic profiles, a UE may send SR relatively infrequently and DSR resources are likely to be heavily underutilised. It can often be the case that less than 1% (even less than 0.1%) of the DSR resources are actually used by the UE to send SR and this may detract from overall system efficiency. If these unutilised resources were not reserved for DSR, they could have been reassigned for other purposes, such as for the transmission of user data or control data on UL, hence system capacity could have been improved.

Hence, it would be preferable to enable a scheduling request approach (intended primarily for connected mode users but not limited to such) which has the following attributes:

low access latency
use of an orthogonal multiple access scheme
efficient use of UL resources and high resource utilisation RACH One known alternative to the dedicated SR approach is the use of the existing random access procedure to inform the eNB of a UE's need for uplink resources. This is a multi-step procedure, as illustrated in FIG. 6, and is designed to transmit minimal information during the initial contention phase, step 610. In order to minimise the information sent, step 610 does not include the transmission of a user ID. In step 620, the eNB 102 responds with an uplink grant of resources for each detected preamble from step 610. Access contention may remain during message 3, step 630 and the contention resolution message of step 640 is used to resolve the contention between any users who selected the same initial preamble during step 610. The contention resolution message 640 may not be sent if the message 3 630 that is successfully decoded by the eNB was from a connected mode UE. In this case, the presence of the UL grant message 650 (addressed to the UEs C-RNTI) is sufficient to resolve contention and allow uplink data transmission 660.

Whilst the RACH procedure is relatively efficient, it does involve multiple steps and this can increase the access latency. Under some configurations, it also relies on a non-orthogonal multiple access scheme (which offers reduced capacity compared to the orthogonal PUCCH and PUSCH multiple access schemes). Furthermore, a portion of the resources on PRACH are expended in providing time guard regions and frequency guard regions to avoid interference from RACH users into other time/frequency UL resource regions of the system (such as PUCCH or PUSCH). Hence, again, resource usage efficiency for PRACH can be sub-optimal.

Furthermore, LTE PRACH occupies a wide bandwidth in the frequency domain (6 Physical Resource Blocks—PRBs). Thus, the provision of frequent RACH opportunities in time (to provide lower latency access) can then occupy a large proportion of the over uplink resource space. Therefore, the existing RACH procedure is designed more for initial access purposes and is not optimised for low-latency connected-mode scheduling request purposes.

SUMMARY OF THE INVENTION

In certain embodiments there is provided a method implemented in a user equipment UE for single carrier frequency division multiple access SC-FDMA within a wireless system comprising: receiving an assignment of a plurality of uplink scheduling request resources and comprising a plurality of SC-FDMA subcarriers of the wireless system; selecting one of the plurality of uplink scheduling request resources for transmission of scheduling requests; determining that a change in uplink scheduling request resource should be made; and upon determining that a change in scheduling request resource should be made, selecting another of the assigned uplink scheduling request resources for transmission of scheduling requests.

In certain embodiments there is provided a user equipment UE for single carrier frequency division multiple access SC-FDMA within a wireless system operable to perform the method.

In certain embodiments there is provided a wireless system comprising at least one such UE.

In certain embodiments there is provided a computer-readable medium comprising executable instructions that upon execution by a device perform the method.

BRIEF DESCRIPTION OF THE DRAWINGS

Examples of the present proposed approach will now be described in detail with reference to the accompanying drawings, in which.

DETAILED DESCRIPTION

PUCCH

In certain embodiments, a common or shared SR resource (CSR-resource) is assigned to a plurality of users for the purposes of sending scheduling requests that contain a user ID or part thereof. The CSR resource may reuse existing physical layer control channel (PUCCH) formats for the revised purpose of sending the SR containing the ID or part thereof. The reuse of existing LTE PUCCH format types (not originally designed for contention-based SR purposes) to carry the user ID reduces the need for physical layer redesign and enables the scheme to be used on existing or legacy hardware or firmware implementations. The scheme may use PUCCH formats capable of carrying more bits than the current PUCCH formats 1/1a/1b in order to allow a large number of users to share the same PUCCH resource.

Certain embodiments comprise explicitly sending a user ID (or portion thereof) to the eNB within a PUCCH signal construction (e.g. PUCCH format 2 or PUCCH format 3) during the access attempt on a common or shared resource assigned for contention-based scheduling request (CSR) purposes. Typically the resources assigned for this purpose will reside within the control ("PUCCH") frequency region of the uplink system bandwidth, although it is also possible that the resources are allocated within the data ("PUSCH") frequency region, or even entirely with the data ("PUSCH") frequency region. It can be required that only some UL resources are assigned to a plurality of users for the purposes of sending the user ID bits using PUCCH format signal constructions.

Figure 7:
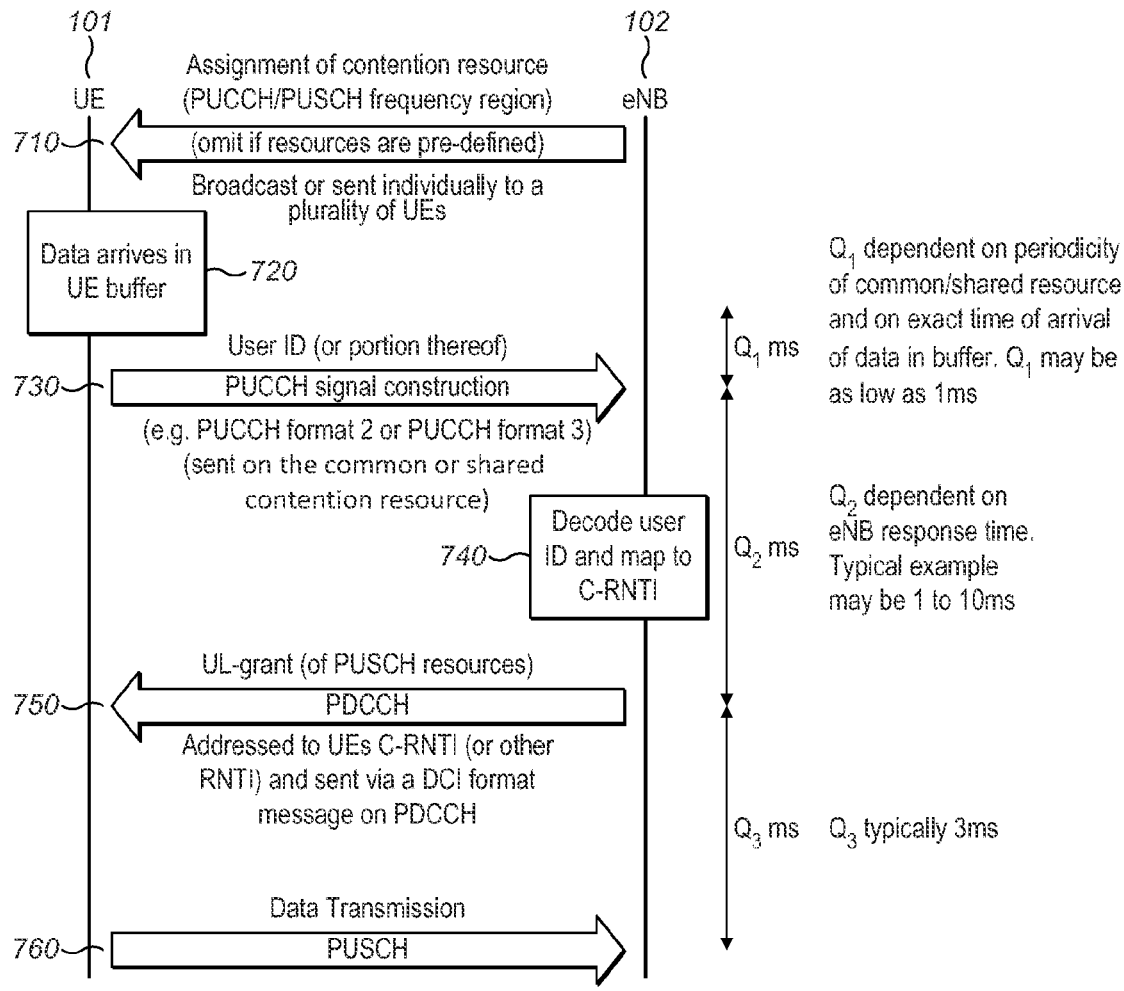
FIG. 7 illustrates the steps of a proposed SR method using PUCCH signal construction.

FIG. 7 shows the steps taken in certain embodiments:

1) As a precursory first step 710, an eNB optionally assigns a portion of uplink resources (in either the control (PUCCH) or data (PUSCH) frequency region) to a plurality of UEs for the purposes of contention-based scheduling request. The resource assignment may be conveyed via broadcast signalling or may be signalled individually to each of the plurality of UEs. This first step may be omitted if the resources are pre-defined, for example in a standard.

2) At some later point in time, pending data arrives in the UEs transmission buffer 720

3) The UE encodes a user ID (or portion thereof) using a PUCCH signal construction method (e.g. PUCCH format 2 or 3), and transmits 730 the signal on the assigned CSR resource 4) An eNB receiver decodes 740 at least the UEs transmitted signal from the CSR resource, and subsequently derives the UE ID using the decoded information.

5) The eNB proceeds to send a normal UL-grant message 750 to the UE to allocate it a portion of PUSCH resource for the transmission of data. The UL-grant message is conveyed in a Downlink Control Information (DCI) message sent over a Physical Downlink Control Channel (PDCCH).

6) The UE then has access to PUSCH and is able to send its data 760 to the eNB.

Figure 1:
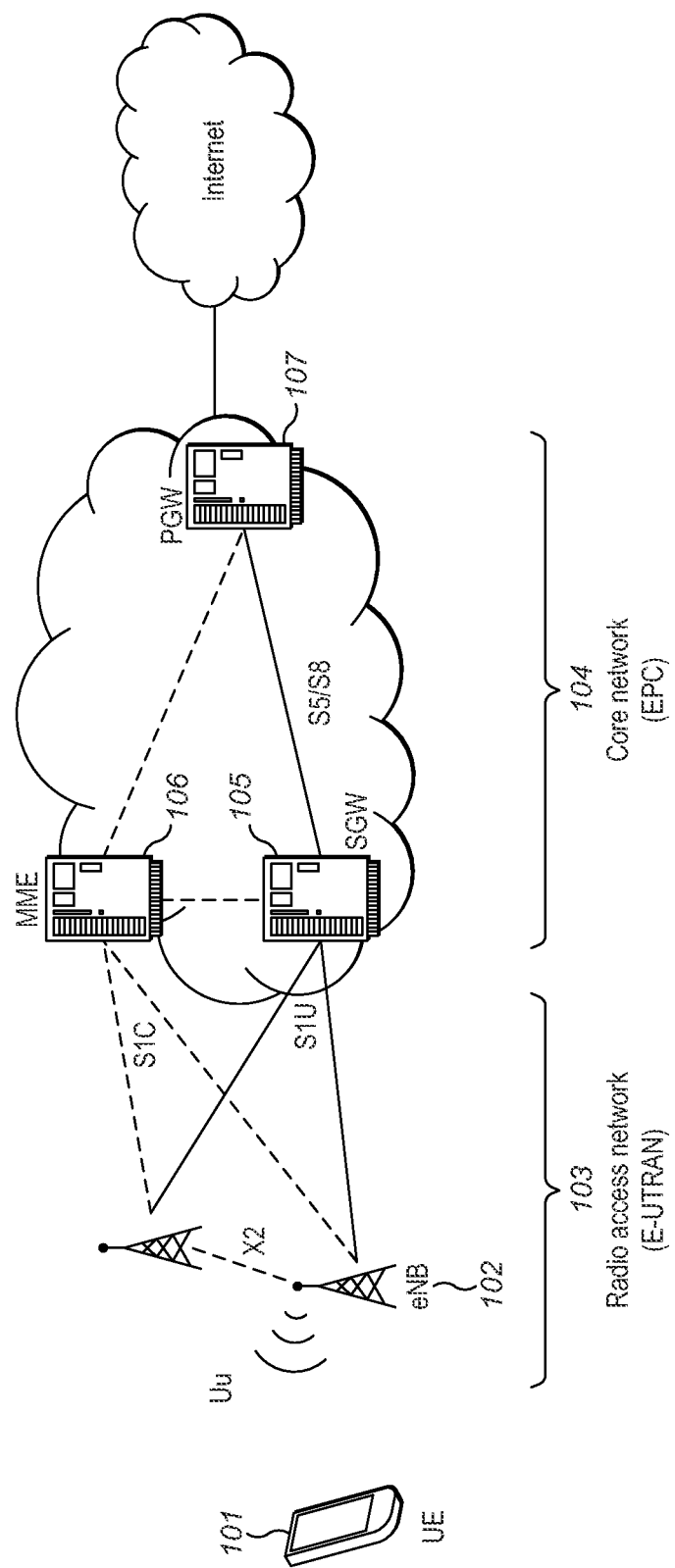
FIG. 1 shows an LTE Radio Access Network coupled to an EPC core network
Figure 2:
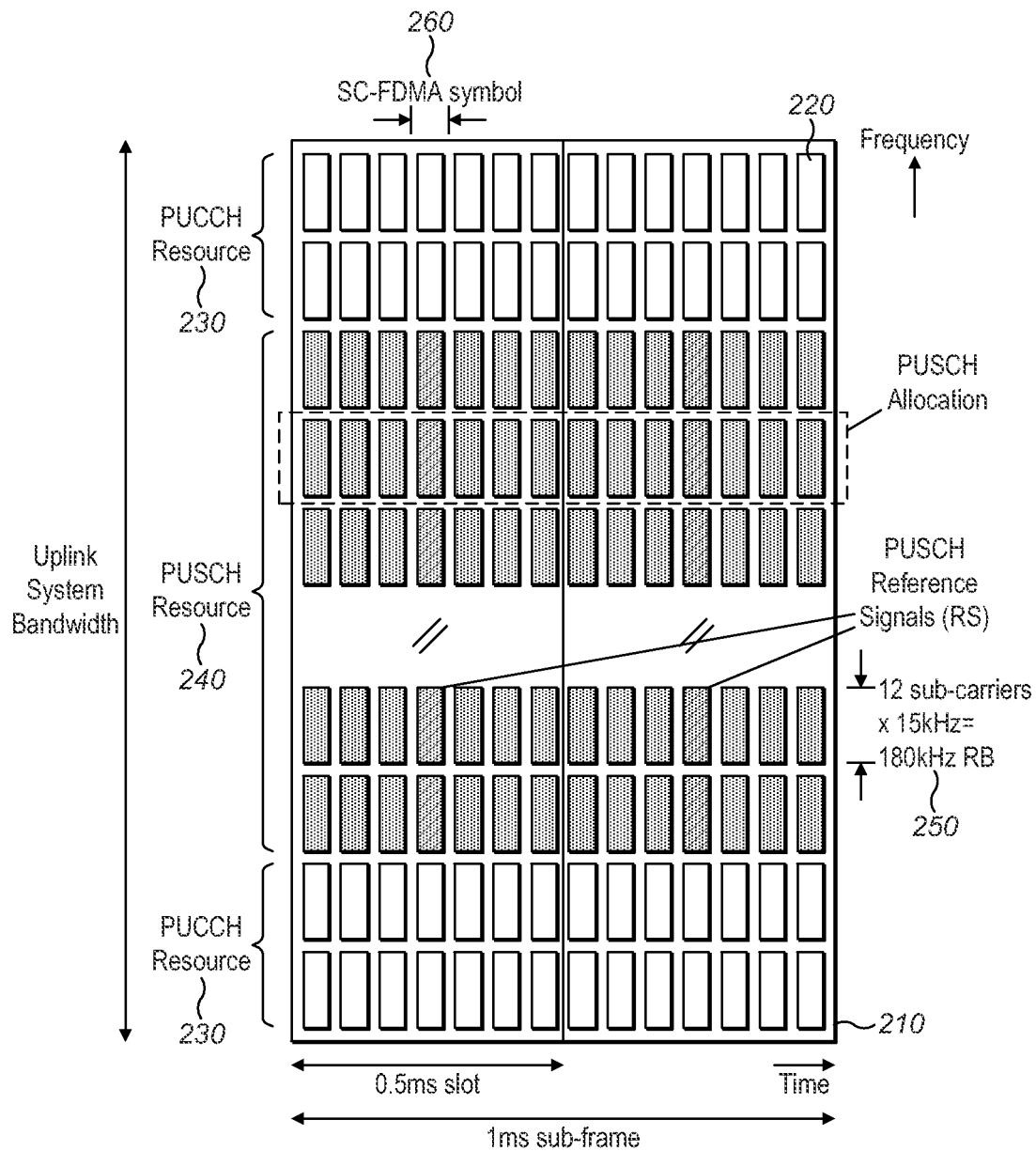
FIG. 2 shows an example arrangement of PUSCH and PUCCH resource blocks within an uplink bandwidth.
Figure 3:
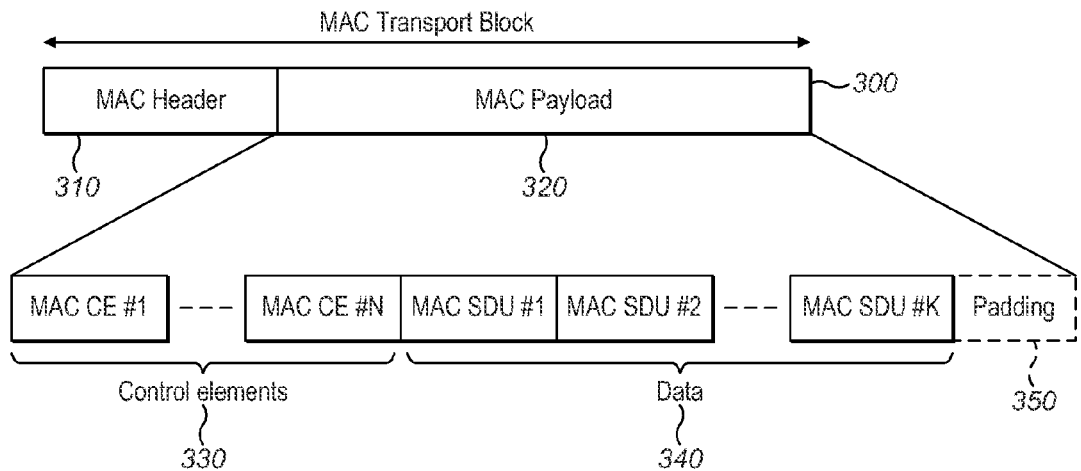
FIG. 3 shows the composition of a MAC transport block.
Figure 4:
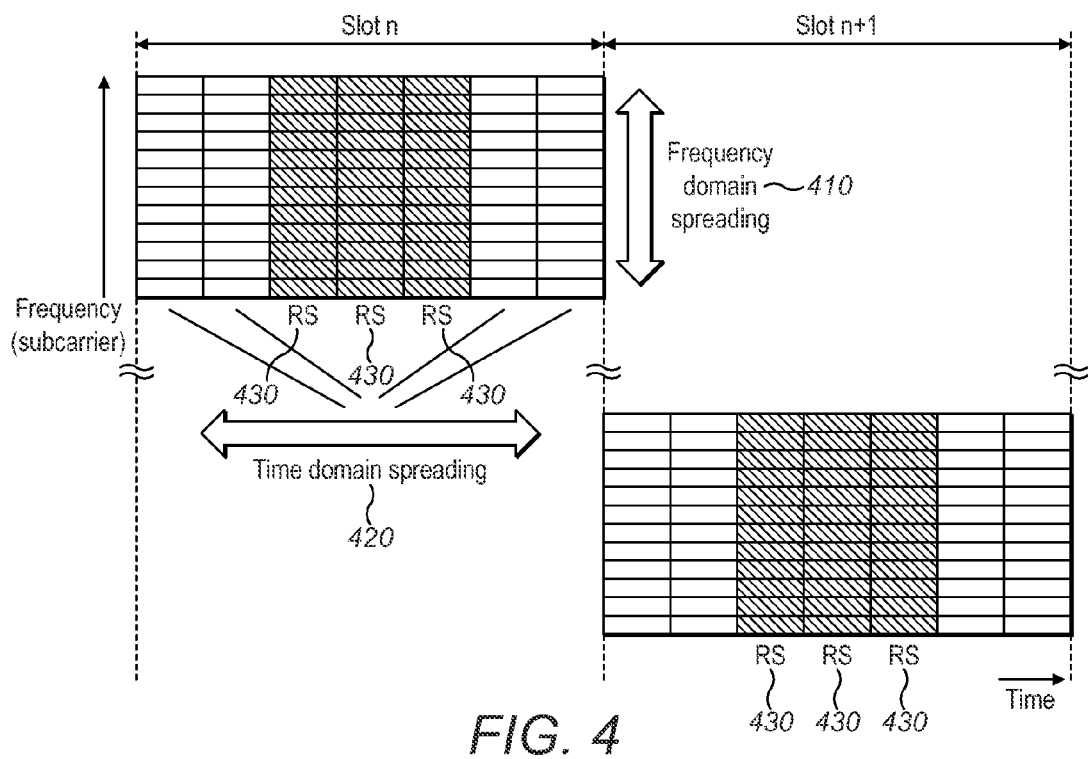
FIG. 4 shows the structure of a scheduling request using PUCCH format 1.
Figure 5:
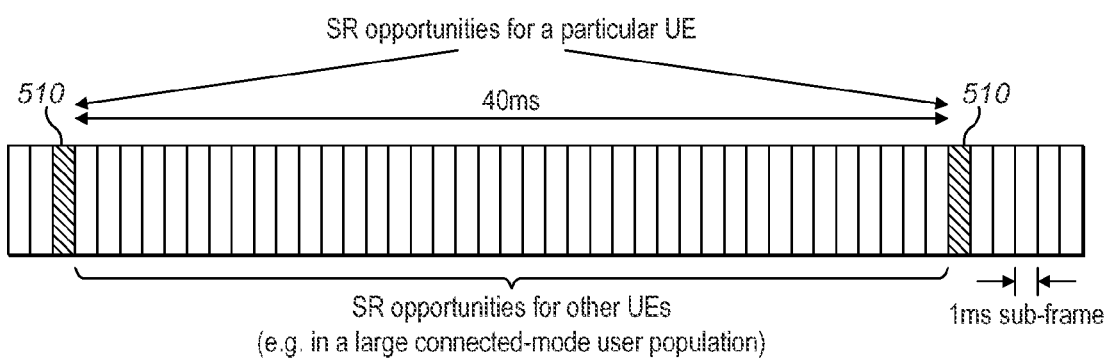
FIG. 5 illustrates the difficulty of multiplexing dedicated SR opportunities for large numbers of UEs.
Figure 6:
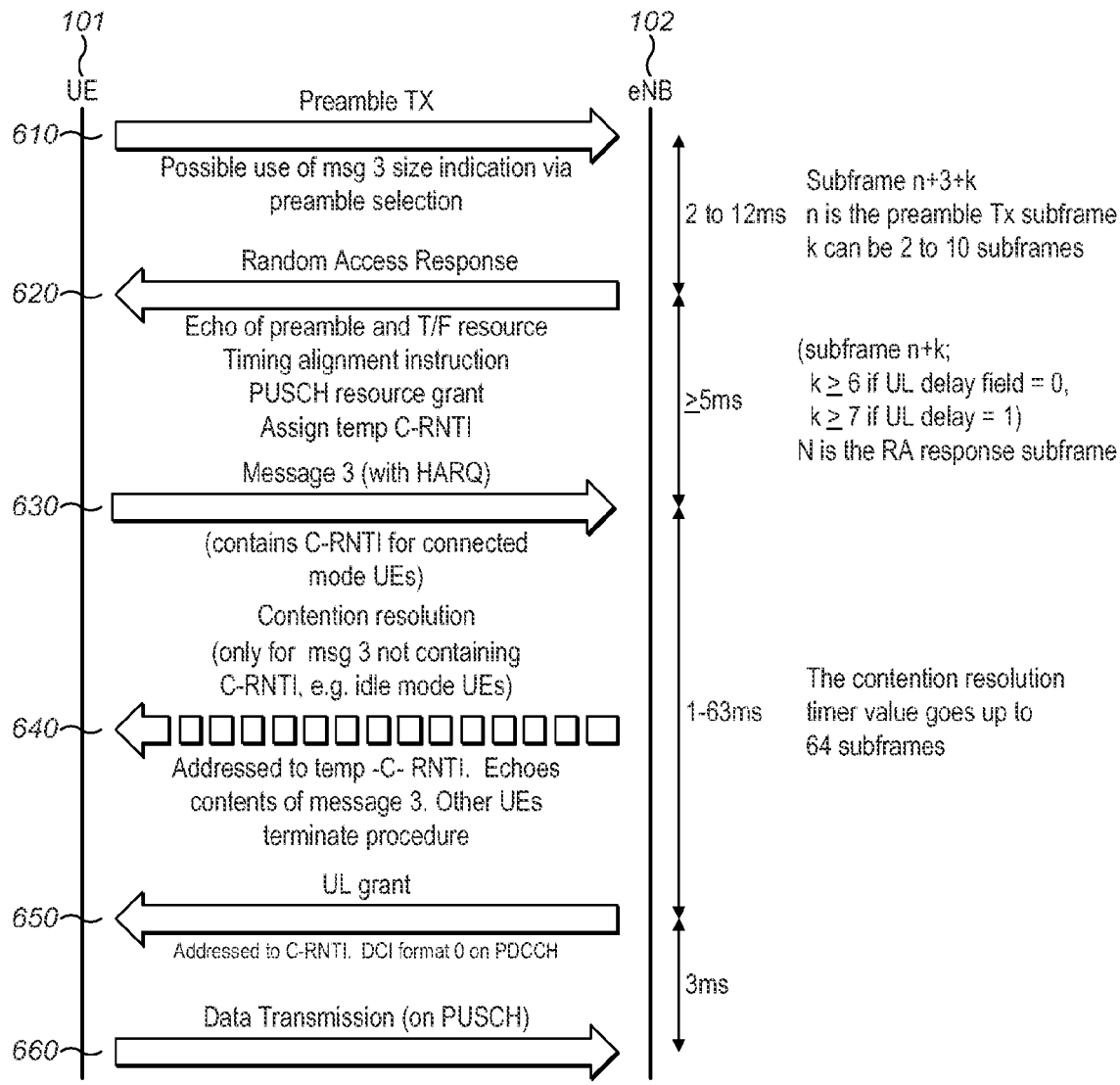
FIG. 6 illustrates the steps of a RACH procedure.

Compared to the RACH procedure in FIG. 6, the method shown in FIG. 7 involves fewer steps and therefore allows for a lower-latency scheduling request procedure.

The current LTE system uses PUCCH format 1 to carry dedicated SR. The underlying principle of dedicated SR transmission is that the user sending the scheduling request is distinguished by means of the particular (i.e. user-dedicated) time/frequency/code resources on which the SR was sent, rather than by means of sending an explicit ID via transmission bits that are demodulated by the eNB receiver.

The use of a contention-based resource (i.e. a common or shared portion of uplink time/frequency/code resource) for SR can significantly increase the resource efficiency of the SR access scheme when compared to the dedicated SR approach (even whilst achieving similar or better latency of access). However, when using a contention-based resource, the user sending the SR can no-longer be inferred by the eNB solely from the time/frequency/code resources on which the SR was sent. To minimise latency, and to reduce access contention it is preferable for the user ID (or part thereof) to be explicitly communicated to the eNB during the initial SR message sent by the UE on the CSR uplink resource.

PUCCH—Multiplexing

The CSR resource may be a portion of the PUCCH or PUSCH code/time/frequency region of the overall UL system resources of a cell (the overall UL system resources of a cell may optionally also comprise multiple component SC-FDMA carriers). Multiple UEs are provided or configured (e.g. by the eNB) with an allowance to transmit SR on the same CSR resource should they need to indicate that access to the PUSCH is required. The configuration provided by the eNB that defines the time, frequency and code locations of the CSR resource may be one of:
- predefined (within a standard)
- signalled to all UEs within a cell via broadcast system information
- signalled to a UE via one-to-one (dedicated) signalling For example, if PUCCH resources are assigned for contention-based SR (CSR), multiple users may be assigned the same PUCCH format 2 resource index $n_{PUCCH}^{(2,p)}$ (or the same resource index for another PUCCH format type, such as $n_{PUCCH}^{(3,p)}$ for PUCCH format 3).

The signalling providing the configuration of the CSR resource would preferably occur between peer RRC entities in the eNB and UE(s) respectively, but may also take place between peer MAC or physical layer entities of the eNB/UE(s). If the signalling occurs at RRC level, the signalling may reuse or partially reuse RRC signalling structures and messages, such as those used for dedicated SR, CQI, or SPS configuration in the current LTE system (with the same resource configuration being provided to each UE). Alternatively, modifications to the existing messages may be required in order to support configuration of the CSR resource.

Generally, the CSR resource may be time, frequency, or code multiplexed with user-dedicated PUCCH resource (such as may be used for dedicated SR or for the sending of channel state information such as CQI/PMI/RI) or with other resources such as PUSCH allocations. This allows for the new CSR scheme to be smoothly integrated into existing systems in which other PUCCH or PUSCH resources may continue to be used for such other purposes.

Figure 8:
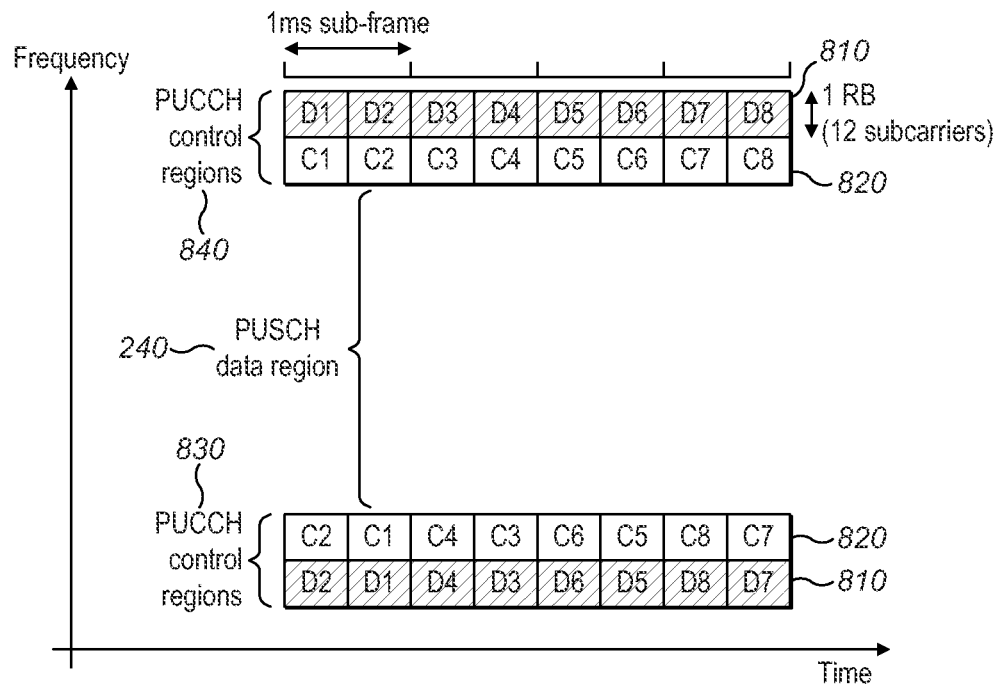
FIG. 8 illustrates the frequency multiplexing of common SR resources with UE-dedicated PUCCH resources.

An example wherein the common/shared SR resource is frequency multiplexed with dedicated PUCCH resource is shown in FIG. 8. In line with the current design in LTE, each square block corresponds to one Resource Block (RB) of frequency resource and one slot (0.5 ms) of time resource. Two 0.5 ms slots comprise one 1 ms sub-frame of time resource.

PUCCH resources reserved for UE-dedicated purposes are labelled D1, D2, ... D8 810, with each comprising two slots of transmission. As per the current LTE design, one of two slots belonging to the same PUCCH transmission is transmitted in the upper 840 or lower 830 PUCCH control region, whilst the other slot is transmitted within the opposite (lower 830 or upper 840 respectively) PUCCH control region. This may be used in order to provide frequency diversity and improved reliability of PUCCH reception.

PUCCH transmission opportunities for the new CSR are labelled C1, C2, ... C8 820, with each PUCCH comprising the same two-slot transmission arrangement in the upper 840 and lower 830 (or lower 830 and upper 840) PUCCH control regions. C1 ... C8 820 are frequency multiplexed with D1 ... D8 810 in that they occupy different RBs within the overall system bandwidth of the uplink.

Figure 9:
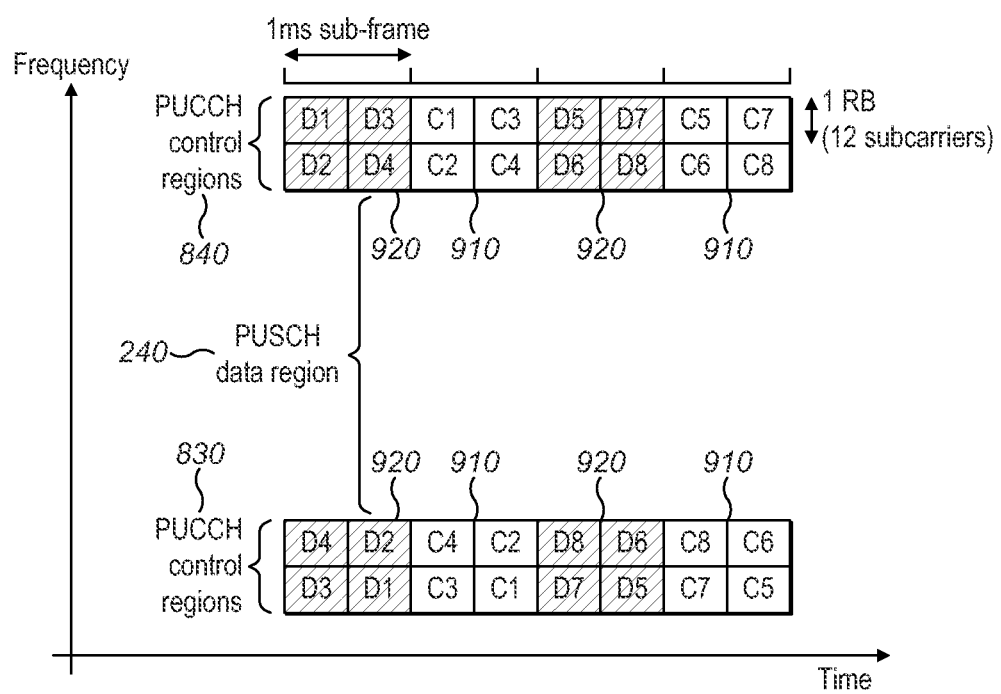
FIG. 9 illustrates the time multiplexing of common SR resources with UE-dedicated PUCCH resources.

An alternative multiplexing arrangement is shown in FIG. 9 wherein common/shared SR resources on PUCCH 920 (denoted C1 ... C8) are time multiplexed with UE-dedicated PUCCH resources 910 (denoted D1 ... D8). An example of time multiplexing is shown here at the sub-frame level although time multiplexing at the slot level is also possible.

Figure 10:
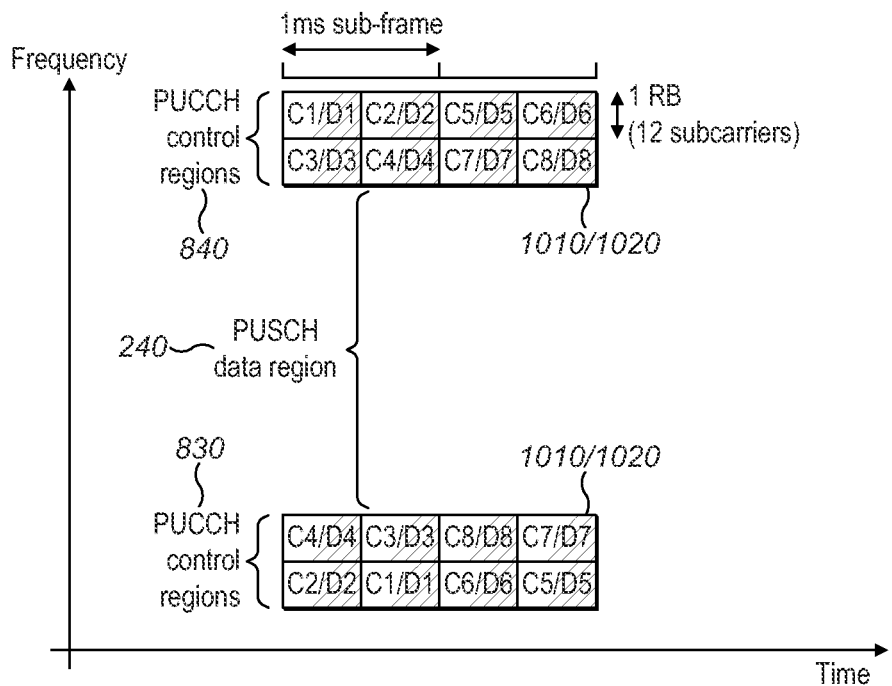
FIG. 10 illustrates the code multiplexing of common SR resources with UE-dedicated PUCCH resources.

A yet further alternative multiplexing arrangement is shown in FIG. 10 wherein common/shared SR resources on PUCCH 1010 (denoted C1 ... C8) are code multiplexed with UE-dedicated PUCCH resources 1020 (denoted D1 ... D8).

The code multiplexing may be achieved for example via the assignment of cyclic shifts (or cyclic shift patterns) of a frequency-domain spreading sequence for the common/shared PUCCH resource that are different within a sub-frame and resource block to those assigned to the UE-dedicated PUCCH resource. The code multiplexing could also be achieved via the use of different time-domain code sequences or different 2D time-frequency codes for the common/shared PUCCH 1010 resource and the UE-dedicated PUCCH resource 1020.

Combinations of the frequency multiplexing, time multiplexing and code multiplexing schemes of FIG. 8, FIG. 9, and FIG. 10 respectively may also be used.

The CSR resource (conveying PUCCH-like SR signals) may also reside within the PUSCH frequency region 240, and may be multiplexed with other PUSCH transmissions in either the time or the frequency domain. A scheduler within the eNB may take into account the presence or absence of the CSR resource within a given time/frequency resource space when determining the availability of upcoming PUSCH resources and when allocating those resources to UEs. For example, the eNB scheduler may determine not to dynamically schedule a PUSCH resource to a UE if that PUSCH resource is instead reserved for CSR transmissions.

To carry a set of bits that explicitly convey the user ID (or part thereof), one of the existing PUCCH formats that carries a plurality of bits for demodulation (for example used in the existing system to convey CQI or other channel state information (CSI), or to carry multiple HARQ ACK/NACK feedback bits) can be reused for the purposes of sending an SR (containing the explicit bits) on the CSR resource.

Primary candidates from the set of existing PUCCH formats to use for this new purpose of sending an explicit user ID are PUCCH format 2 and PUCCH format 3. Other new or modified PUCCH formats having potentially different payload sizes may also be considered, as may variants of existing PUCCH formats (e.g. formats 2a and 2b).

Figure 11:
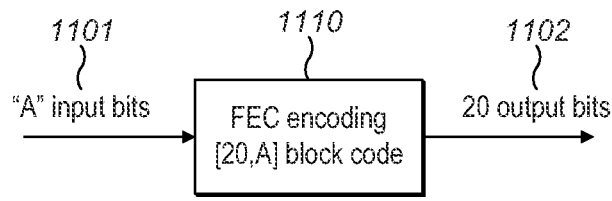
FIG. 11 is a simplified block diagram of FEC encoding for PUCCH format 2.

PUCCH format 2 is used in the existing LTE system to send CQI/PMI/RI reports. When reusing PUCCH format 2 for the purposes of sending a user ID during CSR, instead of transmitting channel state information such as CQI/PMI/RI, an ID unique to the transmitting user (denoted here CSR-uRNTI) and comprising $N_{ID}$ bits is encoded and transmitted via one or more PUCCH format 2 transmissions. The number of PUCCH transmissions required to convey the whole of the user ID is equal to:

$$N_{TX} = \lceil N_{ID} \cdot A \rceil$$

where A is the bit payload available within the PUCCH format under consideration. For example, A may be 13 for PUCCH format 2, constrained in this case by the maximum input length to the [20,A] FEC block encoder 1110 as illustrated in FIG. 11 where A (13) input bits 1101 would be FEC encoded to 20 output bits 1102. However, various values of $N_{ID}$ and A may be used.

In the LTE system, connected mode users are allocated a Cell Radio Network Temporary Identifier (C-RNTI) comprising 16 bits and in one example, the user ID used for CSR purposes (CSR-uRNTI) may be set equal to the C-RNTI, and hence $N_{ID}=16$.

Figure 12:
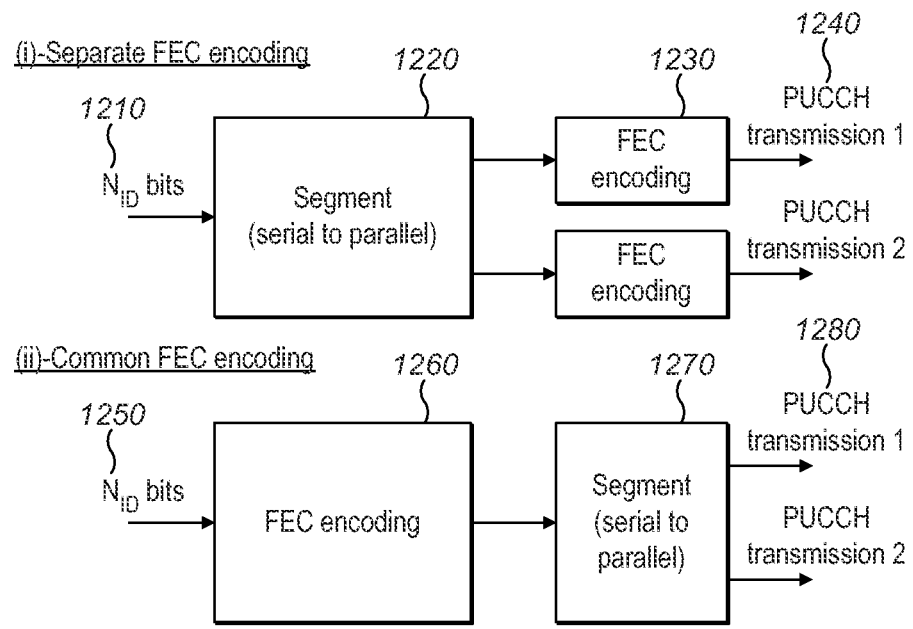
FIG. 12 is a simplified block diagram showing two possible methods of performing FEC coding where a plurality of PUCCH transmissions are required.

For these larger values of $N_{ID}$ (for example $N_{ID}=16$) the $N_{ID}$ bits could be transmitted using one or more than one PUCCH transmission. If more than one PUCCH transmission is used, two options exist for carrying $N_{ID}$ bits over the plurality of PUCCH transmission instances:

i. The $N_{ID}$ bits 1210 are segmented 1220 into $N_{TX}$ groups and each is separately FEC encoded 1230 and mapped to its own PUCCH transmission instance 1240 within a sub-frame, as illustrated in FIG. 12(*i*) for $N_{TX}$=2.

ii. The $N_{ID}$ bits 1250 are input to a single (and modified) FEC encoder 1260 and the output bits are segmented 1270 into $N_{TX}$ groups which are subsequently mapped to their own PUCCH transmission instances 1280, each within a sub-frame, as illustrated in FIG. 12(*ii*) for $N_{TX}$=2.

For example, for the case of A=8, there would be a need for $N_{TX}$=2 PUCCH transmissions in order for a user to transmit a 16-bit CSR-uRNTI on the CSR resources to the eNB (i.e. the ID is carried using two segments). The transmission segments could be transmitted on adjacent or non-adjacent sub-frames). The eNB would need to know which of the two (or multiple) PUCCH transmissions carries the first segment in order that the full CSR-uRNTI may be correctly reassembled. For example, the resources carrying the new PUCCH SR could be organised in pairs of resources separated in frequency/code/sub-frame or otherwise so that the eNB could easily reassemble the complete message once the resource pair has been received. To do so, it is conceivable that certain sub-frames available for CSR are designated as starting sub-frames, in which users transmit the 1st segment of a multiple-segment PUCCH transmission carrying a user ID (the remaining segments being transmitted thereafter in other sub-frames existing in-between successive starting sub-frames). Furthermore, the starting sub-frames could be different for each user, this being signalled explicitly to each user, or being derived as a function of a user ID.

Alternatively, it may be preferable to restrict the necessary number of PUCCH transmissions to 1 (no segmentation), in which case the information payload of the PUCCH must be greater than or equal to $N_{ID}$ bits. If PUCCH format 2 is used, the following possibilities exist:

1) $N_{ID}$>13 (e.g. $N_{ID}$ is equal to the C-RNTI length of 16 bits)
   a. A new [20,A] encoder supporting A>13 could be used (to carry e.g. $N_{ID}$=16 bits)
   b. The modulation level for PUCCH format 2 could be increased from QPSK to (for example) 16-QAM, thereby allowing for 40 encoded bits to be carried
      i. This could be used in conjunction with a new [40,A] code, or reuse of the existing [20,A] code with repetition (or similar post processing of outputs from one or more [20,A] codes)
2) $N_{ID}$ is constrained to be ≤13 (in order to comply with max(A)≤13 for the existing FEC block encoder)

In case (2) above, it could be possible that the eNB assigns to the UE a CSR-uRNTI that is shorter than the C-RNTI (e.g. CSR-uRNTI ≤13 bits). In general, the CSR-uRNTI could be associated with or derived from the user's C-RNTI. For example, the CSR-uRNTI could comprise a subset of the 16 bits of the C-RNTI, or could be formed via one or more mathematical operations such as a hashing function using or based on the C-RNTI (or other RNTI or ID). The CSR-uRNTI could instead be signalled by the eNB to the UE explicitly within a signalling message addressed to the UE. Alternatively, parameters used in describing the linkage between a user's C-RNTI and the CSR-uRNTI could be transmitted to the UE (with each user then deriving its own CSR-uRNTI based on the received parameter information and its knowledge of its own C-RNTI). The parameters may be broadcast within a cell (sent within system information transmitted by the cell), or may be sent to each UE individually.

Figure 13:
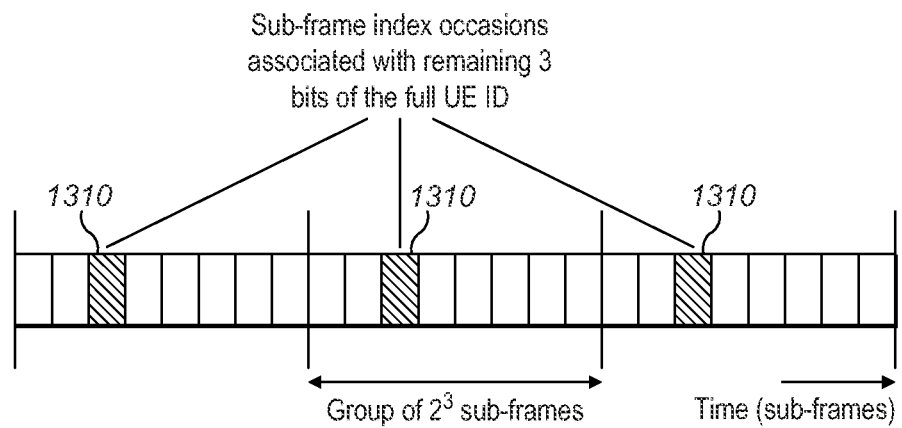
FIG. 13 illustrates the time domain separation of CSR resources.

A further option under case (2) above is that a portion (e.g. ≤13 bits) of a longer user ID is explicitly conveyed via the PUCCH format transmission, whilst the remaining bits are carried or are otherwise known implicitly. FIG. 13 illustrates a scheme of time-domain segmentation of CSR resources used for carriage of implicit UE ID bits where a user ID length is required to equal to 16 bits (e.g. C-RNTI). Here 13 bits of the C-RNTI could be carried explicitly via a PUCCH format 2 transmission within one sub-frame (i.e. A=13), whilst the remaining 3 bits could be associated with one of $2^3$=8 possible sub-frame locations 1310. In this example, CSR resources that are assigned by the eNB are divided into 8 groups, each group being associated with a sub-frame index within a set of 8 CSR sub-frames, and each sub-frame index being associated with a particular realisation of 3 C-RNTI bits (000, 001, 010, . . . 111). A UE therefore knows to associate its UE ID with one of the 8 sub-frame indexes and elects to transmit its CSR only on sub-frames having that index. Thus, on reception and decode of an explicit 13 bit sequence (partial ID) on a given sub-frame index, the eNB is able to determine a full 16-bit UE ID and to schedule PUSCH resources to that UE (for example using the UEs C-RNTI) accordingly. Note that although the sub-frames are shown as adjacent in time, these may also be separated by intervening periods of time (sub-frames) on which no CSR resources are allocated (for any user) by the eNB.

Whilst the advantage of this time-multiplexing scheme is that the whole UE ID is transmitted within 1 sub-frame (some bits are carried explicitly whilst others are implicitly conveyed via selection of the appropriate sub-frame), as a result there may be an increase in latency compared to the case where the whole UE-ID can be transmitted on any sub-frame meant for the CSR resource (i.e. the need to introduce the time-multiplexing component may also increase the scheduling request latency).

Extensions to this scheme of partial-ID explicit transmission (supplemented by implicit conveyance of the remaining bits) are also possible utilising not only time-domain separation of resources to implicitly convey the additional bits, but also (or in substitute) using frequency or code domain resources separations to do so. Notably, by using code or frequency domain multiplexing instead of time multiplexing, this may avoid the introduction of any increase to the scheduling request latency, whilst still enabling conveyance of the full user ID via a mix of explicit and implicit signalling.

Figure 14:
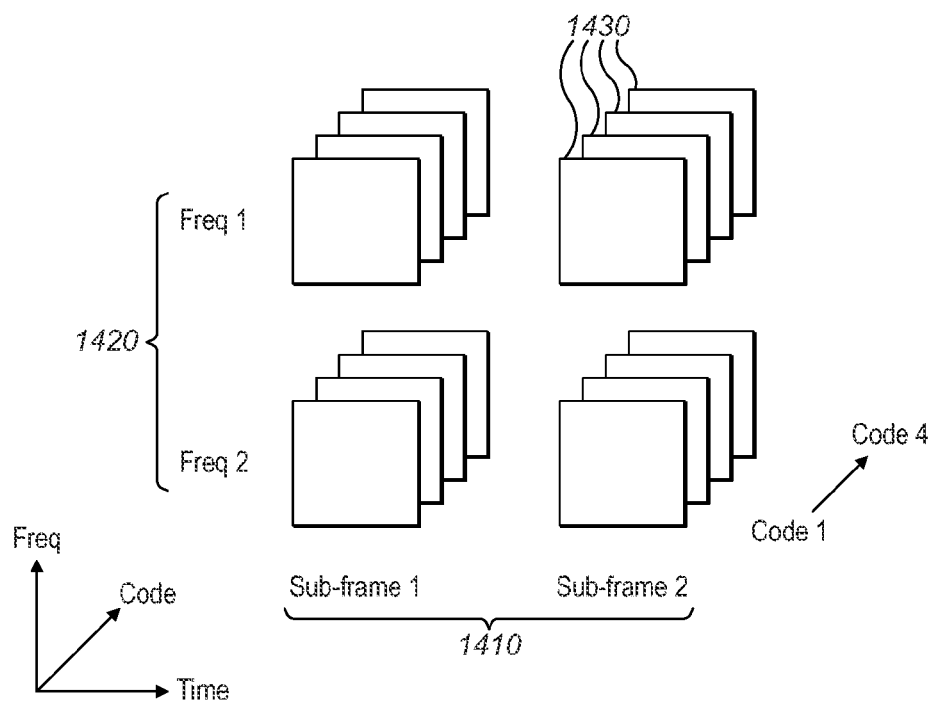
FIG. 14 illustrates the orthogonality of time, frequency and code separations.

Thus, in another example, 12 bits of a 16-bit user ID could be explicitly signalled within a PUCCH transmission, and the remaining 4 bits could be conveyed via selection of one of $2^4$=16 time/frequency/code resources. These 16 separated resources could comprise for example 2 sub-frames in the time domain 1410, 2 resource blocks in the frequency domain 1420 and 4 cyclic shifts of a frequency domain spreading code 1430. Thus, the total number of separated resources is 2×2×4=16. Such a scheme is shown in FIG. 14 although it will be appreciated that numerous variations are possible, involving varying degrees of time domain, frequency domain and code domain resources. Schemes involving only frequency-domain separation, only code domain separation or only time domain separation are all possible. Furthermore, for the case of code-domain separation, the individual codes may be formed via time domain spreading, frequency domain spreading, or both (2D codes).

If it is preferable to transmit a larger user ID using explicit means, and to also avoid the need for segmentation into multiple PUCCH transmissions, a further option is to employ a PUCCH format with a larger payload capacity than PUCCH format 2. For example, if the CSR-uRNTI is set equal to the C-RNTI and all 16 bits are to be transmitted explicitly in full, the existing PUCCH format 3 could be employed, which is capable of carrying A=21 bits via a payload of 48 encoded bits and offering a user multiplexing capability of 5 users per RB within a sub-frame.

In cases where the payload size allows, in addition to the CSR-uRNTI or C-RNTI bits, there is a possibility to transmit additional data along with the user ID bits. For example, the data could be other control information, such as CQI/PMI/RI or buffer status information, or could be a small amount of user-plane data. Alternatively, only the user ID bits could be sent via the PUCCH format 3 transmission.

PUCCH Format 2

Similarly, existing PUCCH formats could be adjusted in order to support higher-order modulation levels (higher than the current QPSK). For example, use of 16-QAM on PUCCH format 2 would retain the same PUCCH code multiplexing capability (maximum of 12 possible cyclic shifts of the frequency domain spreading code) whilst simultaneously enabling transmission of 40 encoded bits. A new FEC code (e.g. [40,16]) could then be used to convey all 16 bits of a C-RNTI user ID, or all bits of a CSR-uRNTI. Again, the additional payload space available could be used to carry other control information (such as CQI/PMI/RI, or buffer status information) or even to carry user plane data in addition to the user-ID bits included in the scheduling request transmission.

Figure 15:
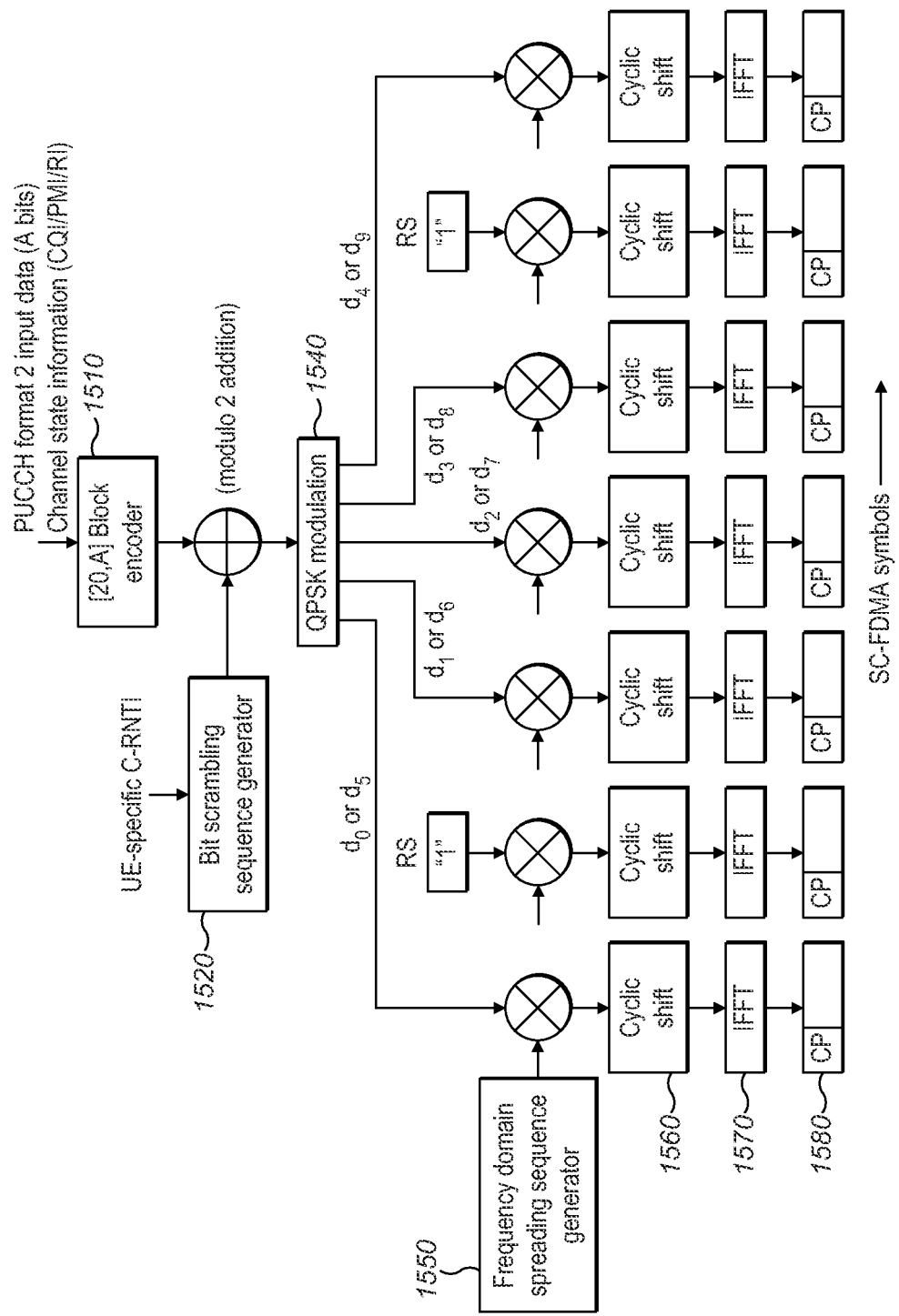
FIG. 15 is a block diagram showing the steps for constructing part of a PUCCH format 2 sub-frame.

FIG. 15 shows the construction of an existing PUCCH format 2 signal (for some blocks, only the $1^{st}$ slot of a 2-slot sub-frame is shown). "A" input bits (A<=13) are input to an FEC encoder 1510 which outputs 20 encoded bits. These are scrambled using a UE-specific bit scrambling sequence, generated by bit scrambling sequence generator 1520 as a function of the UEs C-RNTI. The 20 scrambled bits undergo QPSK modulation 1540 to form 10 modulation symbols (5 modulation symbols d(0) . . . d(4) for the $1^{st}$ slot and 5 modulation symbols d(5) . . . d(9) for the $2^{nd}$ slot). Each of the modulation symbols are separately mapped to a corresponding one of 10 SC-FDMA symbol branches (5 per slot). For each branch, the modulation symbol is spread using a length-12 frequency domain "base" spreading sequence generated by generator 1550. A cyclic shift 1560 is applied, wherein different cyclic shifts may be applied to different SC-FDMA symbol branches, the cyclic shifts being determined by a pseudo-random function of a cell ID, a slot number, and the symbol number that corresponds to each SC-FDMA symbol branch. Unlike the bit scrambling sequence, the pseudo random function that determines the cyclic shifts is cell specific, as it depends on a cell ID rather than an ID assigned to a UE, such a C-RNTI. The result of each cyclic shift operation is input to an IFFT 1570 in order to form the corresponding SC-FDMA symbols 1580. A cyclic prefix (CP) is pre-pended to each SC-FDMA symbol.

Figure 16:
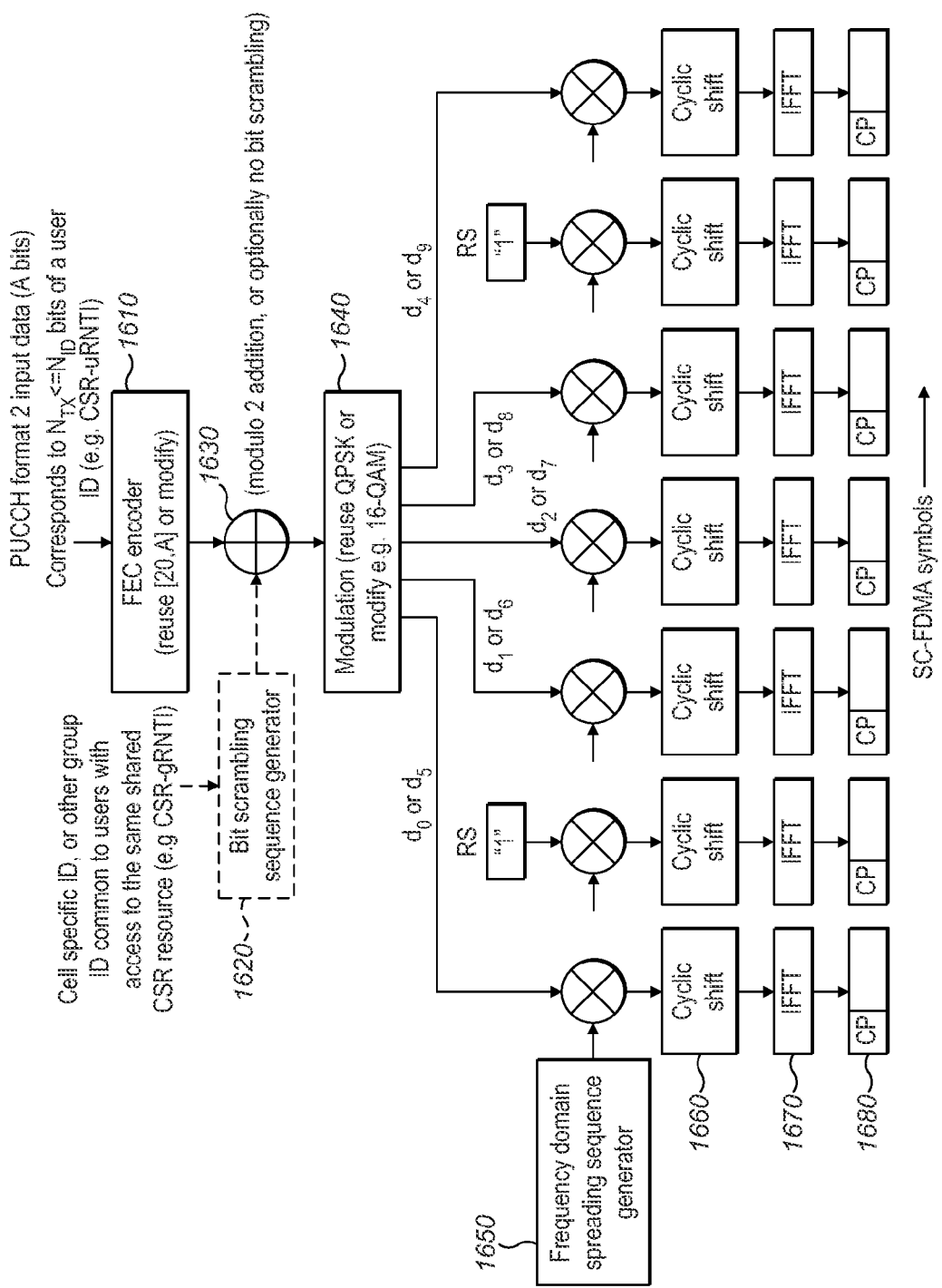
FIG. 16 is a block diagram showing the steps of constructing part of a PUCCH format 2 sub-frame, modified for sending user ID information.

FIG. 16 shows an overall view of how PUCCH format 2 could be modified to send explicit bits of a user ID. $N_{TX}$ bits of the full user ID (of length $N_{ID}$) are input to an FEC encoder 1610, where $N_{TX} \leq N_{ID}$. Depending on the sizes of the input and output of the FEC encoder, the existing [20,A] block code may be reused, or a new block code (or encoding scheme based on one or more constituent block codes) with different supported input and output lengths may be used. A further alternative is that no FEC encoder is used or a simple repetition code is employed. Further coding schemes are possible within this generic FEC encoding block, for example convolutional codes (tail-biting or non-tail-biting), turbo codes, or low density parity check (LDPC) codes could be employed.

Due to the fact that the modified PUCCH format 2 will not be sent on dedicated SR resources, the output bits from the FEC encoder need not be scrambled with a user specific scrambling sequence. This is because the eNB receiver does not know which user(s) will transmit on the CSR resource. Instead, a bit scrambling sequence is used that is common to all (or multiple) users who may transmit on the same CSR resource of a cell. The scrambling sequence may be generated by a scrambling sequence generator 1620, and the generator may be initialised with a value. However so derived, the scrambling sequence may be based upon one or more of: a CSR group RNTI (CSR-gRNTI), a cell ID, a sub-frame index, a time-slot index. Alternatively, a specific or pre-defined scrambling sequence may be used. In other embodiments, a cyclic-shift-specific or code-specific scrambling sequence may be used. In yet further embodiments, a sub-frame or resource-block specific scrambling sequence may be used. It is also possible that no bit scrambling is employed (i.e. the modulo 2 addition block 1630 is absent from FIG. 16), or equivalently, the bit scrambling sequence is set to "all zeros". All of these non-user-specific bit scrambling schemes advantageously allow the eNB receiver to perform the descrambling operation before it has identified the user(s) who have transmitted an SR on the CSR resource of a cell, thereby avoiding the need to blindly determine the scrambling sequence used and simplifying the eNB receiver.

The output from the bit scrambling block (modulo 2 addition block 1630) or alternatively the direct output from the FEC encoder 1610 (if no bit scrambling is employed), are input to a modulation block 1640 in order to form complex output symbols d0 . . . d4 (for the 1st slot of a sub-frame) or symbols d5 . . . d9 (for the 2nd slot of a sub-frame). The modulation block may implement QPSK or may implement another form of modulation such as BPSK, 8-PSK, or 16-QAM.

The modulated symbols are spread using a frequency domain spreading sequence 1650 (for example, of length 12 such that the symbol occupies one Resource Block—RB—of frequency resource). Each symbol may use the same or a different cyclic shift of the same spreading sequence. In both cases, a "base" cyclic shift may be selected by the UE, possibly at random from an allowed set of base cyclic shifts. If each symbol uses the same cyclic shift 1660, the base cyclic shift is applied to each symbol. In the case that different cyclic shifts are employed on different symbols, the base cyclic shift may be permuted for each symbol in accordance with a cell-specific cyclic shift hopping pattern. The hopping pattern may be based upon a pseudo-random sequence generator (not explicitly shown) as is used within the current specifications for PUCCH format 2 and described with respect to cyclic shift 1660. Alternatively, no cyclic shift hopping may be employed. Following the frequency domain spreading operation, an IFFT operation 1670 is performed on each frequency-domain symbol in order to form time domain SC-FDMA symbols 1680 for transmission. A cyclic prefix is added to each SC-FDMA symbol via copying of an end portion of the symbol and pre-pending the copied end portion to the start of the symbol.

Comparing FIG. 16 with FIG. 15 shows more clearly the modifications made to the PUCCH format 2 constructions. At the block encoder 1510, the unmodified PUCCH format 2 construction takes channel state information (CQI/PMI/RI) as the input rather than user ID information. The bit scrambling sequence generator 1520 is based only on UE-specific C-RNTI and there is no option not to utilise bit scrambling and modulo 2 addition 1530. Additionally, in FIG. 15 the FEC encoder 1510 and modulation block 1540 are unmodified whereas the corresponding blocks of FIG. 16 FIG. 15 may be modified. Furthermore, the frequency domain spreading sequence 1650 and/or the cyclic shift(s) 1560 of FIG. 15 may be selected (for example at random) from an allowed set by the UE. The allowed set may be associated with a cell or with a specific CSR time or frequency resource within a cell.

PUCCH Format 3

Figure 17:
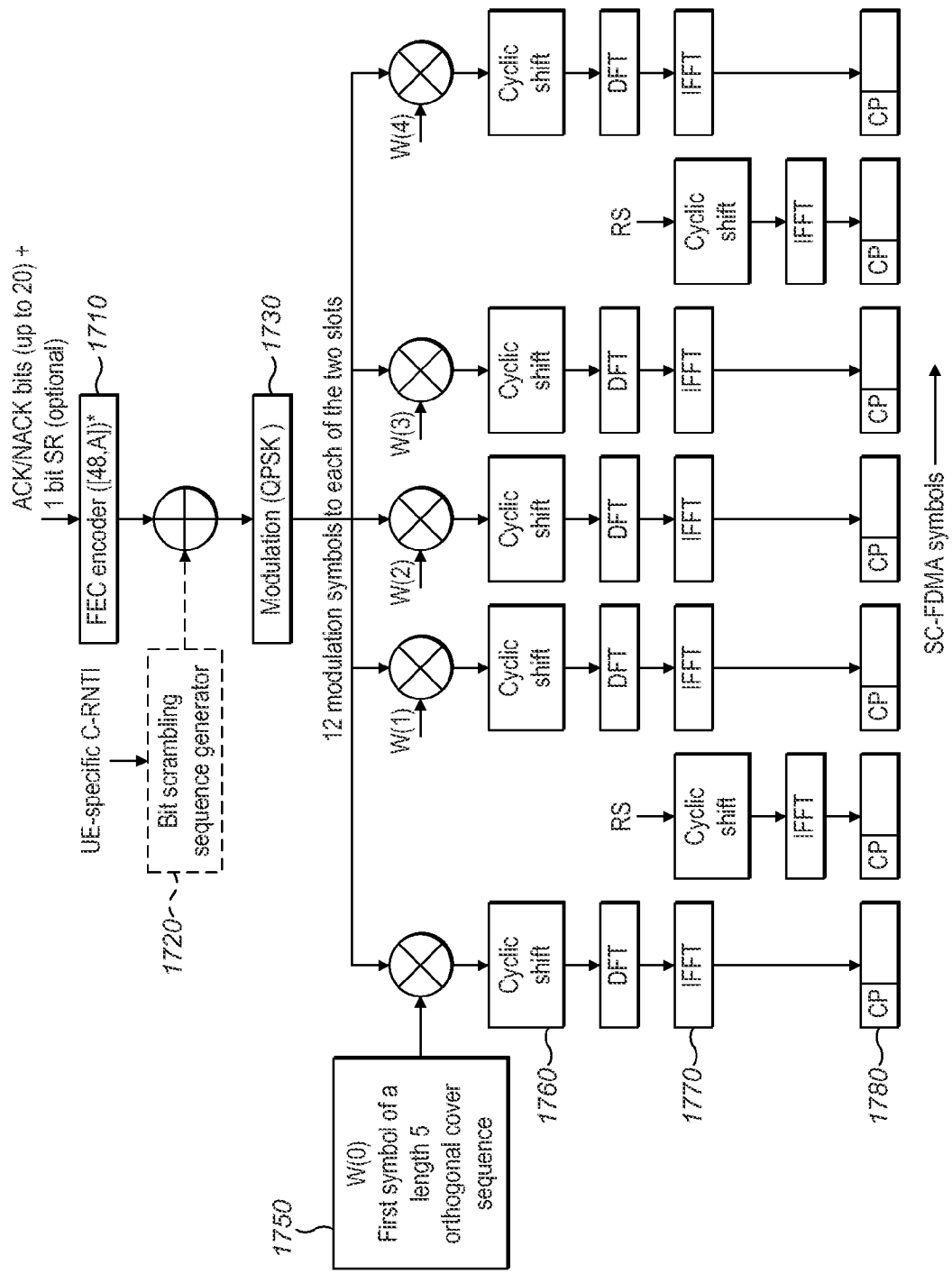
FIG. 17 is a block diagram showing the steps for constructing part of a PUCCH format 3 sub-frame.

Due to its limited payload size, there is little room (without using a higher order modulation or a new FEC code) within the current PUCCH format 2 construction to transmit a CRC or other information in addition to a user ID (although this is not precluded). However, PUCCH format 3 has a higher payload size and this can allow greater potential for additional information to be carried alongside the user ID. FIG. 17 shows the construction of an existing PUCCH format 3 signal (for some blocks, only the $1^{st}$ slot of a 2-slot sub-frame is shown). Up to 20 ACK/NACK bits are input to an FEC encoder 1710 which outputs 48 encoded bits. These are scrambled using a UE-specific bit scrambling sequence, generated by bit scrambling sequence generator 1720 as a function of the UEs C-RNTI. The 48 scrambled bits undergo QPSK modulation 1730 to form 24 modulation symbols (12 modulation symbols for the $1^{st}$ slot and 12 modulation symbols for the $2^{nd}$ slot). The 12 modulation symbols for one slot are replicated for each of the slot's 5 SC-FDMA symbols, and for each of these SC-FDMA symbol branches, the symbols are multiplied by a corresponding element of a length-5 orthogonal cover sequence 1750. A cyclic shift 1760 is applied that is determined by a cell specific pseudo random function similar to that used in cyclic shift generator 1560. The result of each cyclic shift operation is input to a Discrete Fourier Transform (DFT) operation. For each SC-FDMA symbol branch the output of the DFT is input to an IFFT 1770 in order to form the corresponding SC-FDMA symbols 1780.

Figure 18:
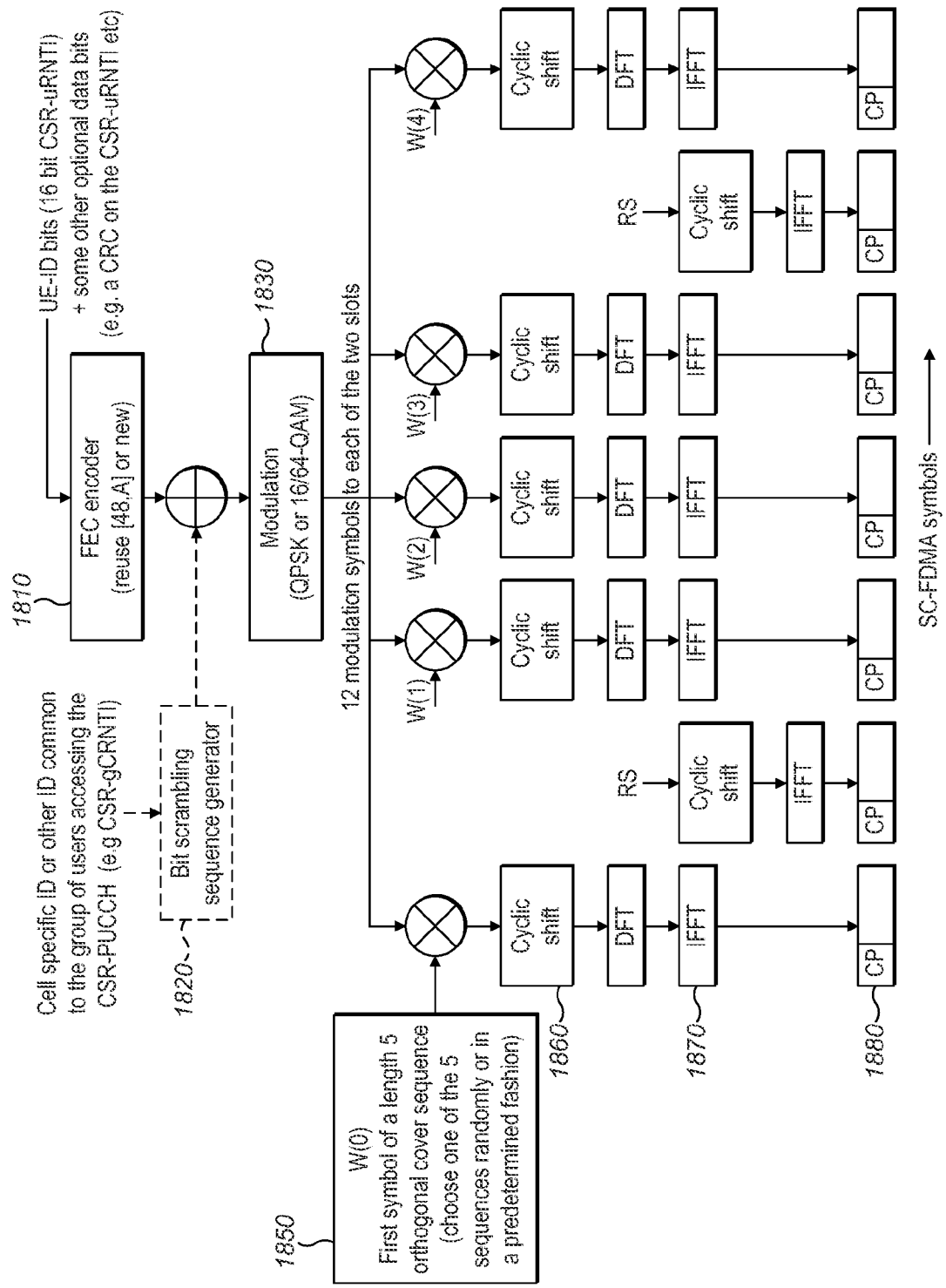
FIG. 18 is a block diagram showing the steps for constructing part of a PUCCH format 3 sub-frame, modified for sending additional information.

FIG. 18 shows the modified coding of a traditional PUCCH format 3 (FIG. 17) to send up to 16 bits of CSR-uRNTI (e.g. C-RNTI) and optionally some additional bits (up to 5) whilst still reusing the existing PUCCH format 3 construction comprising FEC encoder 1810, bit scrambling sequence generator 1820 and modulation block 1830. Note that unlike the PUCCH format 2, coding an orthogonal cover sequence 1850 of length 5 is applied to the modulated symbols before the SC-FDMA transformation. The additional 5 bits of space available could be used for instance to add a CRC to the transmitted C-RNTI, to send channel state information (such as CQI/PMI/RI), or to send other data such as buffer status information or even small amounts of user data. If higher order modulation is used (eg: 16/64 QAM), further additional bits can in theory be transmitted. Like in traditional PUUCH format 3, after the cover sequence 1850 is applied, a cyclic shift 1860 is applied, followed by a DFT operation and then input to an IFFT 1870 to form the corresponding SC-FDMA symbols 1880.

CRC Attachment

Within the payload of bits carried by a contention-based-SR PUCCH format, a cyclic redundancy check (CRC) may also be employed. This may help for example to reduce the probability of false alarm or incorrect detection of the UE ID at the eNB. In this variant the input to the FEC encoder is altered to allow for CRC bits to be included.

False alarms occur when the eNB detects a valid scheduling request on a particular SR resource but no SR was sent on that resource. Various methods of reducing the occurrence of false alarms may be employed, such as measuring the received power of data or reference signals and comparing the measured power to a threshold in order to decide whether an SR transmission was present or absent.

Methods such as these may also be augmented (or substituted) with alternative schemes based on the use of a CRC to help discriminate between the presence and absence of an SR transmission. In general the number of CRC bits used may therefore be dependent on:
- the number of user ID bits being carried
- the level of false alarm protection required
- the performance of complimentary (i.e. non-CRC-based) solutions to the false alarm problem If no other false-alarm avoidance measures are adopted, relatively long CRCs may be required. For example, if a 0.1% false alarm probability was desired, a 10-bit CRC may be needed to ensure a 1/1024 false alarm rate. Conversely, the number of CRC bits could be considerably reduced (or the need for a CRC could be eliminated) if other complimentary non-CRC methods are employed to reduce the false alarm rate.

The addition of an increased number of CRC bits reduces the space available for FEC coding redundancy for a constrained number of coded output bits. Thus, the number of CRC bits must be traded-off against FEC protection.

Figure 19:
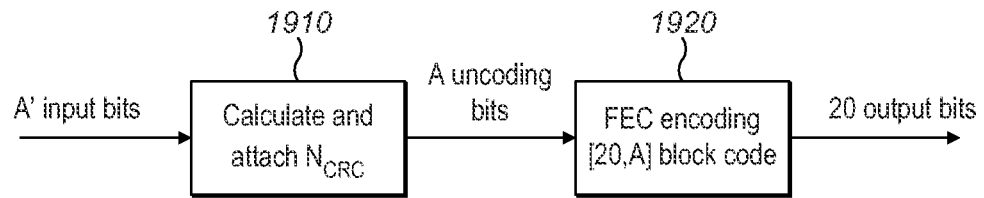
FIG. 19 is a simplified block diagram illustrating the CRC attachment and FEC encoding steps for a proposed variant of PUCCH format 2.

If CRC bits are included prior to encoding, the block encoding step (which accepts an input of A input bits) is preceded with a CRC encoder. As shown in FIG. 19, the CRC encoder 1910 accepts an input of A' bits and outputs A bits to the block encoder 1920, where $A=A'+N_{CRC}$.

In the example of PUCCH format 2, $1 \le A \le 13$, and the block encoder 1920 that follows the CRC addition stage 1910 then produces an output codeword of length 20 bits. As has been previously described, the length of the input and output of the block encoder may vary for other existing or modified PUCCH formats.

Figure 20:
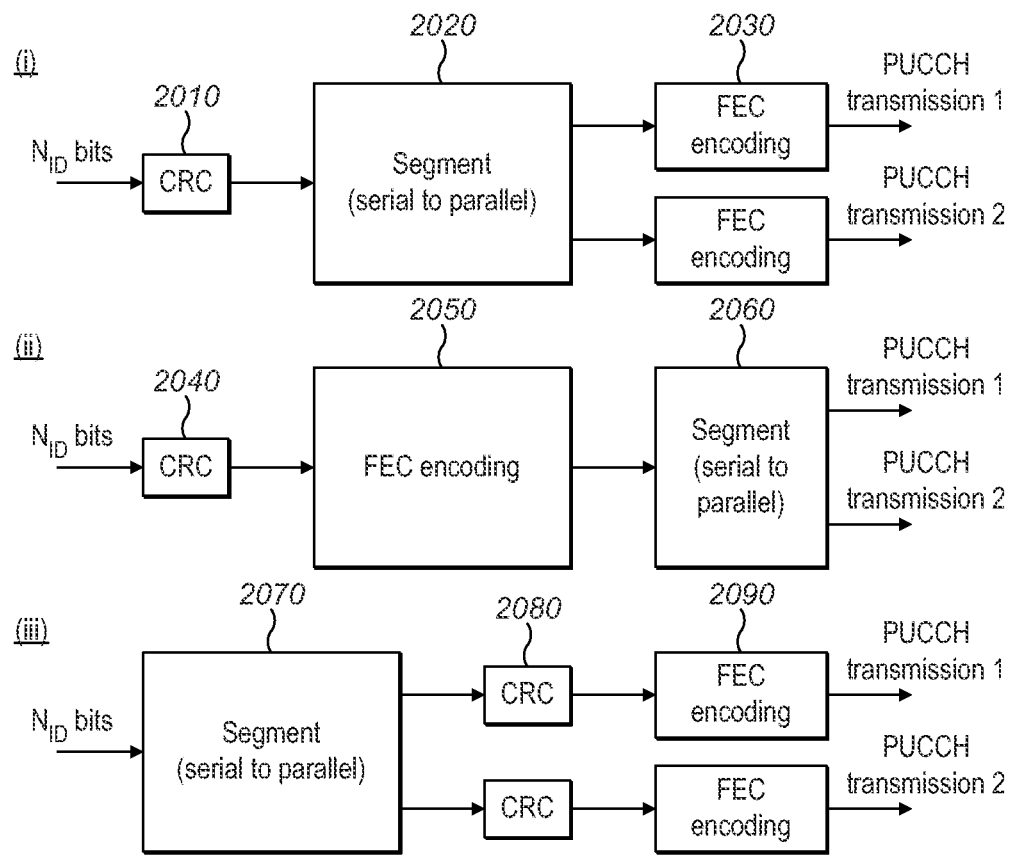
FIG. 20 is a block diagram indicating alternative CRC attachment options where a plurality of PUCCH transmissions are required.

As described previously, the $N_{ID}$ bits could be transmitted using one or a plurality of PUCCH transmission instances. With reference to FIG. 12, if more than one PUCCH transmission is used, the $N_{ID}$ bits may be either segmented 1220 into $N_{TX}$ groups prior to separate FEC encoding 1230, or the output of a single encoder 1260 may be segmented 1270 into $N_{TX}$ groups. In either case, the bits corresponding to each of the $N_{TX}$ groups may then be carried via a PUCCH transmission instance within a sub-frame. FIG. 20 illustrates three options for deriving the CRC:
i) One CRC 2010 is calculated-over (and appended to) the full $N_{ID}$ bits. Following segmentation 2020, the resulting bits are transmitted over the $N_{TX}$ PUCCH transmission instances, each using separate FEC encoding stages 2030
ii) One CRC 2040 is calculated-over (and appended to) the full $N_{ID}$ bits. The resulting bits undergo a common FEC encoding stage 2050 and following segmentation 2060, are transmitted over the $N_{TX}$ PUCCH transmission instances.
iii) The $N_{ID}$ bits are first segmented 2070 into $N_{TX}$ PUCCH transmission instances. A CRC is calculated 2080 per PUCCH transmission instance and separate FEC encoding stages 2090 are used for each.

Collision Aspect

Some embodiments of the scheme may be intentionally designed in order to minimise the need for changes (e.g. at the physical layer, MAC or RRC layers) to the existing LTE system. If existing PUCCH formats can be reused for the purposes of sending a user ID or part thereof, it is possible not only to reuse much of the existing UE transmission architecture but also to minimise or even eliminate the need for changes to some of the eNB receiver layers (in particular, the physical layer). That is, the reuse of existing PUCCH formats to convey a user ID or part thereof, may not require modifications to the eNB physical layer, and need only allow passing of the demodulated and decoded user ID to the eNB scheduler in order that the UEs request for access to PUSCH resources may be taken into account in the upcoming schedule.

When a UE determines a need to send a scheduling request on the CSR resources, there is the possibility that another UE with allowance to use the same CSR resources, also sends an SR at the same time (i.e. within the same sub-frame). If the two transmitting users select different frequency or code assignments within the same sub-frame, the two scheduling requests remain separable by the eNB and, following demodulation and decoding of each, the eNB scheduler may grant both users with access to PUSCH (sending a separate PDCCH message to each user on downlink).

However, there is also the possibility that two (or more) users transmit a scheduling request on the same time (subframe), frequency and code resources. In this situation, different user IDs (or parts thereof) are sent on the same resource and the transmissions may not be easily distinguishable or separable by the eNB receiver (although more advanced techniques based upon spatial separation of the signals may be implemented). For simplicity, it may be preferred that no changes are required for the eNB receiver's physical layer processing and in this case, the eNB will attempt to decode the received "composite" signal (comprising the transmissions from both UEs) as a single UE transmission.

Each transmitted user signal $s_u(t)$ (with "u" in this two-user case taking values of 1 or 2), will be subject to modification en-route to the eNB by the intervening radio propagation channel with impulse response $h_{u,k}(t)$ for the $k^{th}$ receive antenna at the eNB (for simplicity in this example, each UE has a single transmit antenna).

The composite received signal (arriving on a particular time/frequency/code resource) comprises the linear superposition of the two signals received from each of the colliding UEs, and so at the $k^{th}$ receive antenna, the received signal (ignoring the channel noise) is:

$$r_k(t) = s_1(t) \otimes h_{1,k}(t) + s_2(t) \otimes h_{2,k}(t)$$

Schemes are possible in which UEs with colliding data transmissions use the same or different reference signals. However, for the existing PUCCH formats, the time/frequency/code resources used for transmission of data symbols have a predetermined relationship to the time/frequency/code resources used for the demodulation reference signals (DMRS). If this principle is maintained, colliding UEs will use the same resources for their data symbols in addition to using the same resources for their DMRS.

In the case that the transmissions for the colliding UEs do use the same reference signals, the eNB receiver will (usually following FFT processing to transform the received time-domain signal into the frequency-domain) form a frequency-domain channel estimate:

$$\hat{H}_k = FFT\{h_{1,k}(t) + h_{2,k}(t)\} + n$$

The term n is used here to represent channel estimation noise or error.

The eNB will then perform frequency-domain channel equalisation (to "undo" the effects of the channel as best as possible) and will combine the signals received from each of its receive antennas. The resulting equalised and combined signal is then sent to further processing units. The further processing units may comprise operations equivalent-to or the-inverse-of those known to have been employed by the UE transmitter(s), including for example, one or more of:

A frequency-domain despreading unit
A time-domain despreading unit
A bit descrambling unit
A demodulation unit
An FEC decoder unit The output of the FEC decoder (the decoded ID) is either directly used by the eNB as the user ID (e.g. C-RNTI or CSR-uRNTI), or the C-RNTI is derived via a known association between the decoded ID and the C-RNTI.

It can be shown however, that in the absence of significant thermal noise or other interference, the case wherein two users simultaneously transmit different IDs on the same time/frequency/code resource results in the decoded ID being equal to either the ID for user 1, or the ID for user 2 (and not another ID). For this to occur, the following aspects may exist:

1. Both UEs use the same reference signals (RS)
    a. UEs may have independently selected the same PUCCH resource index, (e.g. $n_{PUCCH}^{(2,p)}$ or $n_{PUCCH}^{(3,p)}$) or may have been configured to use the same resource index value
    b. UEs sending SR on the same CSR resource use the same cyclic shift hopping patterns (e.g. cell-specific hopping as is used for the current PUCCH formats) for the RS symbols within a subframe, or alternatively no cyclic shift hopping is employed for the RS symbols.
2. Both UEs use the same bit scrambling sequence during PUCCH construction (or alternatively no bit scrambling is applied)
    a. The common bit scrambling sequence may be based upon a CSR-gRNTI, a cell-ID, or other resource-specific parameters.

In these circumstances, the decoded output is unlikely to be equal to an ID other than that of either user 1 or user 2. This may be advantageous for the SR transmission scheme, since in the event of a collision, the eNB will still determine that one of the users requires access to PUSCH resources (that is, it is not the case that both users destructively interfere and both are lost).

Thus, when two or more users collide, the eNB still is able to schedule PUSCH resources for one of the users. The other (not received/not-decoded) user(s), will not receive an UL grant from the eNB and will attempt a re-try of its scheduling request at another CSR opportunity. To control SR retransmissions, the UE would typically be configured to set a prohibit timer to a predefined (or potentially randomised) start value whenever an SR has been sent, and would attempt a re-try only once the prohibit timer has expired.

Figure 21:
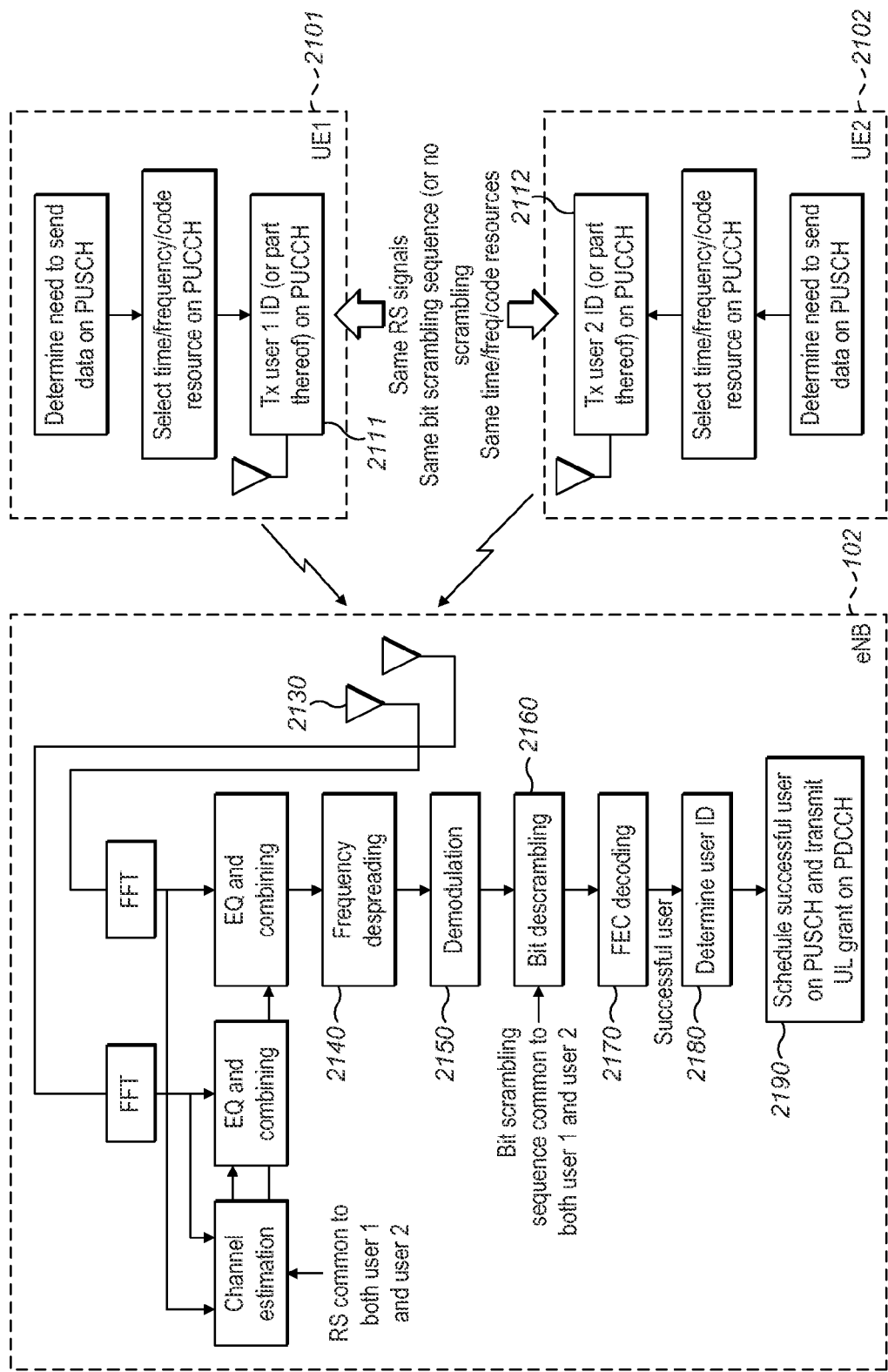
FIG. 21 is a block diagram showing a two-user CSR transmission scenario where collision occurs.

FIG. 21 shows the case wherein two users 2101 and 2102 transmit (2111 and 2112) part or all of respective user IDs (e.g. on PUCCH format 2) using the same time/frequency/code resources. In the example shown, the two users transmit the same reference signals and use the same bit scrambling sequences (or use no bit scrambling).

The processing steps implemented in the eNB receiver are also shown. The eNB attempts to receive 2130, despread 2140, demodulate 2150, descramble 2160 and decode 2170 a single user ID from the received signal on the time/frequency/code resource used by both users. Even in the presence of the collision, the eNB may still be able to correctly detect one of the colliding users 2180 and so this information may be used by the uplink scheduler to allocate PUSCH resources to the successful user 2190.

Figure 22:
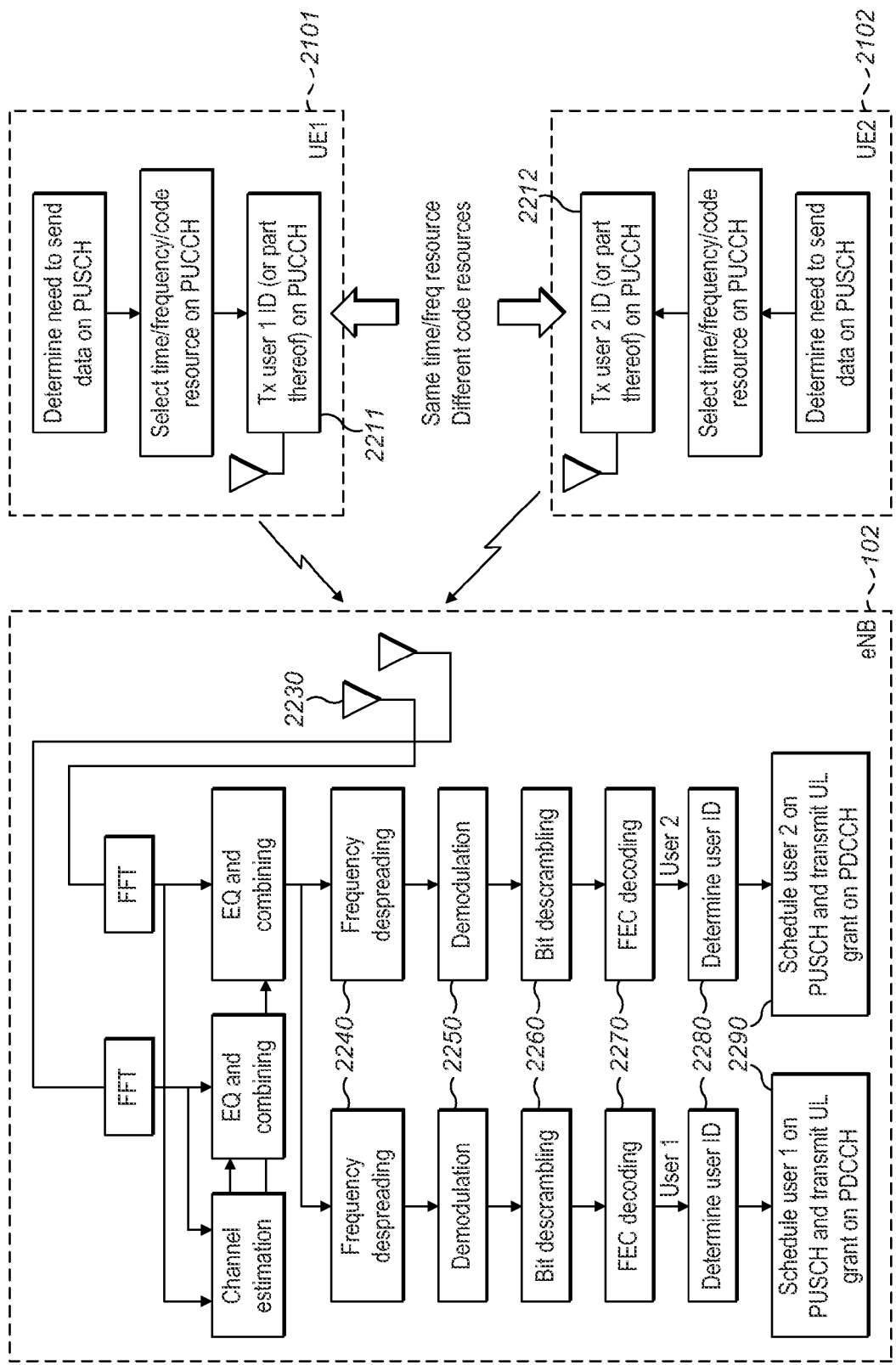
FIG. 22 is a block diagram showing a two-user CSR transmission scenario where collision does not occur.

FIG. 22 shows the case wherein two users 2101 and 2102 transmit (2211 and 2212) part or all of respective user IDs (e.g. on PUCCH format 2) using the same time/frequency resources but using different code resources. The two users do not transmit the same reference signals (i.e. different codes or cyclic shifts are used) and the two users may or may not use the same bit scrambling sequences (or no bit scrambling may be employed).

The processing steps implemented in the eNB receiver are also shown. The eNB attempts to receive 2230 two user IDs on their respective code resources, via despreading 2240, demodulation 2250, descrambling 2260 and decoding 2270 operations. The eNB correctly detects 2280 both users and so this information may be used by the uplink scheduler to allocate 2290 individual PUSCH resources to each.

In both FIG. 21 and FIG. 22, the eNB receiver is designed to detect and decode one user signal per designated time/frequency/code resource. More advanced eNB receiver structures are conceivable in which the eNB attempts to detect and decode more than one user signal per designated time/frequency/code resource. These may for example, exploit certain spatial characteristics of the plurality of incident user signals.

SR Mode Switching

SR resource types may be switched in time for a given user between those of periodic or dedicated type (DSR), to those of common or shared type (CSR), and different users within the system or under control of an eNB, may use different types of SR resources. It is also possible that the user may be switched between use of a first SR resource and a second SR resource, wherein both the first and second resources are of common/shared type, or wherein both the first and second resources are of dedicated type.

For example, a user may be temporarily assigned dedicated SR resources when in an active phase of communication (exchange of UL or DL data is—or has recently—taken place) and upon transitioning to a more inactive phase of communication, this user-dedicated SR resource (DSR) may be released and the user instead uses the common or shared SR resource (CSR).

In one particular example, switching between use of DSR resources and CSR resources may be linked to a Discontinuous Reception (DRX) state or sub-state, or to operation of an inactivity timer (such as a DRX inactivity timer), or to another timer or parameter controlling a DRX pattern. In this case, a user may be assigned dedicated periodic SR resources on PUCCH whilst a DRX inactivity timer is running and on expiry of the DRX inactivity timer (or at a time linked to the expiry of the DRX inactivity timer), the DSR resources for the user may be subsequently released and the user instead uses the CSR resources to send scheduling requests. Upon a resumption of data activity, the DRX inactivity timer may be restarted and the periodic dedicated SR resources may be re-assigned to the user for the duration of the data activity (e.g. for the period of time that the DRX inactivity is running).

Conversely, in another example, a user may be assigned CSR resources for SR whilst a DRX inactivity timer is running and on expiry of the DRX inactivity timer (or at a time linked to the expiry of the DRX inactivity timer), the user instead uses DSR resources to send scheduling requests. Upon a resumption of data activity, the DRX inactivity timer may be restarted and the user may revert to using the CSR resources. This approach may be used in order to provide a special low-latency scheduling request mechanism (using the common/shared SR resource) during periods of increased data activity, and which may be especially suitable for traffic profiles such as on-line gaming, VoIP or other latency-sensitive applications.

Generally, it will be appreciated that the eNB may reserve one or more portions of the PUCCH or PUSCH resources for common/shared use for a particular group of UEs, and that these portions of resource are multiplexed with other PUCCH or PUSCH resources, such as those used for dedicated SR on PUCCH. Switching of users between dedicated SR resources and common/shared SR resources may be governed by either:

i) explicit dedicated control signalling by the eNB (i.e. commands sent from the eNB to the UE either allowing use of a pre-defined common SR resource, or specifying the common SR resources the UE should use)
 ii) implicit mechanisms (i.e. a common/shared resource is pre-defined and users switch between it and a user-dedicated SR resource based upon triggering events commonly known to both the eNB and the UE—such events may include the expiry of a timer (such as an inactivity timer), a change in DRX pattern or a change in a communication state, such as an RRC state, or sub-state)

Figure 23:
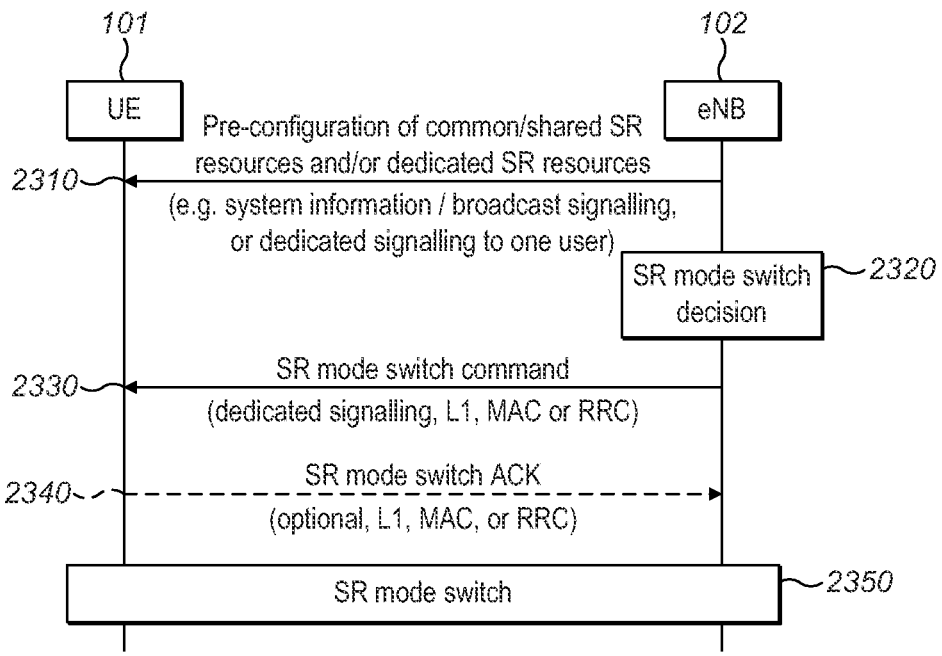
FIG. 23 illustrates the steps of a proposed explicit SR mode switch with pre-configuration of resources.
Figure 24:
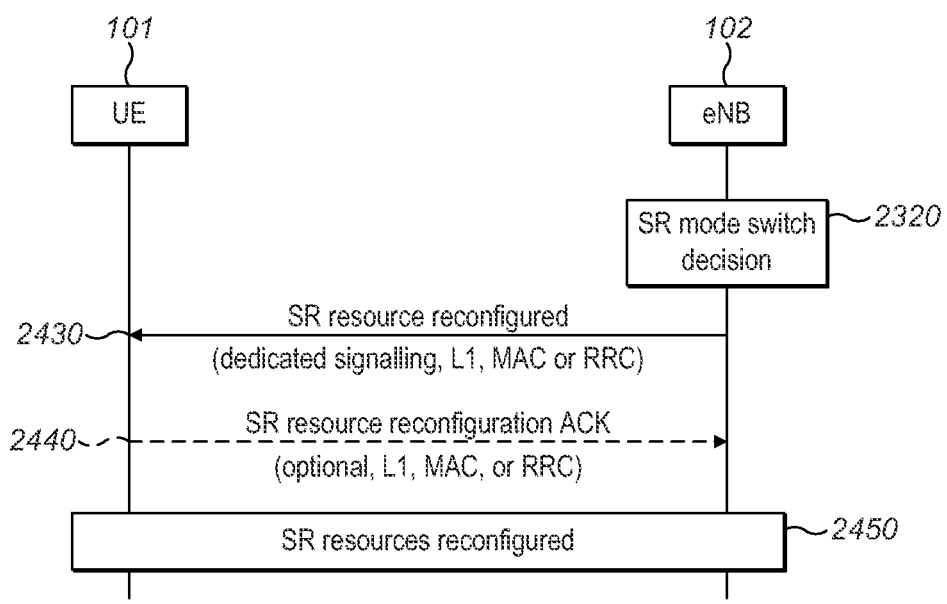
FIG. 24 illustrates the steps of a proposed explicit SR mode switch without pre-configuration of resources.

FIG. 23 and FIG. 24 show two examples of the explicit mode switching method outlined in (i) above. In FIG. 23, the eNB pre-configures 2310 one or more common/shared SR resources (e.g. via system information broadcast signalling or via user-dedicated signalling) and/or one or more user-dedicated SR resources (e.g. via user-dedicated signalling). The pre-configuration may include for example, parameters specifying the time, frequency, code or cyclic shifts of the SR resources. Based on a decision 2320 to switch the SR mode, the eNB controls which SR resources are in use by the UE via the sending of explicit SR mode-switch commands 2330 to the UE. In an optional step, the UE may acknowledge 2340 the SR mode switch command 2330. The mode switch command 2330 and the mode switch command acknowledgement 2340 may be sent at various layers of the communications stack, such as via RRC signalling (L3), MAC layer signalling (L2) or physical layer signalling (L1). On receipt of the explicit mode switch command 2330, the UE transitions 2350 to use of the alternate SR resource. If more than two SR resources are specified in the pre-configuration stage, these may each be associated with an index and the SR mode switch command may then contain an index specifying which SR resources the UE should use.

FIG. 24 shows a scheme which also uses explicit signalling to control which SR resources are used by the UE. In contrast to FIG. 23 however, the step of pre-configuring 2310 the SR resources is omitted. Thus, in order to change which SR resources are being used by the UE, the eNB sends an SR resource configuration 2430 via user-dedicated (point-to-point) signalling containing parameters that specify the particular SR resources to use. The parameters may specify one or more co-ordinates of the resource, such as time, frequency, code or cyclic shift resources. The UE may optionally acknowledge 2440 the SR resource reconfiguration before transitioning 2450 to use the alternate SR resource.

Figure 25:
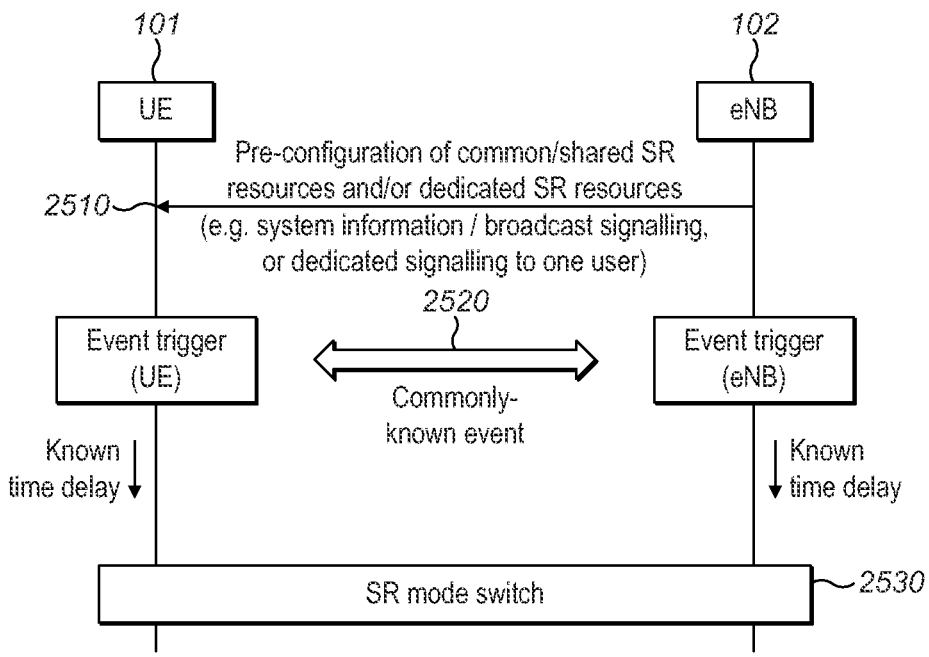
FIG. 25 illustrates the steps of a proposed implicit SR mode switch with pre-configuration of resources.

FIG. 25 shows an implicit SR mode switching method corresponding to (ii) above. As in the first step of FIG. 23, the eNB pre-configures 2510 one or more common/shared SR resources (e.g. via system information broadcast signalling or via user-dedicated signalling) and/or one or more user-dedicated SR resources (e.g. via user-dedicated signalling). The pre-configuration may include for example, parameters specifying the time, frequency, code or cyclic shifts of the SR resources. At a subsequent time, an event occurs 2520 that is commonly-known to both the UE and the eNB. Following the commonly-known event, and optionally following a known time delay, the UE transitions 2530 to use of one of the alternate (pre-configured) SR resources.

Figure 26:
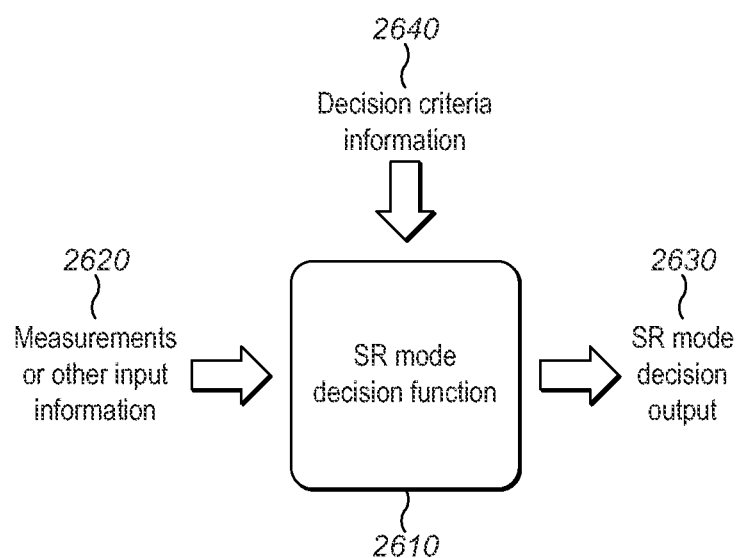
FIG. 26 is a simplified block diagram illustrating a proposed SR mode switching decision.

FIG. 23 and FIG. 24 show examples in which the eNB explicitly controls which SR mode is used and in which the decision to change SR mode is made by the eNB. The decision at the eNB may be based on information or measurements either made directly by the eNB itself or based on measurements or information made by the UE and reported back to the eNB. Thus an SR mode decision function 2610 (such as that shown in FIG. 26) may exist in the eNB which takes information or measurements as a set of inputs 2620, and generates an output 2630 relating to a preferred SR mode. The behaviour of the function may be further governed or controlled by SR mode 'decision criteria information' inputs 2640 which may be pre-programmed in the eNB, or which may be configured in the eNB via an interface to another entity or network node, such as an operations and maintenance (O&M) entity.

Alternatively, the UE may determine which SR mode is preferable and a recommendation may be sent to the eNB in order to request use of the preferred SR mode. The eNB may be required to follow the request or may be able to either allow or disallow the SR mode request. Thus an SR mode decision function 2610 may exist in the UE, again taking information or measurements as a set of inputs 2620, and generating an output 2630 relating to a preferred SR mode.

Figure 27:
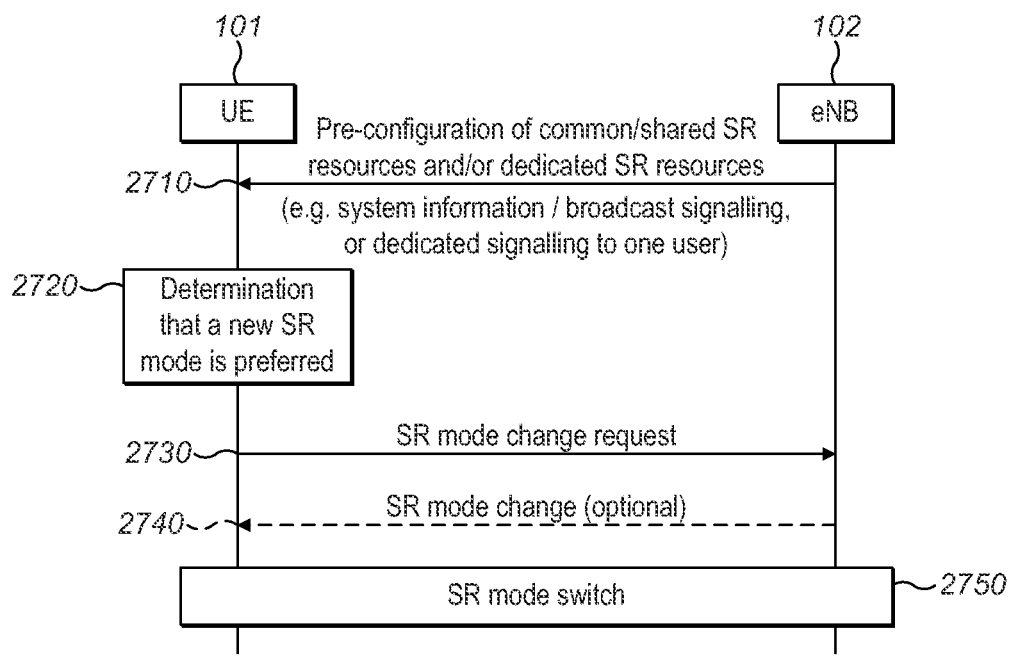
FIG. 27 illustrates the steps of a proposed UE SR mode change request with pre-configuration of resources; and, FIG. 28 illustrates the steps of a proposed SR method using PUSCH signal construction.

FIG. 27 shows the case of a UE-initiated SR mode switch. Following a pre-configuration of a plurality of SR resources 2710, an SR mode decision function 2610 located within the UE, determines 2720 that a new SR mode is appropriate therefore causing the UE to request a SR mode change 2730 and subsequently switching mode 2750 (optionally after the step of receiving the instruction 2740 to change mode from the UE). The behaviour of the UE decision function 2610 may be governed or controlled by SR mode decision criteria inputs 2640 which may be pre-programmed in the UE, or which may be configured in the UE by the eNB. The configuration may be achieved via the eNB signalling parameters to the UE either via common (point-to-multipoint or broadcast) signalling (e.g. on system information) or via dedicated point-to-point signalling. The signalling may comprise RRC protocol messages and configuration data relating to SR mode switching and associated criteria.

The system may therefore be augmented to include the ability to switch between use of the new contention-based SR mechanism and the original dedicated SR mechanism based upon one or more factors input to an SR mode decision function 2610 located either within the eNB or within the UE. Inputs to the SR mode decision function may include:
 A current data activity status or a data activity level of the UE
 A DRX state or sub-state, or change in the DRX pattern
 Determination of whether one or more timers controlling DRX behaviour are running or have expired
 Determination of the activity of applications, services or logical channels Other inputs to the SR mode switch decision function 2610 are also possible. For example, noting that different applications or logical channels of the communication system are likely to have differing QoS and latency requirements, it may also be appropriate to switch SR mode as a function of data activity or inactivity of a particular logical channel, application or service. Thus, when a low-latency service or application becomes active or inactive, the SR resources used by the UE may be adjusted accordingly. Similarly, the SR resources used by the UE may be adjusted depending on whether a background application or latency-tolerant service becomes active or inactive.

Additionally, switching between different SR resources may be based on a priority, such as a UE priority. For example, low priority users, or users with low priority applications, may be assigned an SR resource that has a relatively high probability of collision, whereas high priority users, or users with high priority applications, may be assigned an SR resource that has a lower probability of collision.

It may also be desirable to switch the SR mode, or SR resources used by a UE, as a function of prevailing radio channel conditions.

The proposed modification of the SR mechanism to carry a number of explicit UE bits (e.g. via PUCCH format 2 or format 3) does require additional transmission power at the UE to do so, when compared to the existing PUCCH format 1 SR (which sends only 1 effective bit via on/off keying). This affects both the coverage and capacity of the SR.

Overall system coverage may not however be significantly impacted by the proposed CSR technique. Whilst transmission of a user ID does require the sending of more bits (and so also more power) than a simple one-bit SR using on/off keying, the number of bits may be similar to that required for other multi-bit UL control information types such as channel status information (CQI/PMI/RI). That is, a UE located towards the edges of cell must in any case be capable of reliable UL control information transfer for non-SR information types, and it is generally these that set the coverage bound as they contain more bits than the single-bit SR. Additionally, a UE at the edges of cell must also be able to communicate with the eNB via PUSCH according to a data rate commensurate with a reasonable Service Level Agreement 'SLA' (for example, a minimum supported UL data rate of 64 kbps or similar). If every uplink sub-frame is utilised to meet this SLA this translates to 64 bits per 1 ms TTI, again larger than the proposed small number of UE ID bits for SR (e.g. up to 16 bits).

However, it is conceivable that some operators or network vendors would like to retain the ability to operate an SR mechanism at the fringes of coverage that has a coverage performance equalling (or better than) the current dedicated PUCCH format 1 SR scheme.

In recognition of these coverage aspects, the other factors that could also form the basis of SR mode-switching decisions include for example:
 A determination or measurement of the pathloss between the eNB and the UE
 A determination or measurement of a downlink carrier to interference (C/I) or downlink carrier to interference-plus-noise (C/(N+I))
 A determination or measurement of an uplink carrier to interference (C/I) or uplink carrier to interference-plus-noise (C/(N+I))
 An uplink data rate for the UE
 An uplink modulation and coding scheme for the UE
 An uplink power headroom for the UE (e.g. a ratio of maximum UE transmit power to a current UE transmit power)

The SR mode switching solutions proposed apply equally for CSR using PUSCH based signal constructions.

Tx Diversity

Transmit diversity may be applied to CSR transmissions using PUCCH signal constructions. Transmission diversity approaches can be broken down into two categories: those that require modification to the structure of a physical channel to support its transmission on multiple antennas ("non-transparent schemes"), and those that don't ("transparent schemes"). Both schemes have their advantages and disadvantages.

Since non-transparent schemes have more degrees of freedom in their design, they typically provide better diversity gain than transparent schemes. However, the better diversity gain may have some costs. The most obvious is additional system complexity, since different transmission and reception structures are used. Also, non-transparent schemes often require that the signals transmitted on each antenna be received independently, which typically requires that the channel to each antenna be estimated independently. This leads to the use of additional reference signals (typically one set of reference signals per antenna). This use of additional reference signals can decrease spectral efficiency, since they may need to take up resource that could otherwise convey data, or be used to identify co-multiplexed UEs in the same resource. Non-transparent schemes may also transmit redundant information on the antennas, which can further reduce spectral efficiency.

Transparent diversity schemes generally operate by transmitting transformed copies of a physical channel on multiple antennas. The transformations are such that they could be caused by multipath propagation of the channel, and so the receiver does not need to distinguish between single and multi-antenna transmission. Typical transformations include transmitting a copy of the physical channel on the antennas with different delays, frequency offsets, or phase shifts.

One key property of the contention-based SR resource solutions here is that they can be used with existing PUCCH formats. Multiple users can contend on the same SR resource, using the same cyclic shift and/or orthogonal cover on both the data and reference symbols. We can use this property to construct a transmit diversity scheme by allocating N different user IDs to a UE with N transmit antennas. The UE can transmit one PUCCH with a distinct ID on each antenna, and the eNB will receive them in the same way as if they were contention-based PUCCH transmission from multiple UEs.

Contention based transmission diversity can then be seen to have properties both in common and different from transparent and non-transparent diversity. Each antenna will carry a signal with different modulation symbols, which is similar to non-transparent schemes. However, unlike non-transparent schemes it does not require modification of the physical channel. Similar to transparent schemes, a single reference signal can be used on each antenna, and the single antenna receiver structure need not be modified to support diversity transmission. Unlike transparent schemes, distinct information bit payloads are associated with the different antennas.

A principal modification needed to support transmit diversity for contention based SR is that the UE needs to be informed of the additional IDs that it can use for diversity purposes. This could be done by signalling each ID independently or by signalling a base ID and using a fixed function to determine the remaining N IDs (such as adding predetermined offsets to the base ID).

Once a UE knows which IDs it is to use, it can transmit using contention based TxD in a number of ways:
1. The UE can transmit N IDs simultaneously on a single common/shared PUCCH resource with one distinct ID on each of the N antennas. The eNB may use the decoded ID to determine which of the UEs transmit antennas is currently the most reliable and this information may be further exploited by the eNB during subsequent communications with the UE. For example, the eNB could use the information to instruct the UE to switch one or more of its transmissions to the determined transmit antenna.
2. It can transmit one ID on one of the antennas. This antenna selection may be done in an "open loop" or "closed loop" manner.
    a. In an open loop approach, the selected antenna can be the one that is estimated to have the most received power at eNB. The UE can estimate the received power at eNB by measuring the average downlink power from the eNB on each of the UEs antennas, and assuming that the one with the most average downlink power will have the most average uplink power. In this case, the UE will be able to select the antenna to transmit the ID on without feedback or control from the eNB.
    b. In a closed loop approach, the eNB can directly measure the received power from each antenna and instruct the UE which antenna to use to transmit contention-based PUCCH. In this case, the eNB will need to be able to identify the antennas the UE transmits on in order to provide the feedback. Since the contention-based PUCCH TxD does not use additional reference signals, some additional mechanism is needed to identify the antennas.
        i. One approach would be to associate the N IDs a UE has with each of the N antennas, such that it transmits a given ID only on a particular antenna port. When the UE transmits a contention-based PUCCH, the eNB will determine the received power, and associate it with the UE's antenna port using the detected ID. The UE will transmit on each of its antennas (using the associated IDs) frequently enough for the eNB to select the proper antenna given the rate of change of the channel. This could be done by configuring the UE to periodically transmit contention-based PUCCHs on at least two of its antennas, or alternatively to transmit only on one antenna at a time, but on different antennas in different subframes ("hopping" over the antennas).
        ii. A second approach uses information from existing physical channels. When a Rel-10 UE is configured for multi-antenna transmission, it will transmit physical channels, including reference signals associated with each antenna. In this case, the eNB can measure the received power from each of the UE's antennas, and use this to determine which antenna to select. For example, if a UE is configured for two antenna port transmission of PUCCH format 1b using Rel-10 LTE, it will have RS associated with two antenna ports. In this case, the eNB can select one of these two ports and instruct the UE to use this for its contention based PUCCH transmissions.

Independent of whether open-loop or closed-loop diversity transmission is used, the eNB can use a single receiver structure. The eNB will attempt to receive all IDs that can be transmitted from all UEs on all antennas in a given sub-frame and resource, and if it successfully decodes any one of the N IDs assigned to a UE, it will determine that the UE has issued a scheduling request.

Alternatively, it is also possible to apply conventional open loop TxD techniques to contention based SR. In this case, each UE transmits only one ID, although UEs transmitting simultaneously on a single common/shared PUCCH resource will transmit using different IDs. Two TxD approaches can be envisaged:
1. Non-transparent
    a. The UE transmits distinct reference signals on each antenna, enabling the eNB to estimate the channel to each antenna independently. Two possible methods for non-transparent TxD transmission of contention based SR are:
        i. The UE may transmit using orthogonal resource transmission diversity schemes, wherein a sequence of modulated data symbols is replicated to each of the N antennas, and each antenna transmits the sequence of modulated data symbols on a contention based SR resource that is different from the other antennas of the UE. This method uses N contention SR resources, and so can be spectrally inefficient. However, since each antenna can be received independently, it provides full diversity order and can require less transmit power than more spectrally efficient schemes.

ii. Alternatively, the UE may transmit using block coded transmit diversity, such as those based on so-called Alamouti TxD schemes. In block coded TxD for contention based SR, a sequence of modulated data symbols is broken into symbol pairs, s1(i) and s2(j), where i=1, 2, . . . , I and j=1, 2, . . . , J and I+J is the total number of modulation symbols in a single transmission of contention based SR. Each antenna transmits on the same contention based SR resource as the other antennas. For two antenna block coded TxD, the first antenna will transmit [s1(i), s2(i), s1(i+1), s2(i+1), . . . , s1(I), s2(J)], and the second antenna will transmit [s2*(i), −s1*(i), s2*(i+1), −s1*(i+1), . . . , s2*(I), −s1*(J)], where * indicates complex conjugation of the modulation symbol. This method can provide full diversity order, and so can require low amounts of transmit power. Furthermore, it uses one contention SR resource over all antennas, and so can be spectrally efficient. However, the spectral efficiency gains may not be available if the multiplexing capacity is limited by the number of available reference symbols. Also, receiver designs for block coded TxD schemes tend to be more complex than for orthogonal resource transmission schemes, and block TxD schemes are more difficult to implement when there is not an even number of modulation symbols to be transmitted on a given set of space-time resources.

2. Transparent a. The UE transmits the same reference symbols on each antenna, transforming copies of the contention based SR physical channel between antennas as described above with reference to transparent diversity. The same advantages and disadvantages apply as compared to non-transparent approaches: it makes efficient use of contention based resource, since only one resource is used for all antennas (for both reference signals and modulated data symbols). However, the full diversity order is generally not achieved, so the performance with respect to required transmit power is not as good as non-transparent schemes.

RRC Signalling Alternatives

In order to support the configuration of contention-based scheduling request (CSR) using PUCCH signal constructions, RRC signalling messages or information elements could be modified to provide one or more of the following:

i) to include an identifier indicating the PUCCH format type (e.g. PUCCH format 1, 2 or 3) for the CSR resource.

ii) to specify a PUCCH resource index within an index range (similar to the existing RRC parameters sr-PUCCH-ResourceIndex and cqi-PUCCH-ResourceIndex for PUCCH formats 1 and 2 respectively). The index may identify a frequency and/or code attribute of the common/shared SR resource. The index range should be compatible with the specified PUCCH format type (e.g. values 0-1185 for PUCCH format 2, or 0-549 for PUCCH format 3).

iii) to specify a PUSCH frequency resource or resource index.

iv) to specify a time-domain periodicity and sub-frame offset of the CSR resource (e.g. similar to the existing RRC parameter sr-ConfigIndex, but may be modified to provide an increased number of possible resource periodicity values).

v) to include a field comprising a CSR-uRNTI to be used by the UE in constructing signals to be transmitted on the CSR resource. Alternatively, the field could comprise one or more parameters that govern how the UE should determine the CSR-uRNTI using its C-RNTI or another existing user ID. The CSR-uRNTI may or may not be the same length as the 16-bit C-RNTI. If the C-RNTI is directly used as the CSR-uRNTI, existing messages that convey the C-RNTI to the UE are sufficient and there is no need to signal a separate CSR-uRNTI.

vi) to include information describing how to map all or part of a CSR-uRNTI or C-RNTI to sub-sets of time/frequency/code resources within the indicated CSR resource. This may be used to facilitate the case wherein some bits of a full user ID (e.g. a C-RNTI or an ID derived there-from) are signalled explicitly by the UE within the CSR signal transmission and the remaining bits are signalled implicitly by the UE via CSR resource selection as previously described.

vii) to include information which may be used to derive or set a bit scrambling sequence or to disable bit scrambling. This may be used to configure users accessing the same CSR resource to use the same bit scrambling sequence for CSR transmissions (or to use no bit scrambling). This information may include a field containing a common or cell-specific RNTI or other scrambling ID that is associated with the CSR resource in the cell and which is to be used by the UE to initialise a scrambling sequence generator (such as the generator shown in FIG. 16. Note that this common or cell-specific scrambling ID could be the same as (or related to) a group CSR RNTI (CSR-gRNTI).

viii) to include information which may be used to derive a cyclic shift hopping pattern. This information may comprise a value that is used to initialise a pseudo-random sequence generator, the pseudo-random sequence being further used to derive a cyclic shift hopping sequence. The value may be cell specific, or may be a value that is associated with the CSR resource being configured (such as a CSR-gRNTI).

ix) to include a parameter controlling how many consecutive attempts the UE may make on the CSR resource before resorting to other access methods.

x) to include a timer value controlling how long the UE should wait (following a CSR transmission) for an UL grant addressed to its C-RNTI before considering the transmission to have been unsuccessful.

The information is carried from the eNB to the UE. For each of the above information fields, it may be possible to convey the particular information via dedicated (point-to-point) or common (point-to-multipoint) signalling means. Mixed approaches are possible wherein some of the information is carried via dedicated signalling and some via common signalling. Typically the information would be carried via RRC signalling messages or RRC information elements, but signalling of one or more of the above information fields is also possible at other layers including at the MAC layer or at the physical layer (e.g. via PDCCH).

It should be appreciated that other forms of ASN construction are also possible and that examples are provided as examples only. Actual ASN construction may also vary according to the needs of backwards compatibility with previous releases.

Particularly when the CSR resource is located within the PUSCH region, an alternative, is to allocate the resource using methods similar to those used for semi-persistent scheduling (SPS) in LTE. In this case, dedicated RRC signalling (such as the RRC SPS-Config IE) could be used to configure the same or partially overlapping SPS resource occasions in time to one or more UEs in the system and PDCCH messages could be used to activate or deactivate the allocation, to specify the location in frequency of the CSR resource and possibly to convey other CSR resource parameters.

In the same way as the existing uplink SPS mechanism, this RRC configuration signalling may also be used to provide each UE with an SPS-RNTI to which the UL grant messages (sent on PDCCH and relating to the CSR resource) are addressed. This is termed here, an SPS-CSR-RNTI as it refers to a CSR resource assigned semi-persistently to the UE. The SPS-CSR-RNTIs that are provided to the one or more UEs could be the same, (for example, all could be equal to a CSR group RNTI "CSR-gRNTI") which would enable group-based configuration, reconfiguration, activation or deactivation of the CSR resource and/or modification of its associated parameters such as the frequency location of the RB(s). Alternatively, the SPS-CSR-RNTIs provided to each of the one or more UEs may be different, in which case different PDCCH messages would need to be sent to each UE in order to configure, reconfigure, activate or deactivate the CSR resource. The SPS-CSR-RNTI could be signalled to the UE within the RRC SPS-Config IE simply by using the existing RRC parameter semiPersistSchedC-RNTI.

Whether achieved via dedicated RRC signalling or via dedicated PDCCH signalling, the eNB may add or subtract UEs that have access to the common/shared SR resource in this manner.

If group-based addressing on PDCCH for CSR purposes is used, it may be beneficial to configure parameters that define sub-frame occasions on which all UEs within the group should monitor PDCCH (e.g. addressed to SPS-CSR-RNTI=CSR-gRNTI) for possible CSR resource updates.

These common update occasions (known to both the eNB and to the group of CSR UEs) may be specified in terms of a start sub-frame, a modification period and a modification length. By using these parameters, a periodic PDCCH monitoring pattern may be defined in order to control on which sub-frames the UE must check for CSR updates. These update occasions may therefore lie within a 'modification window' which may recur periodically.

PUSCH

As mentioned earlier, the CSR resource (conveying PUCCH-like SR signals) could reside in the PUSCH frequency region as well as or instead of the PUCCH frequency region.

Figure 28:
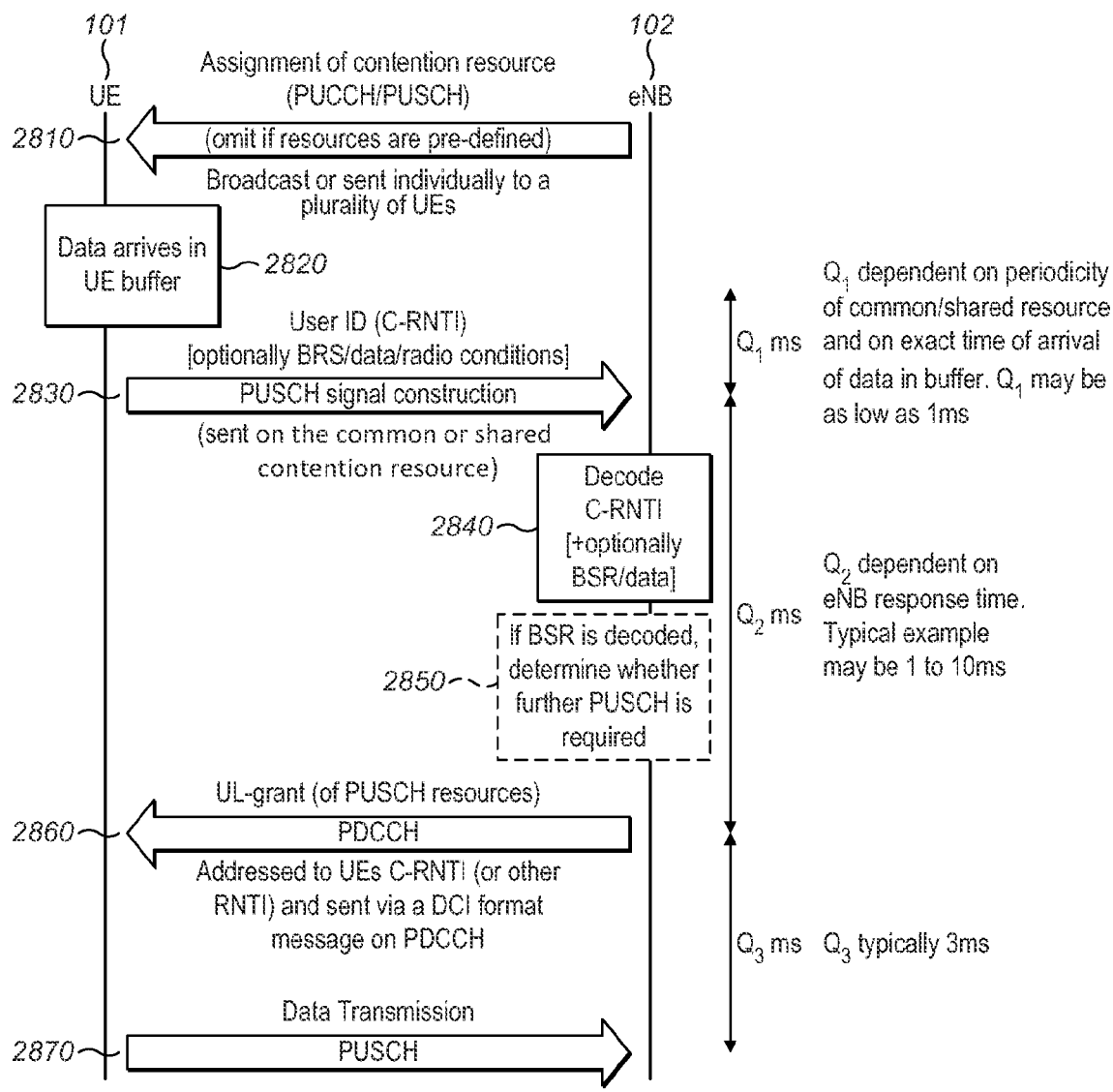

FIG. 28 illustrates the steps for an alternative CSR scheme conveying PUSCH-like SR (i.e. using PUSCH signal constructions). The PUSCH-like SR signals may use either the PUSCH frequency region or the PUCCH frequency region for the CSR resources.

1) As a first step, an eNB optionally assigns 2810 a portion of uplink resources (in either the control or data frequency region) to a plurality of UEs for the purposes of contention-based scheduling request. The resource assignment may be conveyed via broadcast signalling or may be signalled individually to each of the plurality of UEs. This first step may be omitted if the resources are pre-defined, for example in a standard.

2) At some later point, pending data arrives in the UEs transmission buffer 2820

3) The UE encodes a user ID (or portion thereof) using a PUSCH signal construction method, and transmits 2830 the signal on the assigned CSR resource. Due to the fact that the payload carried by PUSCH signals may be substantially larger than those carried by PUCCH signals, there may be additional room within the message to carry additional information fields. These may comprise:
   a. A buffer status report (BSR) indicating one or more data volume levels within the UEs transmission buffer
   b. A small amount of user data
   c. Information related to current radio conditions 4) An eNB receiver attempts to decode 2840 signals from the CSR resource, and if decoding of the UEs signal is successful, the eNB subsequently derives the UE ID using the decoded information. The eNB also decodes 2850 any additional information fields (such as BSR, user data, or information related to radio conditions) that the UE may have included 5) If the eNB determines that further PUSCH resources are necessary, the eNB proceeds to send a normal UL-grant message 2860 to the UE to allocate it a portion of PUSCH resource for the transmission of data. The eNB may take into account any received BSR information or received information related to radio conditions when determining how much PUSCH resource to allocate to the UE and in determining formatting, modulation, coding, or other attributes of the allocated PUSCH resource. The UL-grant message is conveyed in a Downlink Control Format (DCI) message sent over a Physical Downlink Control Channel (PDCCH).

6) The UE then has access 2870 to further PUSCH and is able to send (further) data to the eNB.

One particular implementation of step 2830 above is to send the user's C-RNTI within a MAC C-RNTI Control Element. By doing so, the scheme reuses existing building blocks of the LTE system thereby improving its compatibility with existing systems and minimising the need for additional modifications to support the invention.

Information Fields within CSR-PUSCH Transmissions

The C-RNTI MAC CE is originally only used during the RACH procedure, therefore in some embodiments, the C-RNTI MAC CE is reused for the purposes of contention-based scheduling request on PUSCH.

In addition to a C-RNTI MAC CE, a PUSCH transmission on a CSR resource may contain (for example, within a MAC transport block 300 or a MAC payload 320) a number of other data elements like a Buffer Status Report (BSR) (for example within a MAC CE 330), User data (MAC SDUs) 340 and MAC Padding bits 350. The BSR may be a Long BSR (L-BSR) or a Short BSR (S-BSR).

Figure 29:
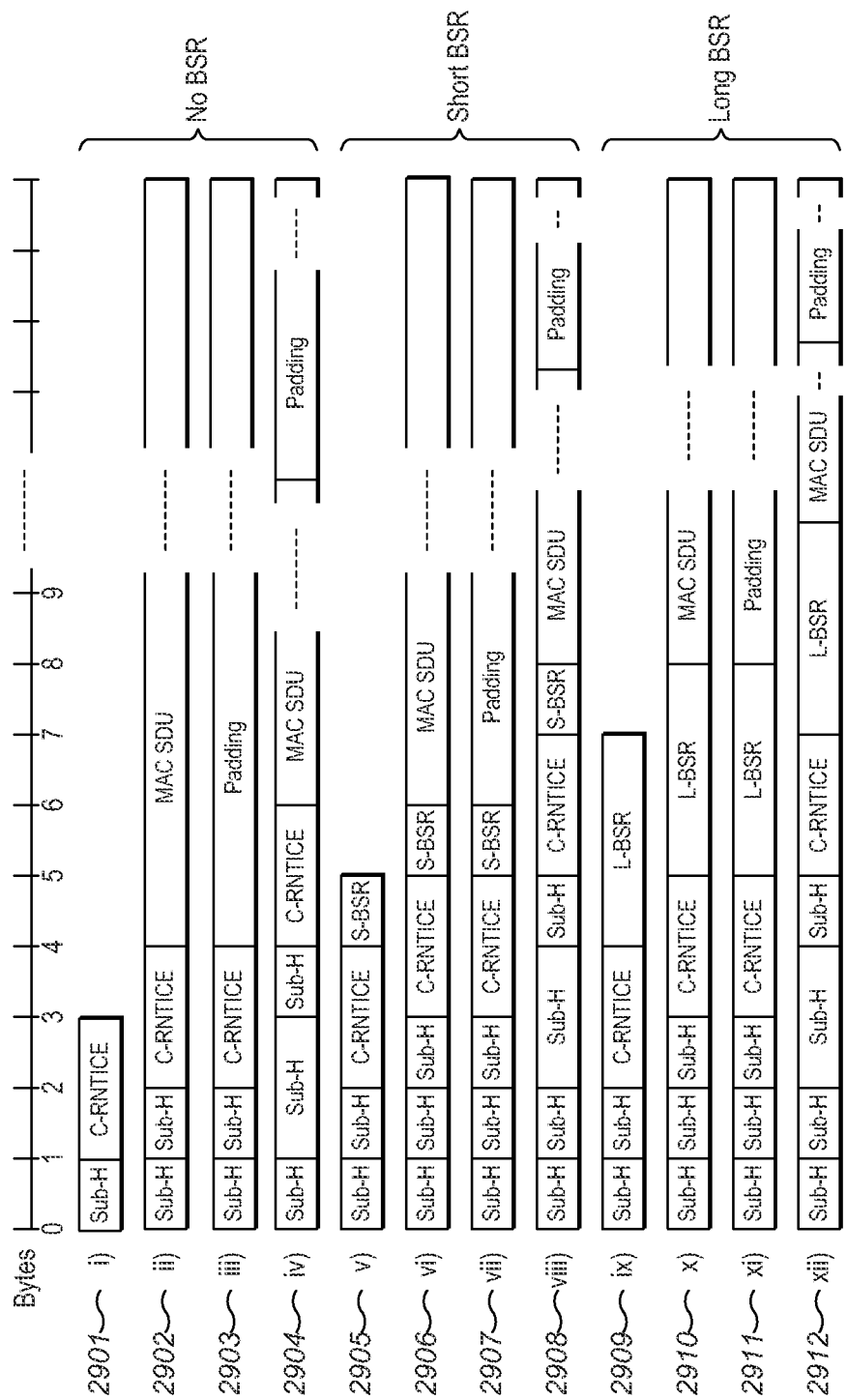
FIG. 29 shows a number of example MAC PDU constructions for CSR transmissions.

FIG. 29 shows some example MAC PDU constructions (2901 to 2912) for CSR transmissions. The C-RNTI MAC CE is necessary in all cases in order to allow the eNB to identify the user. Cases 2902 to 2908 show the inclusion of other fields along with the necessary MAC subheaders (denoted "Sub-H" in the figure). The C-RNTI CE and BSR CE MAC subheaders are each of length 1 byte. The subheaders for a MAC SDU or for padding are normally 2 bytes, but are length 1 byte when they are the last subheader in the MAC PDU.

The network may wish to control whether or not the various fields may be included by the UE(s) within PUSCH transmissions on the CSR resource. In particular the eNB may wish to control whether or not UEs may send user data on the CSR resource:

"Data Allowed": In this mode, the UE sends a C-RNTI MAC CE and may also send user data within MAC SDUs and optionally also append a BSR MAC CE. This mode is used for transmission of (small) amounts of user data piggybacked on to the CSR transmission. This may improve the latency of the data transfer and may increase the efficiency of usage of the CSR PUSCH resource in general. This may be especially useful for sending small amounts of TCP or other higher layer control data such as acknowledgements or keep-alives and PINGs. Typical sizes of these data packets may be approximately 40-60 bytes.

"Data NOT Allowed": In this mode, the UE transmits only the C-RNTI MAC CE and optionally a BSR MAC CE. This mode is used by the UE to make a scheduling request on the CSR-PUSCH resources.

UE and network procedures may differ significantly depending on whether user data is carried within a CSR PUSCH transmission. For example, HARQ may be operated if user data is carried, whereas this may not be necessary if user data is not carried.

Two possibilities exist to provide the eNB with the ability to control whether or not data is allowed. In a first option, the eNB may send explicit commands within UE dedicated or common/broadcast RRC signalling messages. In a second option, the eNB may control whether user data may be sent via the establishment of information field priority rules and by adjusting the size and Modulation and Coding Scheme (MCS) of the granted CSR resource. This second option will be further described in the following.

Within the LTE system, the UE returns a MAC PDU with a transport block size (TBS) commensurate with the allocated number of PRBs and the assigned MCS. Therefore, if rules are established governing which information types are to be prioritised within a CSR transmission, the eNB may control which information types are actually included by means of adjusting the assigned TBS (i.e. via the assigned number of PRBs and the assigned MCS). In this way, the eNB does not need to explicitly signal a separate field to allow or disallow data transmission or to enable/disable the transmission of different MAC control elements.

By means of example, the eNB may configure 1 RB of CSR resource along with an MCS that supports the transmission of a number (denoted TBS) of bits. Transmission of the various possible information fields may then be prioritised (in decreasing priority order) as follows:

{C-RNTI MAC CE, BSR MAC CE, user data in MAC SDUs}

Thus, the value of TBS may be used to control which information fields are included by the UE within its CSR transmissions, e.g.

An assignment of an MCS supporting only 24 bits (3 bytes) may be interpreted by the UE as an instruction to send only its C-RNTI MAC CE—(see 2901)

An MCS assignment of 40 bits (5 bytes) may be interpreted as an instruction to send the C-RNTI MAC CE along with a short BSR—(see 2905)

An MCS assignment of 56 (7 bytes) bits may be interpreted as an instruction to send the C-RNTI MAC CE along with a long BSR—(see 2909)

An MCS assignment of >T bytes may be interpreted as an allowance to send user data within MAC SDUs (along with the accompanying C-RNTI MAC CE and a long BSR). The value of T may be fixed (e.g. T=8 bytes) or may be a variable value and signalled to the UE.

For the case in which no data or padding is transmitted on the CSR resource, the MAC PDU size may comprise up to 56 bits (7 bytes). The physical layer then adds a 24 bit CRC to the transport block. Thus a total of 80 bits of data may need to be encoded by the turbo encoder in order to form the eventual PUSCH CSR signal. One PUSCH RB carries up to 144 REs of data and assuming QPSK modulation, this accommodates up to 288 coded bits of data. Hence, a code rate of around ⅕th is possible. Thus a scheduling request containing both a C-RNTI and a long BSR fits easily into one RB using a robust modulation format and with a low code rate, thereby helping to ensure its reliable transmission.

For the case in which user data is allowed, one further option could be to allow the mobile to send small amounts of user data only if the entire UE buffer contents may be sent within a single transmission on the CSR-PUSCH resource. In this case the BSR need not be included in the MAC header (eg 2902). Instead the network will interpret a CSR transmission containing user data but no BSR MAC CE as an indication that the UEs buffer is now empty. Hence on successful reception of this message the eNB will not allocate any additional dedicated PUSCH resources to the UE.

Alternatively, the UE may transmit a small amount of data on the CSR-PUSCH resource even though this represents only a portion of the data in the UEs transmit buffer. In this case the mobile includes the BSR in addition to the data transmitted (see 2906 and 2910).

For typical small user data messages (e.g. 40 bytes and more), the overall MAC PDU payload rises to >344 bits and hence no longer fits within one RB using QPSK modulation (a maximum TBS of 144 bits is supported for QPSK on PUSCH within 1 RB). Hence either a higher order modulation scheme or a higher number of RBs for the CSR resource will be needed to send typically-sized small data messages in full.

Alternatively, and if allowed by the network, only a portion of the UE buffer may be sent within the initial CSR PUSCH transmission, along with a BSR, and the remainder of the buffer may be sent in one or more subsequent PUSCH transmissions (i.e. on PUSCH resources assigned to the UEs C-RNTI)

Inclusion of Radio Channel Status Information

In addition to transmission of a user ID and optionally a buffer status report, it may be beneficial to also include information regarding present radio channel conditions within a CSR-PUSCH transmission. This may be used by the eNB scheduler to allocate to the UE an appropriate amount or type of resource and to assign an appropriate MCS or transmit power for subsequent transmissions. Such functionality is not possible with existing scheduling request mechanisms that do not convey information regarding present radio channel conditions.

The radio channel condition information reported by the UE may include one or more of:

A Channel Quality Information (CQI) report
  Information related to the downlink quality and which may be used by the eNB to determine an appropriate MCS to use for downlink (or optionally also uplink) transmissions A Precoding Matrix Indication (PMI) report
  Information related to the downlink quality and indicating an appropriate precoding to use for downlink transmissions A Rank Indication (RI) report Information related to the downlink quality and indicating an appropriate rank (spatial multiplexing order) to use for downlink transmissions A Channel Status Information (CSI) report Information regarding the received quality of one or more cells A Power Headroom Report (PHR)

Information indicating a difference between a maximum UE output power level and a current estimated UE power for PUSCH transmission The radio channel condition information may be multiplexed with other information carried on PUSCH in one of two ways:

1) Via physical layer multiplexing: the radio channel condition information is used to construct uplink control information (UCI) which may be encoded separately from other data carried on PUSCH, and which may be mapped to particular resource elements of the PUSCH transmission 2) Via MAC multiplexing: the radio channel condition information may be contained within MAC control elements that are multiplexed with other MAC control elements and/or MAC data PDUs. For example, a power headroom MAC control element may be included within a CSR-PUSCH transmission.

Mixtures of (1) and (2) above are also possible. For example, a CSR-PUSCH transmission could carry CQI/PMI within uplink control information that is multiplexed at the physical layer (1), and could also carry a power headroom report within a MAC control element and which is multiplexed at the MAC layer (2).

The Network may wish to control whether or not UEs should include the information related to radio conditions within PUSCH transmissions on a CSR resource. This may be achieved via the transmission of related configuration information from the eNB to the UE via dedicated or common signalling methods, for example using RRC, MAC or Physical Layer signalling.

Allocation of CSR-PUSCH Resources

Semi-Static allocation. The location of the CSR-PUSCH resources could be semi-static and may be signalled within dedicated RRC messages to a particular UE, or within one of the broadcast messages in a System Information Broadcast (SIB) frame.

A new information element (IE) (CSR-PUSCH-Config) could be created to carry both the time domain CSR-PUSCH pattern and the Resource Blocks and MCS used for CSR-PUSCH thereby providing a fully semi-static RRC configuration and obviating the need for PDCCH assignments for CSR.

The CSR frequency resources may be specified within the RRC IE by a parameter csr-RIV. The principle used employs a Resource Indication Value (RIV) which corresponds to both a start RB and a length of contiguously-allocated virtual resource blocks and is adopted from the mechanism used to allocate PUSCH via DCI format 0 on PDCCH. The number of possible RIV values is a function of the number of UL RBs within the system bandwidth ($NRB^{UL}$). A smaller range of RIV values (and a different mapping of RIV to the location and number of allocated PRBs) may be used if the number or location of the PRBs for CSR-PUSCH is restricted.

The IE may also include other necessary fields usually found in DCI format 0 and which specify an MCS for the CSR resource (e.g. 5 bits), and a demodulation reference signal (DM RS) cyclic shift to use (e.g. 3 bits). Either of these fields may be omitted from the IE if a fixed MCS or fixed DM RS cyclic shift are used for CSR.

A CSR-gRNTI is optionally also included within the IE to enable all UEs within a cell to use a common bit scrambling sequence when transmitting on the configured CSR-PUSCH resource.

The network may increase or decrease the number of available CSR-PUSCH resource blocks in the system based on the determined system load or based upon a determined collision probability, or based upon a determined CSR access latency.

More than one assignment of CSR-PUSCH resources may be reserved in the system and specific rules governing the usage of a given CSR resource by a given UE may also be signalled in a StstemInformationBlockType2 (SIB2) message or within dedicated RRC signalling messages. For instance, the CSR-PUSCH resources may be designated to have varying degrees of priority and certain CSR-PUSCH resources may be reserved only for certain UEs (the priority level of a given UE being signalled to the UE during the RRC connection set-up).

Hybrid/SPS-like allocation of CSR-PUSCH resources. Semi-Persistent Scheduling (SPS) may be used in LTE to assign periodically recurring PUSCH resources for the transmission of regular uplink data. CSR PUSCH resources may be allocated using SPS-like principles, that is, by using a combination of RRC signalling (to specify the time-domain occurrences of the resource) and using PDCCH to activate or deactivate the assignment, and to configure or reconfigure its parameters (such as its frequency resources and MCS). The PDCCH transmissions may be addressed to an individual UE (using a C-RNTI address) or to a group of UEs (for example using a common CSR-gRNTI address allocated to the group of UEs).

If group-based addressing is used (CSR-gRNTI on PDCCH), it may be beneficial to configure parameters that define sub-frame occasions on which all UEs within the group should monitor PDCCH for possible CSR resource updates.

These common update occasions (known to both the eNB and to the group of CSR UEs) may be specified in terms of a start sub-frame, a modification period and a modification length. By using these parameters, a periodic PDCCH monitoring pattern may be defined in order to control on which subframes the UE must check for CSR updates. These update occasions may therefore lie within a 'modification window' which may recur periodically. For example, a rule may be defined that UEs should monitor all sub-frames for which the following equation is TRUE:

$$((SFN*10+n+\text{modification\_offset})\bmod(\text{modification\_period})) < (\text{modification\_length})$$

where:
  SFN is the System Frame Number
  n is the current subframe (0-9) within the frame
  modification_offset is the subframe offset parameter
  modification_period and modification_length are expressed in durations of subframes In the equation, SFN is the System Frame Number, n is the current subframe (0-9) within the frame, modification_offset is the subframe offset parameter, and modification_period and modification_length are expressed in durations of subframes.

As an illustrative example, if the offset parameter was set to 0, modification_period was set to 500, and the modification length was set to 10, UEs would check for PDCCH modifications to the CSR resource (e.g. with the PDCCHs addressed to CSR-gRNTI) on the subframes: {[0, 1, . . . 9], [500, 501, . . . , 509], [1000, 1001, . . . 1009], [1500, 1501, . . . , 1509], . . . } and so on.

Dynamic allocation. In a dynamic allocation method, CSR allocations may be made via PDCCH. In order to support the dynamic allocation approach, the group of UEs which are allowed to transmit on the CSR-PUSCH resources may be allocated a common CSR-gRNTI at the RRC connection setup procedure or alternatively the g-RNTI may be configured via System Information on the broadcast channel.

The CSR-gRNTI for the UE may be signalled to the UE during the RRC connection setup phase (for instance by defining a new element in the radioResourceConfigDedicated IE).

The actual CSR-PUSCH resources will then be allocated dynamically (eg: on a per sub-frame basis) using DCI format 0 UL grants within PDCCH transmissions addressed to the CSR-gCRNTI. All the UEs sharing the CSR-gCRNTI will then be allowed to send CSR-PUSCH transmissions on the indicated resource.

Whilst dynamic allocation of the CSR-PUSCH resources using the PDCCH gives the network a higher degree of flexibility in assigning the CSR-PUSCH resources, it also consumes more resources on the PDCCH in the downlink compared to a semi-static or a hybrid/SPS-like method of allocating CSR-PUSCH resource.

MCS and Link Control

Modulation order control. Controlling the modulation order and/or transmit power at the UE may be important to guarantee essential quality of service on the CSR-PUSCH resources. A group of users may be configured to use the CSR resource and for reasons of eNB simplicity, it may be preferable for the users to employ a common MCS for their transmissions. The use of different MCS per user is possible but entails significant complications for the eNB receiver design as it has to then perform blind decoding attempts for all possible MCS in order to decode the user transmissions.

If employing small MAC PDU sizes (e.g. Data NOT Allowed mode) on the CSR-PUSCH resources, one strategy would be simply to use QPSK modulation and a transport block size sufficient to carry a C-RNTI MAC CE along with a BSR. Such a message fits well within one QPSK RB and offers a high degree of FEC protection. In this case, it could be specified that a fixed CSR-PUSCH size of 1 PRB is used and/or a fixed MCS for CSR-PUSCH transmissions is used, thereby avoiding the need for any signalling to configure one or both of these parameters. This could mean that the csr-MCS parameter could be omitted from the CSR-PUSCH-Config IE and that the csr-RIV field in the same IE could be simplified (due to the need to only support a fixed size PRB allocation). Alternatively, the number of PRBs and/or the MCS may remain flexible and signalled by the network.

In the case of Data Allowed mode on CSR-PUSCH resources, larger transport block sizes could be configured, either by providing a larger number of resource blocks or by utilising higher MCS.

Once an initial MCS and PRB allocation size have been configured, these may remain fixed for a long period of time, or the network could vary them on a more dynamic basis. In the latter case, the signalling mechanism used to vary the MCS would typically be the same as that used to initially configure the MCS (RRC signalling or PDCCH). Due to the need for all users of the CSR group to be able to reliably communicate via the CSR resource to the eNB, it may be desirable to consider the radio conditions of the group of UEs before changing the MCS.

Power control. Users transmitting scheduling requests are those without immediate access to normal PUSCH resources. Hence these users may be less likely to have converged closed-loop power control loops for PUSCH.

3GPP Technical Specification (TS) 36.213 contains a description of uplink power control procedures. Whilst normal PUSCH power control procedures may be followed, an alternative is to employ open loop power control for transmissions on the CSR-PUSCH resources. This may be achieved for example by setting a TPC accumulation value f(i)=0 for CSR transmissions.

One possible further enhancement is that a separate open loop power control offset value ($P_{O\_PUSCH}$) or another offset value may be used specifically for CSR transmissions. Offset values specific to CSR transmissions may be fixed values or may be configured by the eNB via common or dedicated RRC signalling.

Aspects of synchronisation. Only UEs that are synchronised (i.e their Timing Alignment Timers (TAT) are running) are allowed to access the CSR-PUSCH or CSR-PUCCH resources and if the UEs are not synchronised they need to request access to PUSCH resources via the RACH procedure. The network may attempt to periodically refresh the timing advance of the UEs in CSR-PUSCH or CSR-PUCCH mode to keep them synchronised. Typically slow moving UEs are more suitable for using the CSR-PUSCH or CSR-PUCCH based procedures described above. Also cells covering small geographical areas will be more suitable due to the fact that the time delays associated with radio propagation over smaller cell radii distances may continue to lie within the SC-FDMA cyclic prefix length.

For messages transmitted without user data (e.g. those sent in Data NOT Allowed mode) these may be sent on CSR-PUSCH without using HARQ. In this case, a Physical Hybrid ARQ Indicator Channel (PHICH) may not be used for CSR-related purposes (although implementations that do make use of PHICH for CSR ACK/NACK feedback purposes are possible). Without using PHICH, the eNB is able to acknowledge any successful receipt of a CSR-PUSCH transmission by sending an uplink grant to the UE via PDCCH addressed to the successful UEs C-RNTI (the uplink grant also assigns any available PUSCH resources to the UE). The UE may interpret the absence of such an UL grant as an indication that its CSR-PUSCH transmission was not successfully decoded by the eNB (or that no UL PUSCH resources were available to the eNB to grant at this time). In this case, the UE may reattempt a CSR-PUSCH transmission (for a predetermined number of attempts) at a later time (possibly following a predetermined or random backoff time) or may revert to other SR access methods (e.g. RACH or DSR).

Figure 30:
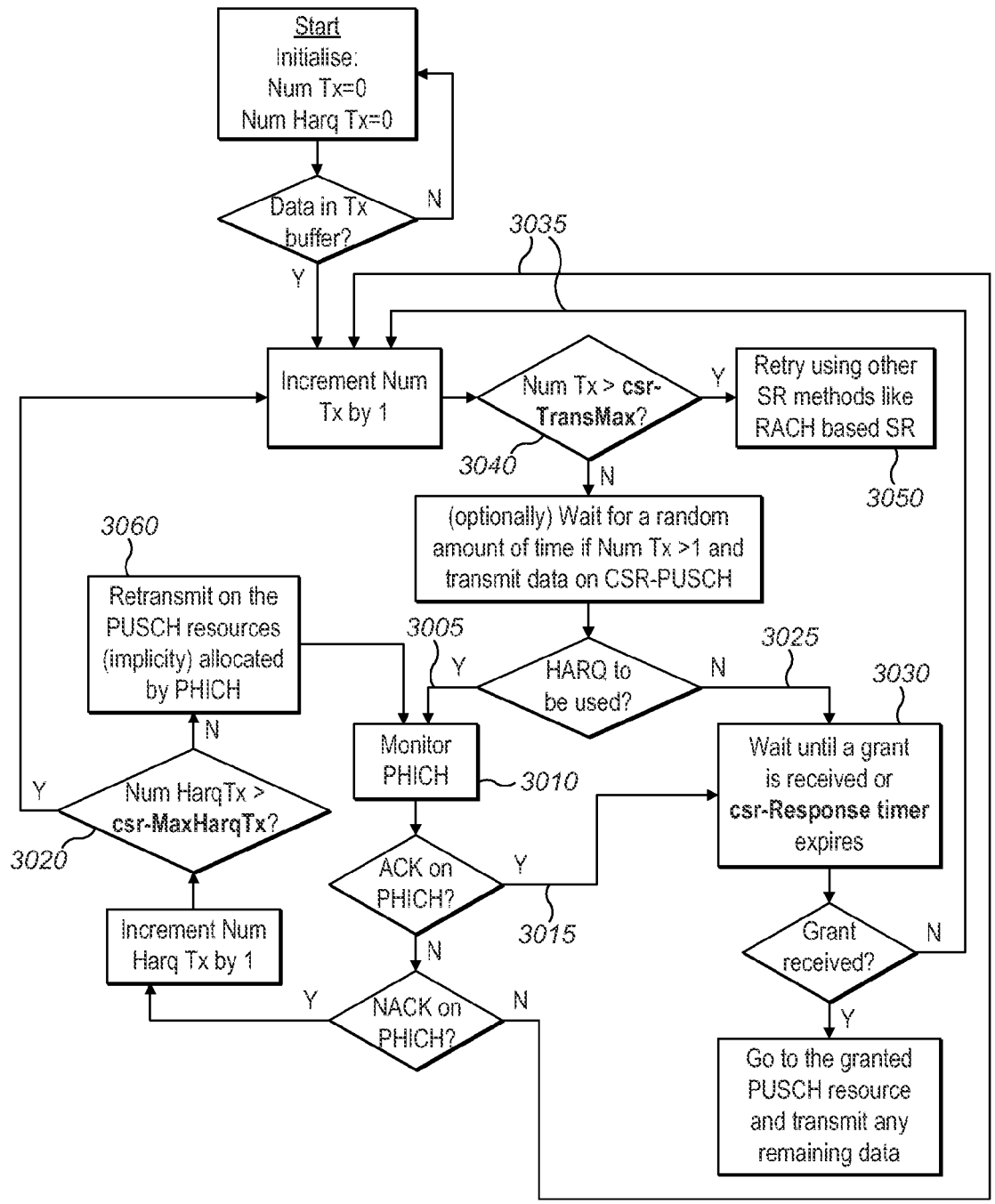
FIG. 30 illustrates an example SR transmission procedure.

An example UE procedure for retransmission is depicted in FIG. 30. The figure includes cases where, for messages with user data (e.g. those sent in Data Allowed mode) HARQ may or may not be applied: An RRC IE such as a CSR-PUSCH-Config IE may be sent by the eNB to the UE in order to configure aspects of the desired CSR-PUSCH procedure.

If HARQ is applied 3005, the PHICH is used to return ACK/NACK information 3010 to the UE and to implicitly (re)schedule the same UL resources for the subsequent retransmission 3060.

For synchronous HARQ, the ACK/NACK information on the PHICH channel occurs at a predetermined point in time after the transmission of the data (eg: 4 sub-frames later in case of FDD system) and any retransmissions (by the UE) after the ACK/NACK reception would also occur at a predetermined point in time after reception of the ACK/NACK information on the PHICH. The retransmissions may or may not coincide with the CSR 'initial transmission' resources depending on the particular scheduling pattern of the CSR resource and on the HARQ round trip time. The number of HARQ retransmissions (i.e. retransmissions triggered as a result of receiving a NACK on the corresponding PHICH) may be limited by signalling a csr-maxHARQ-Tx field 3020 within the CSR-PUSCH-Config IE.

The presence of an ACK on the PHICH resource 3015 corresponding to the CSR-PUSCH transmission only gives the UE an early indication that its transmission may have been successful. However, if more than one UE transmits on the CSR-PUSCH resource, the ACK on the PHICH cannot distinguish between the UEs. Hence, even after seeing an ACK on the PHICH resource, the UE needs to further wait 3030 for another mechanism to resolve the actual UE ID to which the ACK was addressed. One way to achieve this resolution of UE ID (contention resolution) is to wait for a grant (for up to a given number of sub-frames eg: as signalled in a csr-ResponseTimer field within the CSR-PUSCH-Config IE).

If the UE doesn't receive a grant or an ACK/NACK then the UE may try to retransmit 3035 on the CSR-PUSCH resources for up to a given number of times (eg: as signalled in a csr-TransMax field 3040 within the CSR-PUSCH-Config IE) before resorting to other SR mechanisms (eg: RACH based SR) 3050.

If the UE has no further data to send after transmitting the data on the CSR-PUSCH resource, the UE may ignore the grant. It should be noted that the network may be made aware of this scenario (e.g: the UE may indicate this to the eNB by including a BSR indicating no further data or by an implicit means such as including no BSR).

The eNB may combine any HARQ retransmission with the previous transmission before again attempting to decode the message.

If HARQ is not applied 3025, the PHICH need not be used for CSR-related purposes. As described above for the case of CSR without user data, the eNB is able to acknowledge any successful receipt of a CSR PUSCH transmission by sending an uplink grant to the UE via PDCCH addressed to the successful UEs C-RNTI. On the absence of such an UL grant, the UE may retransmit the data to the eNB during another CSR resource occasion, but the eNB would typically not attempt to combine the retransmission with the previous transmission prior to decoding.

DRX Interactions

A UE which is either in a long or a short DRX cycle and for which new data arrives in the UE buffer, may act according the following:

In the case of static or semi-static allocation of CSR-PUSCH resources: the UE may transmit any CSR-PUSCH messages that have been generated on the allocated CSR-PUSCH resources.

In the case of SPS-like allocation of CSR-PUSCH: The UE may first check that the SPS-CSR-PUSCH allocation will still be valid for the next occurrence of the SPS-CSR-PUSCH resource. The determination may be based upon the system frame number and sub-frame number of the next occurrence of the resource and may further be based upon whether the UE receiver actively monitored for CSR resource configuration updates (on PDCCH addressed to CSR-gRNTI) within a previous modification window. Additionally, if a new modification window is due to start before the occurrence of the CSR resource, the UE may also check the intervening sub-frames for possible CSR resource configuration updates.

On the arrival of the upcoming CSR resource occurrence, the UE may transmit CSR on that occurrence only if the UE has determined that the allocation is valid.

If the UE determined that the resource occurrence was not valid, the UE may either use an alternative method to send SR (e.g. RACH or DSR if allowed to do so by the eNB) or continue to monitor PDCCH during the CSR modification windows in order to identify valid resource occasions.

Note that it may be beneficial to configure the modification windows to align with (or to be a sub-set of) the UEs DRX cycle on-durations, thereby ensuring that the UE is able to read the CSR resource update messages on PDCCH as a natural part of its existing DRX behaviour.

In the case of Dynamic allocation of CSR-PUSCH resources: the UE shall read the PDCCH for a period of time to check whether a grant for the CSR-gCRNTI is made available by the eNB and, if so, access the CSR-PUSCH resources. If a CSR-PUSCH allocation is not detected within the period of time, the UE may revert to the use of other SR mechanisms (such as RACH or DSR) if allowed to do so by the eNB. The period of time may be a fixed value or a configurable parameter that may be signalled by the eNB to the UE, e.g. via RRC signalling.

If the UE accesses the CSR-PUSCH resources according to any of the above rules, upon transmission of on the CSR resource, it shall come out of DRX (by restarting the DRX Inactivity Timer) and will listen on one or more subsequent sub-frames for a grant on PDCCH.

If HARQ is enabled, the UE may also check PHICH for an acknowledgement of the data (e.g. in the case of the Data Allowed mode of operation).

PUSCH Scrambling

The data sent on PUSCH resources are scrambled prior to modulation. According to the current specifications (section 5.3.1 of 3GPP TS 36.211), the scrambling sequence is created by a generator that is initialised at the start of each sub-frame as a function of three variables:

i) the cell ID ii) an "nRNTI" value (the RNTI associated with the PUSCH transmission (e.g. C-RNTI or SPS-RNTI))

iii) the slot/sub-frame number within the radio frame.

The function is shown below in which $c_{init}$ is the initialisation value for the scrambling code generator, $N_{ID}^{cell}$ is the cell ID and $n_s$ is the slot number in the radio frame (0 . . . 19).

$$c_{init} = n_{RNTI} \cdot 2^{14} + \lfloor n_s/2 \rfloor \cdot 2^9 + N_{ID}^{cell}$$

In the case of CSR PUSCH resources, the network is unaware of the particular UE transmitting on the resources and so in order to reduce eNB receiver complexity, a common scrambling code is preferred for the group of UEs sharing the CSR-PUSCH resource. This can be achieved by:

1) using only the cell ID and/or the slot/sub-frame number to initialise the scrambling sequence (if the above formula was continued to be used, this would be equivalent to setting the nRNTI value equal to zero)

2) setting nRNTI equal to a fixed or known value for all UEs with 1-5 access to the same CSR-PUSCH resource. For example, nRNTI could be set equal to the CSR-gRNTI Alternatively, the bit scrambling function could be disabled entirely for CSR-PUSCH transmissions (equivalent to scrambling with an all-zeros bit sequence).

Collision Aspects

In the case of normal PUSCH transmissions, the cyclic shift for demodulation reference signal (DMRS) is signalled in the downlink PDCCH (using DCI format 0). This may be used by the eNB to implement uplink Multi-User MIMO (MU-MIMO), wherein the eNB may schedule (and successfully receive) multiple users simultaneously on the same PUSCH resource. By ensuring that each user uses a different cyclic shift, the receiver may be able to more accurately estimate the individual channel responses for each of the users.

In the case of CSR-PUSCH the eNB is not in control of exactly which users will transmit on a given instance of the CSR PUSCH resource. If the eNB wishes to exploit the potential for different transmitting users to have different cyclic shifts (e.g. possibly to implement MU-MIMO on the CSR-PUSCH resource), the eNB may allow the UEs to pick the cyclic shift at random from within either the full range of possible cyclic shifts, or within a restricted range of shifts. Alternatively, if the eNB wishes for users to use the same cyclic shifts for their reference signals, the eNB may define a particular cyclic shift for the UEs to use. In either case, the cyclic shift configuration may be signalled via the RRC signalling messages for the CSR-PUSCH resource allocation). If CSR-PUSCH is dynamically allocated, or allocated using SPS-like methods, a further alternative is for the cyclic shift configuration to be signalled via DCI format messages on PDCCH.

Benefits

There are a number of benefits of the proposed solutions, a few of which are listed below:

Use of a common or shared resource for scheduling request is able to provide significantly increased resource efficiency when compared to the existing dedicated scheduling request scheme. This is especially true in the case of large connected mode user populations comprising communication devices that may transmit small amounts of traffic on a relatively infrequent basis. Such traffic may for example be generated by background applications or a diversity of other data applications running on smartphone or tablet devices.

The scheduling request schemes are able to offer significantly lower access latencies when compared to the existing dedicated scheduling request scheme, and this is again especially true in the case of large connected mode user populations such as described above.

The schemes offer alternative contention-based scheduling request mechanisms to the existing RACH procedure. When compared to the RACH-based method, the signalling overheads and the total number of exchanged signalling messages may be reduced during access attempts via use of the proposed contention-based scheduling request scheme. Additionally the resource of the proposed CSR schemes may be more efficient the existing RACH procedure.

By utilising multi-bit user IDs (e.g. 8-16-bits) within the CSR transmission, the system is able to assign a large number of users to the same CSR resource. This is able to significantly increase the usage efficiency (occupancy) of the assigned resource, even when the probability of CSR transmission by any one user remains low.

The schemes can be designed to be backwards compatible with existing PUCCH and/or PUSCH transmissions (e.g. with dedicated SR and CQI/PMI/RI transmissions on PUCCH, or data transmissions on PUSCH).

The schemes can be designed to be largely backwards compatible with existing physical layer and MAC designs in both the eNB and the UE.

The schemes may allow for improved user-ID detection performance in collision scenarios where multiple users simultaneously access the same resource.

The PUSCH scheme allows for the transmission of additional buffer status information and/or radio condition information within an initial scheduling request message, thereby enabling the eNB to rapidly assign an appropriate amount and type of uplink resource to the UE.

Appendix A

| Acronym | Full text | Brief Description |
| --- | --- | --- |
| 2D | 2-Dimensional | |
| 3D | 3-Dimensional | |
| ACK | Acknowledgement | |
| BCH | Broadcast Channel | (transport channel) |
| BCCH | Broadcast Control Channel | (logical channel) |
| BSR | Buffer Status Report | |
| CB-PUSCH | Contention-Based PUSCH | |
| CB-RNTI | Contention-Based RNTI | |
| CE | Control Element | (MAC) |
| CP | Cyclic Prefix | |
| CQI | Channel Quality Information | |
| CRC | Cyclic Redundancy Check | |
| C-RNTI | Cell Radio Network Temporary Identifier | |
| CS | Cyclic Shift | |
| CSR | Contention-based Scheduling Request | |
| CSR-PUSCH | Contention-based Scheduling Request PUSCH (resources) | |
| CSR-PUCCH | Contention-based Scheduling Request PUCCH (resources) | |
| CSR-uRNTI | CSR user RNTI | |
| CSR-gRNTI | CSR group RNTI | |

-continued

| Acronym | Full text | Brief Description |
|---|---|---|
| | Abbreviations & Terminology | |
| DCI | Downlink Control Information | |
| DFT | Discrete Fourier Transform | |
| DL | DownLink | |
| DL-SCH | Downlink Shared Channel | (transport channel) |
| DSR | Dedicated Scheduling Request | |
| DRX | Discontinuous Reception | |
| DTX | Discontinuous Transmission | |
| eNB | Evolved Node-B | |
| E-UTRAN | Evolved UMTS Terrestrial Radio Access Network | |
| FEC | Forward Error Correction | |
| FFT | Fast Fourier Transform | |
| HARQ | Hybrid Automatic Repeat Request | |
| ID | Identity | |
| IDFT | Inverse Discrete Fourier Transform | |
| IE | Information Element | (RRC signalling) |
| IFFT | Inverse Fast Fourier Transform | |
| L1 | Layer 1 | (physical layer) |
| L2 | Layer 2 | (radio link layer) |
| L3 | Layer 3 | (radio signalling/control layer) |
| LgCH | Logical Channel | |
| LTE | Long Term Evolution | |
| MAC | Medium Access Control | |
| MCS | Modulation and Coding Scheme | |
| MIMO | Multiple Input Multiple Output | (multi antenna transmission system) |
| MU-MIMO | Multi-User MIMO | |
| NACK | Negative Acknowledgement | |
| OFDM | Orthogonal Frequency Division Multiplexing | |
| PDCCH | Physical Downlink Control Channel | |
| PDU | Protocol Data Unit | Used to describe a data unit for protocol layer "A" at the interface between protocol layer "A" and the next protocol layer further down the protocol stack |
| PMI | Precoding Matrix Indication | |
| PRACH | Physical Random Access Channel | |
| PRB | Physical Resource Block | |
| PUCCH | Physical Uplink Control Channel | |
| PUSCH | Physical Uplink Shared Channel | |
| O&M | Operations and Maintenance | |
| QAM | Quadrature Amplitude Modulation | (e.g. 16-QAM, 64 QAM) |
| QoS | Quality of Service | |
| QPSK | Quadrature Phase Shift Keying | |
| RACH | Random Access Channel | |
| RB | Resource Block | |
| RE | Resource Element | |
| RI | Rank Indication | |
| RLC | Radio Link Control | |
| RRC | Radio Resource Control | |
| SC-FDMA | Single Carrier Frequency Division Multiple Access | |
| SDU | Service Data Unit | Used to describe a data unit for protocol layer "A" at the interface between protocol layer "A" and the next protocol layer higher up the protocol stack |
| SIB | System Information Block | (broadcast signalling element) |

Abbreviations & Terminology -continued

| Acronym | Full text | Brief Description |
|---|---|---|
| SLA | Service Level Agreement | |
| SNR | Signal to Noise Ratio | |
| SNIR | Signal to Noise-plus-Interference Ratio | |
| SPS | Semi-Persistent Scheduling | |
| SR | Scheduling Request | |
| SRS | Sounding Reference Signal | |
| TBS | Transport Block Size | |
| TX | Transmit | |
| UCI | Uplink Control Information | |
| UE | User Equipment | |
| UL | UpLink | |
| UL-SCH | Uplink Shared Channel (transport channel) | |

Appendix B

Discontinuous Reception (DRX)

In the LTE system, the power consumption of a user device in connected mode may be reduced by use of DRX time-domain patterns (known to both the UE and the eNB) defining whether or not the UE is expected to activate its receiver and monitor a given sub-frame for the presence of DL or UL assignments on PDCCH. During those sub-frames where the UE is not expected to activate its receiver, user-plane communications are not possible and the UE may sleep to reduce its power consumption. The DRX patterns and duty cycles (active reception/sleep) vary according to the operation of certain timers, some of which are triggered by data activity. In particular, a DRX inactivity timer is reset to an initial value and restarted each time an assignment is received (via PDCCH) for a new UL or DL data packet. Whilst the timer is running, the UE is expected to actively monitor all DL sub-frames. When the timer expires (i.e. there have been no UL or DL assignments for new data for a defined period of time), the DRX pattern may change in order to allow the UE to sleep for an increased proportion of sub-frames. Thus, during times of data inactivity, UE power consumption may be reduced.

MAC Control Elements

MAC control elements (CE) allow for control signalling exchange between MAC peer entities in the UE and eNB respectively. Numerous MAC CEs are defined including:

Buffer Status Report MAC CE
C-RNTI MAC CE
DRX Command MAC CE
UE Contention Resolution ID MAC CE
Timing Advance Command MAC CE
Power Headroom MAC CE
Multicast Scheduling Information MAC CE Two of these MAC CEs are described in further detail below.

Buffer Status Report (BSR) MAC CE. This MAC CE allows for the UE to indicate to the eNB, information relating to the UEs current transmission buffer status.

A short BSR (of length 1 byte) provides a logical channel ID (2 bits) and a 6-bit field indicating the number of bytes in the buffer for that logical channel.

A long BSR (of length 3 bytes) provides 4 concatenated 6-bit fields, each field indicating the number of bytes in the buffer for logical channels 1 through 4 respectively.

C-RNTI MAC CE. This MAC CE is currently used exclusively during the RACH procedure. It is sent within RACH message 3 (see FIG. 10) in order to provide the eNB with the UEs ID subsequent to the previous steps of the UEs preamble transmission and the eNBs transmission of a Random Access Response (RAR) that allocated the PUSCH resource for message 3.

Semi-Persistent Scheduling (SPS)

Uplink and downlink shared channel physical resources (PUSCH and PDSCH respectively) are usually scheduled dynamically by the eNB, and the dynamic assignments are signalled to the UE via Downlink Control Information (DCI) transmissions on the PDCCH. Each UL or DL assignment requires a PDCCH transmission and the duration of the assignments is 1 ms.

In order to avoid the need for each 1 ms assignment to be accompanied by a PDCCH transmission, long-term resource assignments may be provided via a mechanism known as Semi-Persistent Scheduling (SPS). SPS may be more suitable for certain types of data traffic, particularly those which have some predictability in terms of their data rate or regularity of packets.

In the SPS scheme, RRC signalling is used to provide the UE with a dedicated user ID termed the SPS-RNTI. RRC signalling messages are also used to indicate to the UE a periodic pattern of resource occasions upon which an UL or DL resource assignment recurs. The actual frequency location and size of the resource, along with other assignment parameters such as the applicable modulation and coding scheme (MCS) are signalled via L1 using the PDCCH. The PDCCH messages are addressed to the UEs SPS-RNTI by means of scrambling the PDCCH CRC with the SPS-RNTI.

Once the UE has detected an SPS assignment on PDCCH (SPS activation), it then may assume that the assignment periodically recurs at each of the occasions in time defined in the RRC signalling message. PDCCH messages addressed to SPS-RNTI may also be used to deactivate (or release) the SPS resource.

The SPS-Config RRC IE (shown below for Rel-10) is used to configure SPS. The following message structure is used to send this IE:

[RRCConnectionSetup] OR [RRCConnectionReconfiguration] OR [RRCConnectionReestablishment]
      RadioResourceConfigDedicated
        SPS-Config The parameter semiPersistSchedC-RNTI is used to provide the UE with an SPS-RNTI.

The parameters semiPersistSchedIntervalDL and semiPersistSchedIntervalUL are used to specify the periodicity of the SPS resource occasions for DL and UL respectively, these taking one of the following possible values (10, 20, 32, 40, 64, 80, 128, 160, 320, 640 ms).

HARQ

HARQ is defined here as the process of combining (in a receiver) a first version of a signal with a second (retransmitted) version of a signal, and subsequently attempting to decode the combined signal. This is distinct from ARQ in which the first and second versions are not combined.

In the LTE system, positive or negative acknowledgements of uplink transmissions are transmitted by the eNB on a downlink physical channel termed the Physical Hybrid ARQ Indicator Channel (PHICH).

Synchronous HARQ is used in LTE uplink, meaning that a retransmission (triggered in the UE by receipt of NACK on PHICH from the eNB) is sent on the same UL resources (as the previous failed transmission) after a predetermined time period has elapsed since receipt of the NACK. The NACK on PHICH therefore implicitly (re)allocates the UL resources for the purposes of the retransmission.

PUSCH

A PUSCH transmission may carry an Uplink Shared Channel (UL-SCH) transport block which may include:
  User plane data
  Control information relating to user-plane protocol layers above L1 (such as MAC headers and control elements, RLC and PDCP information, etc.)
  RRC signalling and Non-access-stratum (NAS) messages In addition to the UL-SCH transport block, a PUSCH transmission may optionally also carry Layer 1 (physical layer) uplink control information bits (UCI).

Information bits relating to the UL-SCH transport block are encoded and mapped to the PUSCH data symbol RE as set out in the following steps:
1) Information bits relating to the MAC UL-SCH transport block are FEC encoded and the number of encoded bits is adjusted in accordance with the PUSCH payload size (rate matching)
2) Channel interleaving is performed
3) Bit scrambling is performed with a UE-specific scrambling sequence. The scrambling sequence is formed by a sequence generator that is initialised with the user's RNTI that is associated with the PUSCH transmission (e.g. C-RNTI or SPS-RNTI)
4) The scrambled bits are modulated to form data symbols (e.g. QPSK, 16-QAM, 64-QAM)
5) Optionally, if UCI is to be multiplexed within the PUSCH transmission, the UCI bits are FEC encoded and modulated using the same modulation format as is used for the UL-SCH transport block bits
6) The data symbols (optionally also including the symbols associated with the UCI) undergo DFT precoding via a Discrete Fourier Transform
7) The transformed symbols are mapped to sub-carriers
8) The sub-carriers undergo OFDM modulation (comprising an IFFT operation) to form a time-domain PUSCH signal
9) A demodulation reference signal (RS) is then generated and cyclic shifted according to the signalled cyclic shift for the uplink demodulation RS (in the PDCCH—using DCI format 0) and is mapped on to the SC-FDMA symbols that are reserved for PUSCH RS.

Appendix C

Allocation of the Common Resource In general, the CSR resources may be made available by the eNB in one of several ways:
  Via dedicated RRC signalling to each UE, e.g:
    Within modified or new IEs contained within e.g. RRC setup/reconfiguration/reestablishment messages
    Within Semi-Persistent-Scheduling (SPS) assignment messages
  Via common RRC signalling, e.g:
    Within system information block messages broadcast on the BCCH
  Via common L1 signalling to each UE, e.g:
    Using physical layer control signalling on PDCCH addressed to a common or group user RNTI that is associated with the CSR resource (e.g. a CSR "group" RNTI, denoted here CSR-gRNTI)
  Via a mix of RRC and L1 signalling, e.g.:
    In a manner similar to that used for Semi-Persistent-Scheduling (SPS) allocation, RRC signalling could be used to signal the time-domain recurrence of the CSR resource, whilst PDCCH L1 signalling could be used to specify other parameters of the assignment including PRB allocation and MCS. Also, as per current SPS principles, the PDCCH could also be used to activate or deactivate the long term assignment.
      The RRC signalling part could be sent individually to each UE (but with common or overlapping assignments of resource) via dedicated signalling (e.g. using methods similar to the current SPS-Config IE) or new common RRC signalling (e.g. using broadcast signalling) could be introduced
    UEs within a group of UEs having access to a given portion of contention PUSCH resource could be configured with the same SPS-RNTI, or with some other new RNTI that is common to the group of UEs (e.g. a CSR "group" RNTI, denoted CSR-gRNTI)
      PDCCH L1 signalling would then be addressed to the common SPS-RNTI or to the CSR-gRNTI and could be read by all UEs in the group. This would allow the eNB to activate, deactivate, or adjust parameters of the assigned PUSCH resources (PRBs, MCS etc. ... ) for the whole group of UEs without having to send a separate PDCCH to each UE. To facilitate this, it may be necessary to pre-arrange defined instances in time (sub-frames) where such updates may occur, to ensure that all UEs actively check the pre-arranged sub-frames for the configuration update.

One further aspect of the CSR-PUSCH solution is that UE and eNB procedures may vary according to whether or not the UE is allowed to transmit user data on the common PUSCH resource. If user data is allowed, the CSR-PUSCH transmissions may contain MAC data SDUs. If no user data transmission is allowed, CSR-PUSCH transmissions may, for example, contain only MAC control elements and/or MAC header information.

Data Transmission not Allowed on the Common PUSCH Resource:

In this case, it is unlikely that HARQ procedures are required. Since only the C-RNTI MAC CE, and optionally a BSR MAC CE have been transmitted on the common PUSCH resource, a subsequent UL grant of contention-free PUSCH resources is all that is needed to confirm to the UE the success of its previous transmission. This grant would be sent by the eNB via a PDCCH on downlink, addressed to the UEs decoded C-RNTI.

The absence of such an UL grant is indicative of either a failure of the UEs transmission, or of an absence of available contention-free PUSCH resources to grant to the UE. In both cases, the UE must (possibly following a time-out period) re-attempt transmission of its resource request (e.g. on a later instance of the common PUSCH resource). However, such retransmissions would not typically be combined with earlier transmissions by the eNB due to the fact that the set of transmitting users may be different at that time. Therefore, in the case that no MAC data SDUs are carried within the PUSCH transmission on the common resource, HARQ procedures may be bypassed or need not be implemented and the procedure more-closely resembles a simple scheduling request procedure.

Data Transmission Allowed on the Common PUSCH Resource:

In this case, HARQ procedures may be appropriate although schemes without HARQ are also possible.

If HARQ is used, the HARQ feedback (e.g. ACK/NACK on PHICH) may provide the UE with a quick indication of an unsuccessful transmission. If not successful, subsequent retransmissions (on resources implicitly allocated by the presence of PHICH NACK) may be combined by the eNB receiver in order to improve the probability of correct decoding.

For contention-based transmissions however, a simple ACK on PHICH does not provide the UE with full knowledge that its transmission was correctly received. This is because another UE may have transmitted on the same CSR PUSCH resource and the eNB may have correctly decoded the transmission from this other UE (and signalled ACK on PHICH).

Therefore, contention resolution procedures are desirable to compliment the PHICH ACK/NACK feedback in order to mitigate the effects of the HARQ protocol errors that can otherwise occur. Following similar principles to those used during RACH, the eNB may transmit a message (such as a PDCCH) addressed to (or containing) the decoded C-RNTI. In this way, the surviving UE learns of its success, whilst the non-surviving UEs time-out waiting for such a message and hence learn of their failure.

This type of contention resolution procedure may also form the basis of a scheme in which HARQ (and PHICH feedback) is not employed for CSR transmissions containing user data. The presence of the PDCCH addressed to C-RNTI informs the UE that its previous data transmission was successful and in the event of failure, the absence of the message may be used to trigger a subsequent retransmission on the CSR-PUSCH resource. These retransmissions are however typically not combined with earlier transmissions by the eNB receiver, hence are classed as not employing HARQ.

Semi-static or SPS-based allocation (as opposed to dynamic allocation) of the CSR PUSCH resource along with the potential disablement of user data transmission on CSR-PUSCH may help to alleviate one or more of the aforementioned disadvantages.

Appendix D

New CSR-PUCCH-Config IE

In the current system, the eNB may configure dedicated scheduling request resources by sending one of the following RRC messages:
 a) RRCConnectionSetup
 b) RRCConnetionReconfiguration
 c) RRCConnectionReestablishment Each of these messages allows for the SchedulingRequest-Config IE to be sent, embedded within the following data structure:
 radioResourceConfigDedicated
  physicalConfigDedicated
   SchedulingRequestConfig IE The SchedulingRequestConfig IE currently supports only the parameters associated with PUCCH format 1, and furthermore does not contain any UE-ID-based information. In one simple example, a new IE could be used to configure CSR and could include:

- A field to specify a PUCCH format 2 or PUCCH format 3 resource index for SR. The resource index field maps to the frequency and code resources to be used
- A ConfigIndex field to jointly specify a periodicity and sub-frame offset of the CSR resource.
- An optional CSR-uRNTI field (this field may not be needed if the CSR user ID is equal-to, or derived-directly from C-RNTI).
- An optional CSR-gRNTI field used to determine (perhaps in conjunction with other parameters such as cell ID) a common bit scrambling sequence that UEs should use when constructing signals transmitted on the CSR resource. If this is omitted, it may be specified that e.g. UEs use no bit scrambling, or use a default scrambling ID, or use a scrambling ID based on a cell ID).
- A csr-TransMax field to specify how many SR retransmissions the UE may make on the CSR resource before resorting to other SR methods or terminating the SR attempt.
- A parameter csr-Transmax to indicate how many consecutive attempts the UE may make on the CSR resource before resorting to other access methods.
- A timer value (csr-ResponseTimer) indicating how long the UE should wait (following a CSR transmission) for an UL grant addressed to its C-RNTI before considering the transmission to have been unsuccessful.

An example of the resulting new IE (CSR-PUCCH-Config) is shown below

CSR-PUCCH-Config

The IE CSR-PUCCH-Config is used to specify the CSR Scheduling Request related parameters

| CSR-PUCCH-Config information element |
|---|
| ```
-- ASN1START
CSR-PUCCH-Config ::=    CHOICE {
    release                 NULL,
    setup                   SEQUENCE {
        pucch-Format            CHOICE {
            format2                 sr-PUCCH2-ResourceIndex INTEGER (0..1185),
            format3                 sr-PUCCH3-ResourceIndex  INTEGER (0..549)
        }
``` |

```
        csr-gRNTI            INTEGER (0..65535)     OPTIONAL    -- Need OP
        csr-uRNTI            INTEGER (0..255)       OPTIONAL    -- Need OP
        csr-ConfigIndex      INTEGER (0..157),
        csr-TransMax         ENUMERATED {
                             n4, n8, n16, n32, n64, spare3, spare2, spare1}
        csr-ResponseTimer    ENUMERATED {sf8, sf16, sf24, sf32, sf40, sf48,
                             sf56, sf64}
    }
}
-- ASN1STOP
```

| CSR-PUCCH-Config field descriptions |
|---|
| pucch-Format<br>Parameter indicates which PUCCH format is to be used for CSR.<br>sr-PUCCH2-ResourceIndex<br>PUCCH format 2 resource index parameter: $n_{PUCCH}^{(2,p)}$<br>sr-PUCCH3-ResourceIndex<br>PUCCH format 3 resource index parameter: $n_{PUCCH}^{(3,p)}$<br>csr-gRNTI<br>CSR group ID used to initialise the bit scrambling sequence generator. If absent, the UE shall assume no bit scrambling (i.e. csr-gRNTI = 0).<br>csr-uRNTI<br>CSR user ID. If absent, CSR user ID is set equal to C-RNTI.<br>csr-ConfigIndex<br>Parameter $I_{CSR}$ specifies the time-domain occasions of the SR resource. The CSR periodicity and subframe offset are both derived from the csr-ConfigIndex parameter.<br>csr-TransMax<br>This field indicates the maximum number of SR attempts that the UE can make on the CSR resource before resorting to other access attempt methods (e.g. DSR or RACH).<br>csr-ResponseTimer<br>Parameter indicating how long the UE should wait (following a CSR transmission) for an UL grant addressed to its C-RNTI before considering the transmission to have been unsuccessful. Value in subframes. Value sf8 corresponds to 8 subframes, sf16 corresponds to 16 subframes and so on. |

Note that if the CSR resource is located within the PUSCH region, the above PUCCH resource index parameters (e.g. sr-PUCCH2-ResourceIndex and sr-PUCCH3-ResourceIndex) could be replaced with one or more parameters specifying attributes of a PUSCH resource (see for example the csr-RIV field within the CSR-PUSCH-Config IE). The signalling structure could optionally also be modified to indicate whether a PUCCH resource or a PUSCH resource is being configured.

Modified SchedulingRequestConfig IE

It will be appreciated that one or more of the parameters listed in the CSR-PUCCH-Config IE could alternatively be included within a modified version of the existing SchedulingRequestConfig IE or within other IEs.

ASN.1 structures ensuring suitable backwards compatibility with earlier 3GPP releases that do not support the new CSR functionality could be employed.

Dedicated and Common Signalling of Modified or New IEs

A modified SchedulingRequestConfig IE or the new CSR-PUCCH-Config IE could be signalled to the UE within existing dedicated RRC messages, such as RRC Setup, RRC reconfiguration or RRC Reestablishment The modified or new IE could be embedded within the messages as shown in the data structure below:

{RRCConnectionSetup} OR {RRCConnectionReconfiguration} OR {RRCConnection Reestablishment}
   radioResourceConfigDedicated
      physicalConfigDedicated
         {Modified SchedulingRequestConfig IE} OR {CSR-PUCCH-Config IE}

Due to the fact that the contention-based SR resource is shared between multiple UEs, it may be appropriate to instead use broadcast signalling to indicate the location of the resource. System Information Block 2 (SIB2) is broadcast within the cell and carries the radioResourceConfigCommonSIB IE. This IE currently does not include resource configurations for SR, but could be modified to do so via inclusion of IEs similar to the modified SchedulingRequestConfig IE or the new CSR-PUCCH-Config IE. These could, for example, be called SchedulingRequestConfigCommon or CSR-PUCCH-ConfigCommon respectively.

An example of the modified radioResourceConfigCommonSIB IE is shown below for the case in which a new IE CSR-PUCCH-ConfigCommon is included. This IE could be identical to the CSR-PUCCH-Config IE with the exception that the csr-uRNTI parameter would typically be omitted as this is a UE-dedicated parameter. The omission of this parameter is not problematic however, as in many cases, the CSR user ID could be determined by the UE without signalling (e.g. based on, or equal to the UEs C-RNTI).

| RadioResourceConfigCommon information element |
|---|
| ```
-- ASN1START
RadioResourceConfigCommonSIB ::=   SEQUENCE {
    rach-ConfigCommon          RACH-ConfigCommon,
    bcch-Config                BCCH-Config,
    pcch-Config                PCCH-Config,
    prach-Config               PRACH-ConfigSIB,
    pdsch-ConfigCommon         PDSCH-ConfigCommon,
    pusch-ConfigCommon         PUSCH-ConfigCommon,
    pucch-ConfigCommon         PUCCH-ConfigCommon,
    soundingRS-UL-             SoundingRS-UL-
    ConfigCommon               ConfigCommon,
    uplinkPowerControlCommon   UplinkPowerControlCommon,
    ul-CyclicPrefixLength      UL-CyclicPrefixLength,
    csr-pucch-ConfigCommon     CSR-PUCCH-ConfigCommon
}
-- ASN1STOP
``` |

In an alternative data structure, and if the common/shared resource is located within the PUCCH region, the existing pucch-ConfigCommon IE within SIB2 could be modified to include the necessary resource parameters or to include the SchedulingRequestConfigCommon IE or the CSR-PUCCH-ConfigCommon IE.

In a similar fashion, if the common/shared resource is located within the PUSCH region, the existing pusch-ConfigCommon IE could be modified to include the necessary resource parameters or the modified SchedulingRequestConfigCommon IE or the CSR-PUCCH-ConfigCommon IE. In these cases, the IEs would be suitably modified to specify a PUSCH resource rather than a PUCCH resource. However, the CSR signal transmissions themselves would still conform to the PUCCH signal constructions described previously.

SPS-based Signalling Methods

If normal DCI format 0 messages are used to control, configure or update the CSR PUSCH resource, certain fields within the PDCCH (such as the MCS) may not be applicable to a PUCCH signal construction. These fields could be either ignored or used for other purposes.

Additionally, certain fields within the SPS-Config IE may not be relevant to CSR operation. Hence the signalling may be structured to allow for the setup of either a "normal" uplink SPS resource, or to setup a CSR SPS resource.

In the example shown below, a new component to the SPS-Config IE is introduced (SPS-ConfigCSR) to allow configuration of the time-domain aspects of a CSR resource (other aspects including activation, deactivation and reconfigurations are achieved via PDCCH as has been described above). In this example, the signalling supports an alternate set of possible values for the time-domain periodicity of the resource, when compared to a 'normal' uplink SPS configuration. The signalling also supports configuration of the modification period, modification length and modification offset values. Other parameters specific to CSR configuration may also be included. Note that the SPS-CSR-RNTI (or CSR-gRNTI) may be configured within SPS-Config using the existing parameter semiPersistSchedC-RNTI.

For simplicity, the details of the existing SPS-ConfigDL and SPS-ConfigUL components of the IE are not shown.

SPS-Confiq

The IE SPS-Config is used to specify the semi-persistent scheduling configuration.

SPS-Config information element

```
-- ASN1START
SPS-Config ::= SEQUENCE {
    semiPersistSchedC-RNTI    C-RNTI           OPTIONAL,    -- Need OR
    sps-ConfigDL              SPS-ConfigDL     OPTIONAL,    -- Need ON
    sps-ConfigUL              SPS-ConfigUL     OPTIONAL     -- Need ON
    sps-ConfigCSR             SPS-ConfigCSR    OPTIONAL     -- Need ON
}
SPS-ConfigDL ::=
<not shown>...
SPS-ConfigUL ::=
<not shown>...
SPS-ConfigCSR ::=   CHOICE {
    release              NULL,
    setup                SEQUENCE {
        semiPersistSchedIntervalCSR   ENUMERATED {
                                          sf1, sf2, sf5, sf10, sf20, sf32,
                                          sf64, sf80, sf128, sf256, sf320, sf640},
        csrModificationLength         CHOICE {
            sf10                          INTEGER(0..9),
            sf20                          INTEGER(0..19),
            sf32                          INTEGER(0..31),
            sf40                          INTEGER(0..39),
            sf64                          INTEGER(0..63),
            sf80                          INTEGER(0..79),
            sf128                         INTEGER(0..127),
            sf160                         INTEGER(0..159),
            sf256                         INTEGER(0..255),
            sf320                         INTEGER(0..319),
            sf512                         INTEGER(0..511),
            sf640                         INTEGER(0..639),
            sf1024                        INTEGER(0..1023),
            sf1280                        INTEGER(0..1279),
            sf2048                        INTEGER(0..2047),
            sf2560                        INTEGER(0..2559
        },
        csrModificationOffset         INTEGER (0..2559)
    }
}
-- ASN1STOP
```

SPS-Config field descriptions semiPersistSchedC-RNTI
Semi-persistent Scheduling C-RNTI, see TS 36.321 [6].
semiPersistSchedIntervalCSR
Semi-persistent scheduling interval for CSR in uplink. Value in number of sub-frames.
Value sf1 corresponds to 1 sub-frame, sf2 corresponds to 2 sub-frames and so on.
csrModificationLength Modification Period and Modification Length for CSR. The value of ModificationPeriod is in number of sub-frames. Value sf10 corresponds to 10 sub-frames, sf20 corresponds to 20 sub-frames and so on. The value of ModificationLength is an integer expressed as the number of sub-frames.
csrModificationOffset
Modification Offset for CSR in subframes.

Appendix E

Network Procedures

If CSR resources are configured in a cell the eNodeB receives each configured time/frequency/code component of the CSR resources and attempts to detect and decode transmissions from the group of UEs configured to access the CSR resources. If the eNodeB detects a transmission on the CSR resource, it shall decode the CSR-uRNTI. If a valid CSR-uRNTI is detected, the eNodeB may send a grant (via a PDCCH transmission) of any available PUSCH resources to the UE whose C-RNTI is equal to or associated with the received CSR-uRNTI.

UE Procedures

If a connected mode UE is time-synchronised and configured to access CSR resources for SR using PUCCH signal constructions, and if new data arrives in the UEs transmit buffer and the UE does not have a valid PUSCH grant, it shall follow the following procedure:

1. Select a time, frequency and code combination for the CSR transmission from a set of allowed or configured combinations
   The selection may be made at random from within the allowed set
   The allowed set may or may not be derived based upon the UEs CSR-uRNTI or C-RNTI
2. Transmit a signal conveying its CSR-uRNTI either in part or in full using at least the selected time, frequency and code combination and using the configured PUCCH format (e.g. PUCCH format 2 or PUCCH format 3). Transmit diversity (if configured) is applied to the transmission
3. Listen to the PDCCH for a grant of PUSCH resources (DCI format 0) addressed to the UE's C-RNTI
4. If a grant is received within a specified window of time, use the granted PUSCH resources for data transmission
5. If a grant is not received within a specified period of time (e.g. the time specified by the parameter csr-Response-Timer) and if a maximum number of CSR retransmissions has not been reached, reattempt another CSR transmission after an elapsed period of time (i.e. go to step 1), otherwise terminate the CSR transmission procedure and utilize other methods for SR (e.g. RACH or DSR) if configured to do so.
   Note that the elapsed period of time prior to a CSR retransmission attempt may be variable (e.g. based upon expiry of a timer initialized to a random number, or based upon a UE priority)

If the UE is not in connected mode, or if the UE is in connected mode but is not time-synchronised (i.e. the time alignment timer has expired), the UE shall use the normal RACH procedure for SR purposes.

Power Control

Users transmitting scheduling request are those without immediate access to normal PUSCH resources. The UEs may or may not have transmitted recently on PUCCH. Users who have not are less likely to have converged closed-loop power control loops for PUCCH.

Whilst normal PUCCH power control procedures may be followed (see section 5.1.2.1 of TS 36.213), an alternative is to employ open loop power control methods for transmissions on the CSR-PUCCH resources, for example by setting TPC accumulation value $g(i)=0$ (see again section 5.1.2.1 of 36.213) for CSR transmissions.

One possible further enhancement is that a separate open loop power control offset value (PO_PUCCH) or a separate PUCCH format offset value $\Delta F\_PUCCH$ may be used specifically for CSR transmissions. See section 5.1.2.1 of TS 36.213 and the UplinkPowerControl IE of 36.331 for a description of these fields.

These offset values specific to CSR transmissions may be fixed values or may be configured by the eNB via common or dedicated RRC signalling.

Appendix F

The MAC PDU lengths of cases (i) to (xii) of FIG. 29 are listed in the following table

| Case | C-RNTI (bytes) | BSR (bytes) | User Data (bytes) | Padding (bytes) | Total (bytes) |
|---|---|---|---|---|---|
| i) | 1(sub-h) + 2(C-RNTI) | 0 | 0 | 0 | 3 |
| ii) | 1(sub-h) + 2(C-RNTI) | 0 | 1(sub-h) + $L_u$(data) | 0 | $4 + L_u$ |
| iii) | 1(sub-h) + 2(C-RNTI) | 0 | 0 | 1(sub-h) + $L_p$(pad) | $4 + L_p$ |
| iv) | 1(sub-h) + 2(C-RNTI) | 0 | 2(sub-h) + $L_u$(data) | 1(sub-h) + $L_p$(pad) | $6 + L_u + L_p$ |
| v) | 1(sub-h) + 2(C-RNTI) | 1(sub-h) + 1(S-BSR) | 0 | 0 | 5 |
| vi) | 1(sub-h) + 2(C-RNTI) | 1(sub-h) + 1(S-BSR) | 1(sub-h) + $L_u$(data) | 0 | $6 + L_u$ |
| vii) | 1(sub-h) + 2(C-RNTI) | 1(sub-h) + 1(S-BSR) | 0 | 1(sub-h) + $L_p$(pad) | $6 + L_p$ |
| viii) | 1(sub-h) + 2(C-RNTI) | 1(sub-h) + 1(S-BSR) | 2(sub-h) + $L_u$(data) | 1(sub-h) + $L_p$(pad) | $8 + L_u + L_p$ |
| ix) | 1(sub-h) + 2(C-RNTI) | 1(sub-h) + 3(L-BSR) | 0 | 0 | 7 |
| x) | 1(sub-h) + 2(C-RNTI) | 1(sub-h) + 3(L-BSR) | 1(sub-h) + $L_u$(data) | 0 | $8 + L_u$ |
| xi) | 1(sub-h) + 2(C-RNTI) | 1(sub-h) + 3(L-BSR) | 0 | 1(sub-h) + $L_p$(pad) | $8 + L_p$ |
| xii) | 1(sub-h) + 2(C-RNTI) | 1(sub-h) + 3(L-BSR) | 2(sub-h) + $L_u$(data) | 1(sub-h) + $L_p$(pad) | $10 + L_u + L_p$ |

Appendix G

| CSR-PUSCH-Config information element |
|---|

```
-- ASN1START
CSR-PUSCH-Config ::=    SEQUENCE {
    csr-RIV             CHOICE {
        b5                  INTEGER (0..31),
        b6                  INTEGER (0..63),
        b7                  INTEGER (0..127),
        b8                  INTEGER (0..255),
        b9                  INTEGER (0..511),
        b10                 INTEGER (0..1023),
        b11                 INTEGER (0..2047),
        b12                 INTEGER (0..4095),
        b13                 INTEGER (0..8191)
    },
    csr-gRNTI           INTEGER (0..65535),    OPTIONAL    -- Need OP
    csr-ConfigIndex     INTEGER (0..157),
    csr-MCS             INTEGER (0..31),
    csr-DMRSshift       INTEGER (0..7),        OPTIONAL    - Need OP
    csr-TransMax        ENUMERATED {n4, n8, n16, n32, n64, spare3, spare2,
                            spare1},
    csr-ResponseTimer   ENUMERATED {sf8, sf16, sf24, sf32, sf40, sf48, sf56,
                            sf64},
    csr-Data-allowed    CHOICE {
        false               NULL,
        true                csr-maxHARQ-Tx   ENUMERATED {n1, n2, n4, n8}
    }
}
-- ASN1STOP
```

| CSR-PUSCH-Config field descriptions |
|---| csr-RIV
Resource Indication Value for CSR. Specifies both the number of consecutive virtual resource blocks reserved for CSR-PUSCH transmissions and the starting virtual resource block for the CSR resource (see section 8.1 of TS 36.213). The number of RIVs is a function of the number of UL resource blocks ($N_{RB}^{UL}$) within the system bandwidth and is equal to
$N_{RIV}$ = ceil(($N_{RB}^{UL}$) * ($N_{RB}^{UL}$+1)/2). Choice
parameters b5, b6, . . . b13 correspond to $\log 2(N_{RIV})$.
csr-gRNTI
CSR group ID used to initialise the bit scrambling sequence generator. Parameter $n_{RNTI}$ of section 5.3.1 of TS 36.211. If absent, the UE shall assume no bit scrambling (i.e. csr-gRNTI = 0).
csr-ConfigIndex
Parameter $I_{CSR}$ specifies the time-domain occasions of the SR resource. The CSR periodicity and subframe offset are both derived from the csr-ConfigIndex parameter.
-csr-MCS
MCS indication field defining both the transport block size and the modulation order to be used on the CSR resource. Corresponds to parameter $I_{MCS}$ of section 8.6.1 of 36.213.
csr-DMRSshift
Cyclic shift for demodulation reference signals. Corresponds to the cyclic shift field in table 5.5.2.1.1-1 of TS 36.211. If absent, the UE may select the demodulation reference signal cyclic shift to use for CSR-PUSCH transmissions.
csr-Transmax
This field indicates the maximum number of SR attempts that the UE can make on the CSR resource before resorting to other access attempt methods (DSR or RACH)..
csr-Data-allowed
If set to true, the UE may include MAC SDUs within CSR transmissions. If set to false, the UE may not include MAC SDUs within CSR transmissions.
csr-maxHARQTx
This indicates the maximum number of allowed retransmissions for MAC PDUs transmitted intially on the CSR resource and containing at least one MAC SDU. The retransmissions occur on resources implicitly allocated via PHICH NACK
csr-ResponseTimer
Parameter indicating how long the UE should wait (following a CSR transmission) for an UL grant addressed to its C-RNTI before considering the transmission to have been unsuccessful. Value in subframes. Value sf8 corresponds to 8 subframes, sf16 corresponds to 16 subframes and so on.

The new CSR-PUSCH-Config IE may be transmitted to the UE via dedicated RRC signalling or via common/broadcast RRC signalling.

In the case of dedicated RRC signalling, the new IE could be included inside the following message structure:
{RRCConnectionSetup} OR {RRCConnectionReconfiguration} OR {RRCConnection Reestablishment}
   radioResourceConfig Dedicated
     physicalConfigDedicated
       CSR-PUSCH-Config In the case of common RRC signalling, SIB2 is the ideal candidate for carrying the new IE within the RadioResourceConfigCommon IE:
SystemInformationBlockType2
   RadioResourceConfigCommon
     CSR-PUSCH-Config In this case, changes would also be needed to the RadioResourceConfigCommon IE as shown below

| RadioResourceConfigCommon information element |
| --- |
| -- ASN1START |
| RadioResourceConfigCommonSIB ::=   SEQUENCE { |
|    rach-ConfigCommon          RACH-ConfigCommon, |
|    bcch-Config                PRACH-Config, |
|    pcch-Config                PCCH-Config, |
|    prach-Config               PRACH-ConfigSIB, |
|    pdsch-ConfigCommon         PDSCH-ConfigCommon, |
|    pusch-ConfigCommon         PUSCH-ConfigCommon, |
|    pucch-ConfigCommon         PUCCH-ConfigCommon, |
|    soundingRS-UL-             SoundingRS-UL- |
|    ConfigCommon               ConfigCommon, |
|    uplinkPowerControlCommon   UplinkPowerControlCommon, |
|    ul-CyclicPrefixLength      UL-CyclicPrefixLength, |
|    csr-pusch-Config           CSR-PUSCH-Config |
|    ... |
| } |
| -- ASN1STOP |

The invention claimed is:

1. A method implemented in a user equipment UE for single carrier frequency division multiple access SC-FDMA within a wireless system comprising:
receiving, at the UE, an assignment of a first type of uplink scheduling request resource comprising a first plurality of subcarriers of the wireless system;
detecting, at the UE, a change in activity of the UE, wherein the change in activity is related to one or more applications resident on the UE;
determining, at the UE and in response to the detected change in activity, that a change in uplink scheduling request resource type should be made;
upon determining that a change in scheduling request resource type should be made, selecting, at the UE, a second type of uplink scheduling request resource comprising a second plurality of subcarriers for transmission of scheduling requests, wherein one of the first type or the second type is an unscheduled shared SC-FDMA resource assigned to a plurality of UEs of the wireless system and an other of the first type or the second type is a dedicated SC-FDMA resource assigned to only the UE, wherein the second plurality of subcarriers are located within a same system bandwidth as the first plurality of subcarriers; and
transmitting a signal comprising an encoded user ID on subcarriers used for the unscheduled shared SC-FDMA resource.

2. A method according to claim 1 wherein the detection of the change in activity of the UE is further based on one or more of:
a discontinuous reception timer, DRX state or sub-state;
a change in pattern relating to a DRX; or
a determination of whether one or more timers controlling DRX behaviour are running or have expired.

3. A method according to claim 1 wherein determining that a change of scheduling request resource type should be made comprises receiving an explicit signal from an eNB specifying which assigned scheduling request resource type to use.

4. A method according to claim 1 wherein the signal is an uplink control channel signal.

5. A method according to claim 4 wherein the signal comprises a Physical Uplink Control Channel PUCCH format 2 or format 3 signal.

6. A method according to claim 4 wherein the encoded user ID is generated using a block forward error correction FEC encoder.

7. A method according to claim 1 wherein the signal is an uplink shared channel signal.

8. A method according to claim 7 wherein the uplink signal comprises a Physical Uplink Shared Channel PUSCH signal.

9. A method according to claim 7 wherein the encoded user ID is generated using a turbo forward error correction FEC encoder.

10. A method according to claim 1 wherein the encoded user ID comprises encoded bits, and the method further comprises:
modulating the encoded bits to produce modulated symbols;
spreading the modulated symbols;
mapping each of the spread modulated symbols to the subcarriers used for the unscheduled shared SC-FDMA resource; and
transmitting a signal comprising the plurality of subcarriers in the wireless system.

11. A method according to claim 1 wherein said assignment of the first type of uplink scheduling request resource is received from a broadcast transmission or common signalling message transmitted by an eNB of the wireless system.

12. A method according to claim 1 wherein said assignment of the first type of uplink scheduling request resource is received from a dedicated transmission to the UE by an eNB of the wireless system.

13. A method according to claim 1 wherein the user ID is related to Cell Radio Network Temporary Identifier C-RNTI.

14. A method according to claim 1, wherein the first plurality of subcarriers is within a PUCCH frequency region of an uplink system bandwidth of the wireless system.

15. A method according to claim 1, wherein the first plurality of subcarriers is within a PUSCH frequency region of an uplink system bandwidth of the wireless system.

16. A method according to claim 1, wherein SC-FDMA is used by the UE for sending uplink communication signals.

17. A method according to claim 1, wherein a modulation scheme other than SC-FDMA is used for downlink communication signals received by the UE.

18. A user equipment UE for single carrier frequency division multiple access SC-FDMA within a wireless system, comprising:
one or more processors configured to:
receive an assignment of a first type of uplink scheduling request resource comprising a first plurality of subcarriers of the wireless system;

detect a chance in activity of the UE, wherein the chance in activity is related to one or more applications resident on the UE;

determine, in response to the detected chance in activity, that a change in uplink scheduling request resource type should be made;

upon determining that a change in scheduling request resource type should be made, select a second type of uplink scheduling request resource comprising a second plurality of subcarriers for transmission of scheduling requests, wherein one of the first type or the second type is an unscheduled shared SC-FDMA resource assigned to a plurality of UEs of the wireless system and an other of the first type or the second type is a dedicated SC-FDMA resource assigned to only the UE, wherein the second plurality of subcarriers are located within a same system bandwidth as the first plurality of subcarriers; and transmit a signal comprising an encoded user ID on subcarriers used for the unscheduled shared SC-FDMA resource.

19. The UE of claim 18, wherein the one or more processors configured to determine that a change of scheduling request resource type should be made comprises the one or more processors configured to receive an explicit signal from an eNB specifying which assigned scheduling request resource type to use.

20. The UE of claim 18, wherein the signal is an uplink control channel signal.

21. The UE of claim 20, wherein the signal comprises a Physical Uplink Control Channel PUCCH format 2 or format 3 signal.

22. The UE of claim 18, wherein said assignment of the first type of uplink scheduling request resource is received from a broadcast transmission or common signalling message transmitted by an eNB of the wireless system.

23. The UE of claim 18, wherein said assignment of the first type of uplink scheduling request resource is received from a dedicated transmission to the UE by an eNB of the wireless system.

24. The UE of claim 23, wherein the user ID is related to Cell Radio Network Temporary Identifier C-RNTI.

25. The UE of claim 18, wherein the first plurality of subcarriers is within a PUCCH frequency region of an uplink system bandwidth of the wireless system.

26. The UE of claim 18, wherein the first plurality of subcarriers is within a PUSCH frequency region of an uplink system bandwidth of the wireless system.

27. A non-transitory computer-readable medium storing instructions to cause a processor to perform operations comprising:

receiving, at a user equipment (UE), an assignment of a first type of uplink scheduling request resource comprising a first plurality of subcarriers of a wireless system;

detecting, at the UE, a change in activity of the UE, wherein the change in activity is related to one or more applications resident on the UE;

determining, at the UE and in response to the detected change in activity, that a change in uplink scheduling request resource type should be made;

upon determining that a change in scheduling request resource type should be made, selecting, at the UE, a second type of uplink scheduling request resource comprising a second plurality of subcarriers for transmission of scheduling requests, wherein one of the first type or the second type is an unscheduled shared SC-FDMA resource assigned to a plurality of UEs of the wireless system and an other of the first type or the second type is a dedicated SC-FDMA resource assigned to only the UE, wherein the second plurality of subcarriers are located within a same system bandwidth as the first plurality of subcarriers; and transmitting a signal comprising an encoded user ID on subcarriers used for the unscheduled shared SC-FDMA resource.

28. The computer-readable medium of claim 27, wherein determining that a change of scheduling request resource type should be made comprises the one or more processors configured to receive an explicit signal from an eNB specifying which assigned scheduling request resource type to use.

29. The computer-readable medium of claim 27, wherein the signal is an uplink control channel signal.

30. The computer-readable medium of claim 29, wherein the signal comprises a Physical Uplink Control Channel PUCCH format 2 or format 3 signal.

31. The computer-readable medium of claim 27, wherein said assignment of the first type of uplink scheduling request resource is received from a broadcast transmission or common signalling message transmitted by an eNB of the wireless system.

32. The computer-readable medium of claim 27, wherein said assignment of the first type of uplink scheduling request resource is received from a dedicated transmission to the UE by an eNB of the wireless system.

33. The computer-readable medium of claim 27, wherein the user ID is related to Cell Radio Network Temporary Identifier C-RNTI.

34. The computer-readable medium of claim 27, wherein the first plurality of subcarriers is within a PUCCH frequency region of an uplink system bandwidth of the wireless system.

35. The computer-readable medium of claim 27, wherein the first plurality of subcarriers is within a PUSCH frequency region of an uplink system bandwidth of the wireless system.

* * * * *